(12) United States Patent
Nakagami et al.

(10) Patent No.: US 10,321,136 B2
(45) Date of Patent: *Jun. 11, 2019

(54) IMAGE PROCESSING APPARATUS AND METHOD

(71) Applicant: SONY CORPORATION, Tokyo (JP)

(72) Inventors: Ohji Nakagami, Tokyo (JP); Yoichi Yagasaki, Tokyo (JP)

(73) Assignee: SONY CORPORATION, Tokyo (JP)

(*) Notice: Subject to any disclaimer, the term of this patent is extended or adjusted under 35 U.S.C. 154(b) by 165 days.

This patent is subject to a terminal disclaimer.

(21) Appl. No.: 15/001,963

(22) Filed: Jan. 20, 2016

(65) Prior Publication Data

US 2016/0150232 A1  May 26, 2016

Related U.S. Application Data

(63) Continuation of application No. 14/579,463, filed on Dec. 22, 2014, now Pat. No. 9,282,345, which is a (Continued)

(30) Foreign Application Priority Data

Feb. 19, 2009  (JP) ................................. 2009-036499

(51) Int. Cl.
*H04N 19/593* (2014.01)
*H04N 19/159* (2014.01)
(Continued)

(52) U.S. Cl.
CPC ......... *H04N 19/159* (2014.11); *H04N 19/105* (2014.11); *H04N 19/107* (2014.11);
(Continued)

(58) Field of Classification Search
CPC ........................... H04N 19/105; H04N 19/107
See application file for complete search history.

(56) References Cited

U.S. PATENT DOCUMENTS 5,173,952 A * 12/1992 Sugahara ............... H04N 19/61
375/E7.144
5,761,200 A   6/1998 Hsieh
(Continued)

FOREIGN PATENT DOCUMENTS

EP   1 404 136 A1   3/2004
JP   5-244585 A     9/1993
(Continued)

OTHER PUBLICATIONS

Irani, M., et al., "Improving Resolution by Image Registration," CVGIP: Graphical Models and Image Processing, vol. 53, No. 3, pp. 231-239, (May 1991).
(Continued)

*Primary Examiner* — Peter D Le
(74) *Attorney, Agent, or Firm* — Xsensus LLP

(57) ABSTRACT

The present invention relates to an image processing apparatus and method that can generate a high-accuracy prediction image with a small amount of control information. A motion compensation circuit 51 specifies a macroblock corresponding to a prediction image in a reference frame other than a current frame using a motion vector supplied from a prediction mode determination circuit 41. The motion compensation circuit 51 reads an image of the specified macroblock from a frame memory 19, and extracts the read image as a motion compensation image. An intra-prediction circuit 52 performs intra-prediction on the current frame using an arbitrary method to generate an intra-prediction image IP. The present invention can be applied to, for example, an encoding apparatus and a decoding apparatus.

12 Claims, 32 Drawing Sheets

Related U.S. Application Data continuation of application No. 13/147,981, filed as application No. PCT/JP2010/052018 on Feb. 12, 2010, now Pat. No. 8,934,531.

(51) Int. Cl.

| | | |
|---|---|---|
| *H04N 19/503* | (2014.01) | |
| *H04N 19/107* | (2014.01) | |
| *H04N 19/109* | (2014.01) | |
| *H04N 19/117* | (2014.01) | |
| *H04N 19/82* | (2014.01) | |
| *H04N 19/573* | (2014.01) | |
| *H04N 19/577* | (2014.01) | |
| *H04N 19/615* | (2014.01) | |
| *H04N 19/51* | (2014.01) | |
| *H04N 19/105* | (2014.01) | |
| *H04N 19/513* | (2014.01) | |
| *H04N 19/63* | (2014.01) | |

(52) U.S. Cl.
CPC ......... *H04N 19/109* (2014.11); *H04N 19/117* (2014.11); *H04N 19/503* (2014.11); *H04N 19/51* (2014.11); *H04N 19/513* (2014.11); *H04N 19/573* (2014.11); *H04N 19/577* (2014.11); *H04N 19/593* (2014.11); *H04N 19/615* (2014.11); *H04N 19/82* (2014.11); *H04N 19/63* (2014.11)

(56) References Cited

U.S. PATENT DOCUMENTS

| | | | | |
|---|---|---|---|---|
| 5,949,908 | A * | 9/1999 | Sugahara | H04N 19/139 375/E7.129 |
| 6,633,676 | B1 | 10/2003 | Kleihorst et al. | |
| 7,852,853 | B1 * | 12/2010 | Black | H04L 47/2408 370/395.42 |
| 8,457,422 | B2 | 6/2013 | Nakagami et al. | |
| 8,483,495 | B2 | 7/2013 | Nakagami et al. | |
| 8,705,627 | B2 | 4/2014 | Nakagami et al. | |
| 8,824,542 | B2 | 9/2014 | Nakagami et al. | |
| 2004/0184666 | A1 | 9/2004 | Sekiguchi et al. | |
| 2006/0062299 | A1 | 3/2006 | Park et al. | |
| 2006/0188024 | A1 | 8/2006 | Suzuki et al. | |
| 2006/0291557 | A1 | 12/2006 | Tourapis | |
| 2007/0071104 | A1 | 3/2007 | Kondo | |
| 2007/0098068 | A1 | 5/2007 | Kimata et al. | |
| 2007/0183072 | A1 | 8/2007 | Lee | |
| 2007/0291847 | A1 | 12/2007 | Shimauchi et al. | |
| 2008/0137752 | A1 | 6/2008 | He | |
| 2008/0187044 | A1 * | 8/2008 | Kim | H04N 19/51 375/240.15 |
| 2008/0260043 | A1 | 10/2008 | Bottreau et al. | |
| 2009/0010568 | A1 | 1/2009 | Nakagami et al. | |
| 2009/0074061 | A1 | 3/2009 | Yin et al. | |
| 2009/0080535 | A1 | 3/2009 | Yin et al. | |
| 2009/0112272 | A1 | 4/2009 | Schleicher et al. | |
| 2009/0116760 | A1 | 5/2009 | Boon et al. | |
| 2009/0168872 | A1 | 7/2009 | Jeon et al. | |
| 2009/0257664 | A1 * | 10/2009 | Kao | H04N 19/159 382/232 |
| 2009/0262803 | A1 | 10/2009 | Wang et al. | |
| 2010/0118963 | A1 | 5/2010 | Nakagami et al. | |
| 2010/0183072 | A1 | 7/2010 | Nakagami et al. | |
| 2010/0260260 | A1 | 10/2010 | Wiegand et al. | |
| 2010/0284467 | A1 | 11/2010 | Sekiguchi et al. | |
| 2013/0243095 | A1 | 9/2013 | Nakagami et al. | |
| 2014/0334549 | A1 | 11/2014 | Nakagami et al. | |

FOREIGN PATENT DOCUMENTS

| | | |
|---|---|---|
| JP | 8 154250 | 6/1996 |
| JP | 9-289642 A | 11/1997 |
| JP | 2006-180196 A | 7/2006 |
| JP | 2007-503775 A | 2/2007 |
| JP | 2007 081983 | 3/2007 |
| JP | 2007 300380 | 11/2007 |
| JP | 2008 022530 | 1/2008 |
| JP | 2008 104188 | 5/2008 |
| JP | 2008 108811 | 5/2008 |
| JP | 2009 500981 | 1/2009 |
| JP | 2009 502099 | 1/2009 |
| JP | 5545499 B2 | 7/2014 |
| WO | WO 2006/078142 A1 | 7/2006 |
| WO | WO 2007/008286 A1 | 1/2007 |
| WO | WO 2008/048489 A2 | 4/2008 |
| WO | WO 2008/096964 A1 | 8/2008 |
| WO | WO 2008/123254 A1 | 10/2008 |

OTHER PUBLICATIONS

International Search Report dated May 18, 2010 in PCT/JP10/052018 filed Feb. 12, 2010.

Office Action dated Oct. 24, 2013, in Japanese Patent Application No. 2011-500574.

Office Action dated Oct. 24, 2013, in Japanese Patent Application No. 2013-013970.

Communication pursuant to Article 94(3) EPC dated Apr. 16, 2014 in European Patent Application No. 10 743 685.9.

Extended European Search Report dated Apr. 17, 2014 in Patent Application No. 13169720.3.

Yin-Tsung Hwang, et al., "Scalable lossless video coding based on adaptive motion compensated temporal filtering", Ninth IEEE International Symposium on Multimedia 2007—Workshops, XP031239194, Dec. 10, 2007, pp. 421-426.

Office Action dated Jan. 28, 2014 in Japanese Patent Application No. 2011-500574.

Office Action dated Jan. 28, 2014 in Japanese Patent Application No. 2013-013970.

Extended European Search Report dated Oct. 18, 2012 in European Patent Application No. 10743685.9.

Thomas Wiegand, et al., "Overview of the H.264/AVC Video Coding Standard", IEEE Transactions on Circuits and Systems for Video Technology, vol. 13, No. 7, XP011221093, Jul. 1, 2003, pp. 560-576.

Soon-kak Kwon, et al., "Overview of H.264/MPEG-4 part 10", Journal of Visual Communication and Image Representation, vol. 17, No. 2, XP024905089, Apr. 1, 2006, pp. 186-216.

Office Action dated Mar. 31, 2015 in Japanese Patent Application No. 2014-102314.

Korean Office Action dated Sep. 21, 2016 in Patent Application No. 10-2016-7024484 (with English translation).

Korean Office Action dated Sep. 20, 2017 in Patent Application No. 10-2017-701087 (with English Translation).

Korean Office Action for Korean Patent Application No. 10-2018-7011596, dated Jul. 16, 2018. English translation provided.

* cited by examiner

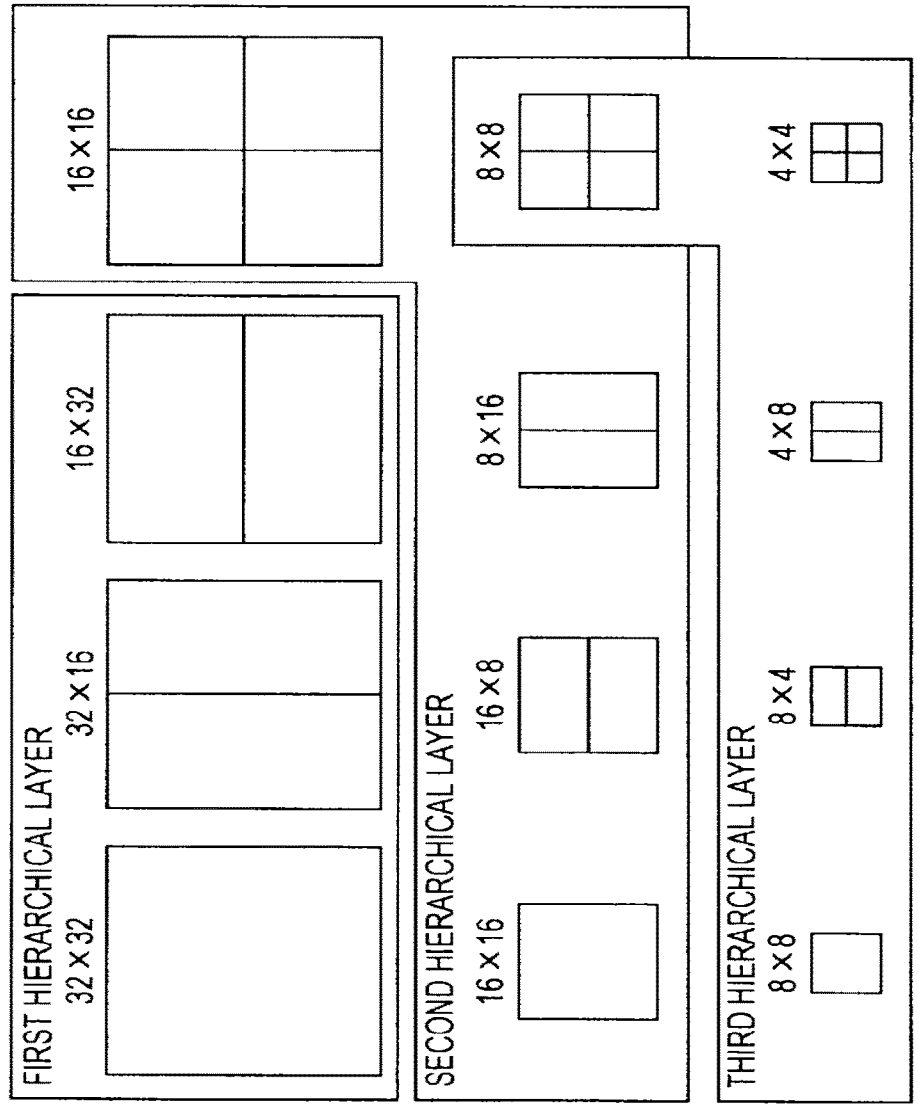

IMAGE PROCESSING APPARATUS AND METHOD

CROSS REFERENCE TO RELATED APPLICATIONS

This application is a continuation of U.S. Ser. No. 14/579,463, filed Dec. 22, 2014, which is a continuation of U.S. Ser. No. 13/147,981, filed Aug. 4, 2011 (now U.S. Pat. No. 8,934,531, issued Jan. 13, 2015), which is a 371 national stage of PCT/JP2010/052018 filed Feb. 12, 2010, and claims the benefit of priority under 35 U.S.C. § 119 from Japanese Patent Application No. 2009-036499, filed Feb. 19, 2009. The entire content of each of the foregoing applications is hereby incorporated by reference into the present application.

The present invention relates to an image processing apparatus and method, and more specifically to an image processing apparatus and method that can generate a high-accuracy prediction image without increasing a processing load.

BACKGROUND ART

Conventionally, encoding schemes using motion compensation and the orthogonal transform such as the discrete cosine transform, Karhunen-Loève transform, or wavelet transform, including MPEG (Moving Picture Experts Group), H.26x, etc., have been generally utilized as encoding schemes in the case of handling moving images. In these moving image encoding schemes, the reduction in amount of code is achieved by utilizing the correlation in the spatial direction and time direction among the characteristics of an input image signal to be encoded.

For example, in H.264, unidirectional prediction or bidirectional prediction is used when an inter-frame that is a frame to be subjected to inter-frame prediction (inter-prediction) is generated utilizing the correlation in the time direction. Inter-frame prediction is designed to generate a prediction image on the basis of frames at different times.

FIG. 1 is a diagram illustrating an example of unidirectional prediction.

As illustrated in FIG. 1, in a case where a frame to be encoded P0 that is a frame at the present time, which is an encoding target, is to be generated through unidirectional prediction, motion compensation is performed using, as reference frames, encoded frames at times in the past or future in time with respect to the present time. The residual between a prediction image and an actual image is encoded by utilizing the correlation in the time direction, thus making it possible to reduce the amount of code. Reference frame information and a motion vector are used, respectively, as information specifying a reference frame and information specifying a position to be referred to in the reference frame, and these pieces of information are transmitted from the encoding side to the decoding side.

Here, the number of reference frames is not limited to one. For example, in H.264, it is possible to use a plurality of frames as reference frames. As illustrated in FIG. 1, in a case where two frames closer in time to the frame to be encoded P0 are denoted by reference frames R0 and R1 in this order, a pixel value in an arbitrary macroblock in the frame to be encoded P0 can be predicted from the pixel value of an arbitrary pixel in the reference frame R0 or R1.

In FIG. 1, a box indicated inside each frame represents a macroblock. If a macroblock in the frame to be encoded P0, which is a prediction target, is represented by a macroblock MBP0, then, the macroblock in the reference frame R0 corresponding to the macroblock MBP0 is a macroblock MBR0 that is specified by a motion vector MV0. Furthermore, the macroblock in the reference frame R1 is a macroblock MBR1 that is specified by a motion vector MV1.

If pixel values in the macroblocks MBR0 and MBR1 (pixel values in motion compensation images) are represented by MC0(i, j) and MC1(i, j), then, a pixel value in either motion compensation image is used as a pixel value in a prediction image in unidirectional prediction. Thus, a prediction image Pred(i, j) is represented by Equation (1) below. (i, j) represents the relative position of a pixel in a macroblock, and satisfies $0 \le i \le 16$ and $0 \le j \le 16$. In Equation (1), "$\|$" indicates that one of the values MC0(i, j) and MC1(i, j) is taken.

[Math. 1]

$$\text{Pred}(i,j) = MC_0(i,j) \| MC_1(i,j) \quad (1)$$

Note that it is also possible to divide a single macroblock of 16×16 pixels into sub-blocks sized by 16×8 pixels or the like and to perform motion compensation on each of the sub-blocks by referring to a different reference frame. Instead of motion vectors with integer accuracy, motion vectors with decimal accuracy are transmitted and interpolation is performed using an FIR filter defined in a standard, thus making it possible to also use the pixel values of pixels around the corresponding position to be referred to for motion compensation.

FIG. 2 is a diagram illustrating an example of bidirectional prediction.

As illustrated in FIG. 2, in a case where a frame to be encoded B0 that is a frame at the present time, which is an encoding target, is to be generated through bidirectional prediction, motion compensation is performed using, as reference frames, encoded frames at times in the past and future in time with respect to the present time. The residual between a prediction image and an actual image is encoded by using a plurality of encoded frames as reference frames and by utilizing the correlation therewith, thus making it possible to reduce the amount of code. In H.264, it is also possible to use a plurality of frames in the past and a plurality of frames in the future as reference frames.

As illustrated in FIG. 2, in a case where one frame in the past and one frame in the future with respect to the frame to be encoded B0 are used as reference frames L0 and L1, a pixel value in an arbitrary macroblock in the frame to be encoded B0 can be predicted from the pixel values of arbitrary pixels in the reference frames L0 and L1.

In the example in FIG. 2, the macroblock in the reference frame $L_0$ corresponding to a macroblock MBB0 in the frame to be encoded B0 is set as a macroblock MBL0 that is specified by a motion vector MV0. Furthermore, the macroblock in the reference frame L1 corresponding to the macroblock MBB0 in the frame to be encoded B0 is set as a macroblock MBL1 that is specified by a motion vector MV1.

If pixel values of the macroblocks MBL0 and MBL1 are represented by MC0(i, j) and MC1(i, j), respectively, then, the pixel value Pred(i, j) of a prediction image Pred(i, j) can be determined as the average value of these pixel values, as given in Equation (2) as follows.

[Math. 2]

$$\text{Pred}(i,j) = (MC_0(i,j) + MC_1(I,J))/2 \quad (2)$$

In such motion compensation as above using unidirectional prediction, the accuracy of a prediction image is improved by increasing the accuracy of a motion vector or by reducing the size of a macroblock, and the residuals from the actual image are reduced, thereby achieving improvement in encoding efficiency.

Furthermore, in motion compensation using bidirectional prediction, the average of the pixel values of pixels in reference frames located close in time is used as the pixel value of a pixel in a prediction image, thus making feasible a probabilistically stable reduction in prediction residual.

FIG. 3 is a diagram illustrating an example of intra-prediction.

In the example in FIG. 3, the way prediction is performed from decoded neighboring pixels in the same screen to decode the current block of an encoded frame I0 is illustrated. In images, nearby pixel values generally have significantly high correlation. Thus, in this manner, prediction from neighboring pixels reduces residual components of the current block. Thereby, improvement in encoding efficiency is realized.

For example, in intra 4×4 prediction based on the H.264 standard, it is possible to predict the current block using nine methods by utilizing nearby encoded pixels. Two-dimensional directivity is incorporated into the correlation with nearby images, thus realizing improvement in prediction accuracy.

As another intra-prediction method, a technique exists in which a high-correlation area is copied from within the screen. Specifically, the technique is such that a specific position in a decoded image is specified in order to decode the current block and therefore the corresponding area is utilized for a prediction image of the current block.

This technique provides high prediction efficiency for a regular pattern or in a case where a plurality of objects having the same shape exist in a screen or in the like case.

As still another intra-prediction method, a technology also exists in which with the analysis of signal components in a characteristic area or a texture area existing in an encoding target image, the amount of code can be reduced by using an artificial synthetic image for an image to be encoded.

In this manner, with the emergence of various technologies for intra-prediction, the prediction accuracy of intra-prediction has been improved. In general moving images, however, the prediction accuracy of inter-prediction is still higher because, for example, even considerably complicated texture would provide almost zero prediction residual as a result of inter-prediction although it is difficult to increase the accuracy of intra-prediction in the case of stationary texture in a screen.

Furthermore, as another prediction method, a technique has been considered in which the correlation in the time direction is converted into the spatial resolution by motion compensation and FIR filtering of pixel values and the spatial resolution is utilized (see, for example, NPL 1).

In the method described in NPL 1, the correlation in the time direction is utilized for the process of increasing the resolution of an input image sequence. Specifically, difference information on a motion-predicted/compensated image between the current image and the previous image is calculated, and is fed back to the target current image to recover the high-frequency components included in the input image.

CITATION LIST

Non Patent Literature

NPL 1: "Improving Resolution by Image Registration", MICHAL IRANI AND SHMUEL PELEG, Department of Computer Science, The Hebrew University of Jerusalem, 91904 Jerusalem, Israel, Communicated by Rama Chellapa, Received Jun. 16, 1989; accepted May 25, 1990

SUMMARY OF INVENTION

Technical Problem

In the case of conventional inter-prediction, the use of a plurality of reference frames requires the processing cost for motion prediction or motion compensation or necessary cost such as the cost for the memory capacity for saving reference planes to be higher than that in the case of intra-prediction. This similarly applies to the method described in NPL 1.

On the other hand, in the case of intra-prediction, the processing cost for generating a prediction image is lower than that in inter-prediction; however, due to the low prediction accuracy of an image generated, there has been a problem in that the encoding efficiency is poorer than that in the case of inter-prediction.

The present invention has been made in view of the above situation, and is intended to realize improvement in encoding efficiency by compensating for the lack of prediction accuracy of intra-prediction by using the prediction accuracy of inter-prediction and to realize a reduction in processing cost by reducing the number of reference planes necessary for inter-prediction.

Solution to Problem

One aspect of the present invention provides an image processing apparatus including decoding means for decoding an encoded image; generating means for adding together the image decoded by the decoding means and a prediction image, and for generating a decoded image; extracting means for performing motion compensation using, as a reference frame, a frame formed of the decoded image generated by the generating means and using a motion vector in the encoded image, and for extracting a motion compensation image corresponding to the prediction image from the reference frame; intra-prediction image generating means for performing intra-frame prediction for a present frame for which the prediction image is to be generated, and for generating an intra-prediction image corresponding to the prediction image from a portion of the decoded image generated by the generating means; and prediction image generating means for generating the prediction image by performing a filtering process for compensating the motion compensation image extracted by the extracting means and the intra-prediction image generated by the intra-prediction image generating means for high-frequency components by utilizing correlation in a time direction that is included in the motion compensation image and the intra-prediction image.

The prediction image generating means can include first filter means for applying a low-pass filter to a difference image between the motion compensation image extracted by the first extracting means and the intra-prediction image generated by the intra-prediction image generating means; second filter means for applying a high-pass filter to an image obtained by applying a low-pass filter by using the first filter means; and adding means for adding the image obtained by applying a low-pass filter by using the first filter means and an image obtained by applying a high-pass filter by using the second filter means to the intra-prediction image generated by the intra-prediction image generating means, and for generating the prediction image.

The adding means can add the image obtained by applying a low-pass filter by using the first filter means and the image obtained by applying a high-pass filter by using the second filter means to a motion compensation image extracted from a preceding frame with respect to a time of the prediction image.

The image processing apparatus can further include unidirectional prediction means for performing unidirectional prediction using a plurality of motion compensation images, and for generating the prediction image; bidirectional prediction means for performing bidirectional prediction using a plurality of motion compensation images, and for generating the prediction image; and judging means for judging whether the prediction image is to be generated through unidirectional prediction by the unidirectional prediction means, generated through bidirectional prediction by the bidirectional prediction means, or generated through the filtering process by the prediction image generating means, by using an identification flag included in a header of the encoded image.

One aspect of the present invention further provides an image processing method including decoding an encoded image; adding together an image that has been decoded and a prediction image and generating a decoded image; performing motion compensation using, as a reference frame, a frame formed of the generated decoded image and using a motion vector in the encoded image, and extracting a motion compensation image corresponding to the prediction image from the reference frame; performing intra-frame prediction for a present frame for which the prediction image is to be generated, and generating an intra-prediction image corresponding to the prediction image from a portion of the decoded image; and generating the prediction image by performing a filtering process for compensating the motion compensation image and the intra-prediction image for high-frequency components by utilizing correlation in a time direction that is included in the motion compensation image and the intra-prediction image.

Another aspect of the present invention provides an image processing apparatus including encoding means for encoding an original image that is an encoding target image, and for generating an encoded image; detecting means for detecting a motion vector on the basis of an image and the original image, the image being obtained by performing local decoding on the basis of a residual signal indicating a difference between the original image and a prediction image; extracting means for performing motion compensation using, as a reference frame, a frame formed of the image obtained by performing local decoding and using the motion vector detected by the detecting means, and for extracting a motion compensation image corresponding to the prediction image from the reference frame; intra-prediction image generating means for performing intra-frame prediction for a present frame for which the prediction image is to be generated, and for generating an intra-prediction image corresponding to the prediction image from a portion of an image of the frame; and generating means for generating the prediction image by performing a filtering process for compensating the motion compensation image extracted by the first extracting means and the intra-prediction image generated by the intra-prediction image generating means for high-frequency components by utilizing correlation in a time direction that is included in the motion compensation image.

The generating means can include first filter means for applying a low-pass filter to a difference image between the motion compensation image extracted by the first extracting means and the intra-prediction image generated by the intra-prediction image generating means; second filter means for applying a high-pass filter to an image obtained by applying a low-pass filter by using the first filter means; and adding means for adding the image obtained by applying a low-pass filter by using the first filter means and an image obtained by applying a high-pass filter by using the second filter means to the intra-prediction image generated by the intra-prediction image generating means, and for generating the prediction image.

The adding means can add the image obtained by applying a low-pass filter by using the first filter means and the image obtained by applying a high-pass filter by using the second filter means to a motion compensation image extracted from a preceding frame with respect to a time of the prediction image.

The encoding means can incorporate an identification flag into a header of the encoded image, the identification flag identifying whether a prediction image to be added to an image decoded by a decoding apparatus is to be generated through unidirectional prediction, generated through bidirectional prediction, or generated through the filtering process.

Another aspect of the present invention further provides an image processing method including encoding an original image that is an encoding target image, and generating an encoded image; detecting a motion vector on the basis of an image and the original image, the image being obtained by performing local decoding on the basis of a residual signal indicating a difference between the original image and a prediction image; performing motion compensation using, as a reference frame, a frame formed of the image obtained by performing local decoding and using the detected motion vector, and extracting a motion compensation image corresponding to the prediction image from the reference frame; performing intra-frame prediction for a present frame for which the prediction image is to be generated, and generating an intra-prediction image corresponding to the prediction image from a portion of an image of the frame; and generating the prediction image by performing a filtering process for compensating the extracted motion compensation image and the generated intra-prediction image for high-frequency components by utilizing correlation in a time direction that is included in the motion compensation image.

In one aspect of the present invention, an encoded image is decoded; an image that has been decoded and a prediction image are added together; a decoded image is generated; motion compensation is performed using, as a reference frame, a frame formed of the generated decoded image and using a motion vector in the encoded image; a motion compensation image corresponding to the prediction image is extracted from the reference frame; intra-frame prediction is performed for a present frame for which the prediction image is to be generated; an intra-prediction image corresponding to the prediction image is generated from a portion of the decoded image; and a filtering process for compensating the motion compensation image and the intra-prediction image for high-frequency components by utilizing correlation in a time direction that is included in the motion compensation image and the intra-prediction image is performed, thereby generating the prediction image.

In another aspect of the present invention, an original image that is an encoding target image is encoded; an encoded image is generated; a motion vector is detected on the basis of an image and the original image, the image being obtained by performing local decoding on the basis of a residual signal indicating a difference between the original image and a prediction image; motion compensation is performed using, as a reference frame, a frame formed of the image obtained by performing local decoding and using the detected motion vector; a motion compensation image corresponding to the prediction image is extracted from the reference frame; intra-frame prediction is performed for a present frame for which the prediction image is to be generated; an intra-prediction image corresponding to the prediction image is generated from a portion of an image of the frame; and a filtering process for compensating the extracted motion compensation image and the generated intra-prediction image for high-frequency components by utilizing correlation in a time direction that is included in the motion compensation image is performed, thereby generating the prediction image.

Advantageous Effects of Invention

According to the present invention, a high-accuracy prediction image can be generated and high encoding efficiency can be achieved without increasing the amount of transmission of motion vectors in a stream.

BRIEF DESCRIPTION OF DRAWINGS

FIG. 32 is a diagram illustrating examples of the size of a macroblock.

DESCRIPTION OF EMBODIMENTS

Modes for carrying out the invention (hereinafter, embodiments) will be explained hereinafter. Note that the explanation will be given in the following order:
1. First Embodiment (decoding process)
2. Second Embodiment (encoding process)
3. Third Embodiment (modifications of filtering circuit)

1. First Embodiment

[Overview of Prediction]

Figure 4:
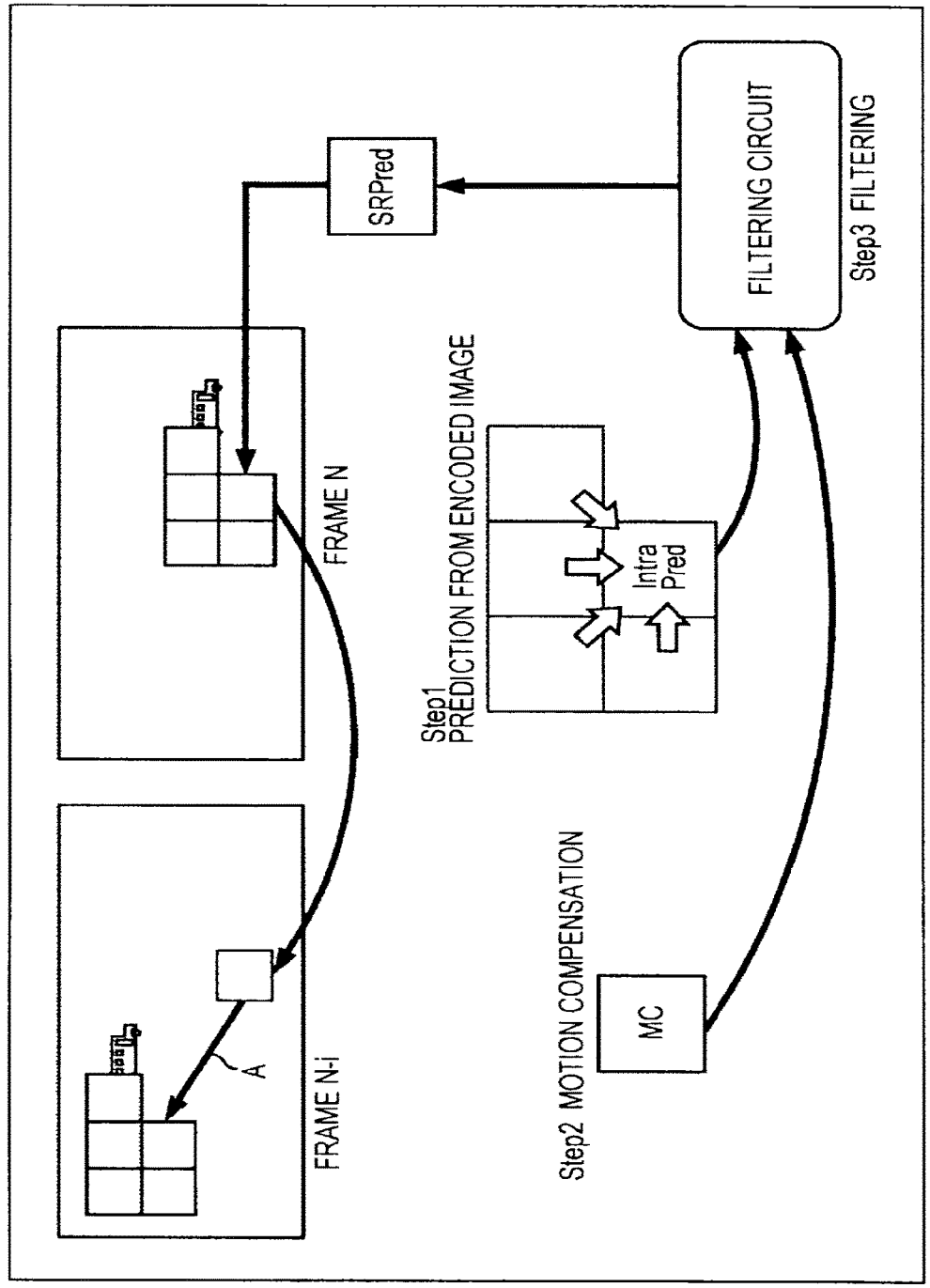
FIG. 4 is a diagram explaining an overview of the generation of a prediction image in the present invention.

FIG. 4 is a diagram explaining an overview of a prediction image generation method to which the present invention is applied. In the present invention, in a decoder, at least one motion vector is transmitted through a bit stream in order to obtain a motion compensation image.

In FIG. 4, the way a single frame (N−1) is used for a reference plane for use in motion compensation in order to decode a frame N is illustrated. In FIG. 4, a motion vector for indicating the coordinates of an image to be subjected to motion compensation for the frame (N−1) is transmitted by a stream. The decoder uses this vector to obtain an image MC.

Furthermore, intra-prediction is performed utilizing a decoded pixel value in the frame N. In this prediction, for example, intra-prediction based on the H.264 standard is used. However, the present invention does not limit the type of intra-prediction process, and any prediction suitable for higher-accuracy prediction using the subsequent filtering process by utilizing an encoded pixel in the current frame may be selected.

With the above two prediction processes, the decoder can obtain a motion prediction image from the frame (N−1) and a spatial prediction image from the frame N when decoding the current block. The two types of images are subjected to a filtering process to generate a new prediction image closer to the original image by utilizing components included in an input prediction image.

[Configuration of Decoding Apparatus]

Figure 5:
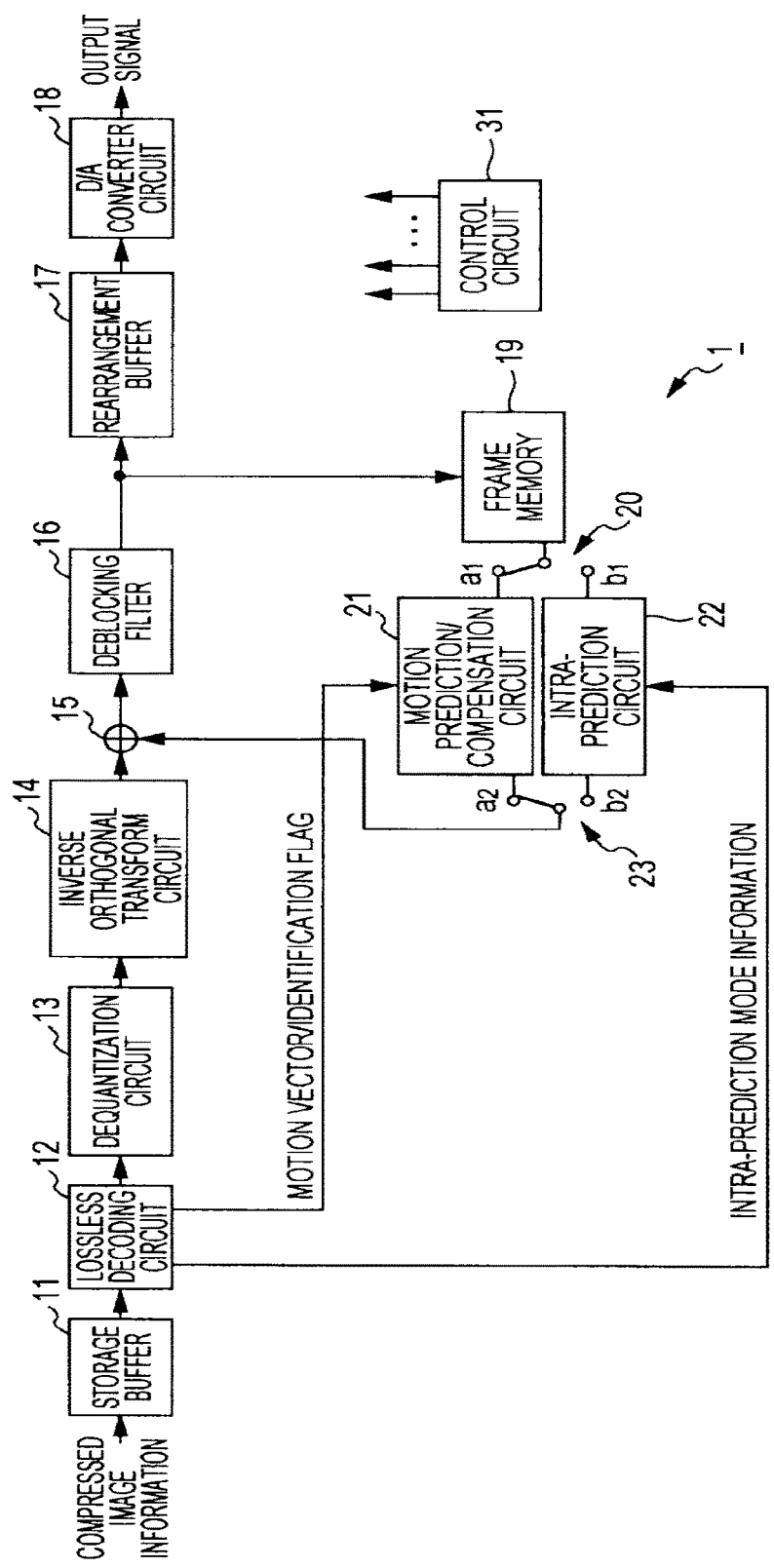
FIG. 5 is a block diagram illustrating an example configuration of a decoding apparatus according to an embodiment of the present invention.

FIG. 5 is a block diagram illustrating an example configuration of a decoding apparatus 1 according to an embodiment of the present invention.

Image information encoded by an encoding apparatus described below is input to the decoding apparatus 1 via a cable, a network, or a removable medium. Examples of the compressed image information include image information encoded in accordance with the H.264 standard.

A storage buffer 11 sequentially stores bit streams input as compressed image information. The information stored in the storage buffer 11 is read by a lossless decoding circuit 12 in units of images of certain units such as macroblocks forming a frame, as appropriate. In the H.264 standard, it is also possible to perform processing, instead of in units of macroblocks of 16×16 pixels, in units of blocks into which a macroblock is further divided, such as blocks of 8×8 pixels or 4×4 pixels.

The lossless decoding circuit 12 performs a decoding process corresponding to an encoding scheme, such as a variable-length decoding process or an arithmetic decoding process, on an image read from the storage buffer 11. The lossless decoding circuit 12 outputs a quantized transform coefficient, which is obtained by performing the decoding process, to a dequantization circuit 13.

Furthermore, the lossless decoding circuit 12 identifies, on the basis of an identification flag included in the header of the image to be decoded, whether this image is an intra-coded image or an inter-coded image. In a case where it is judged that the image to be decoded is an intra-coded image, the lossless decoding circuit 12 outputs intra-prediction mode information stored in the header of the image to an intra-prediction circuit 22. The intra-prediction mode information includes information regarding intra-prediction, such as the size of a block used as a unit of processing.

In a case where it is judged that the image to be decoded is inter-coded information, the lossless decoding circuit 12 outputs motion vectors and an identification flag that are stored in the header of the image to a motion prediction/compensation circuit 21. The mode of prediction in which a prediction image is to be generated through inter-prediction is identified using the identification flag. Identification flags are set in units of, for example, macroblocks or frames.

Figure 1:
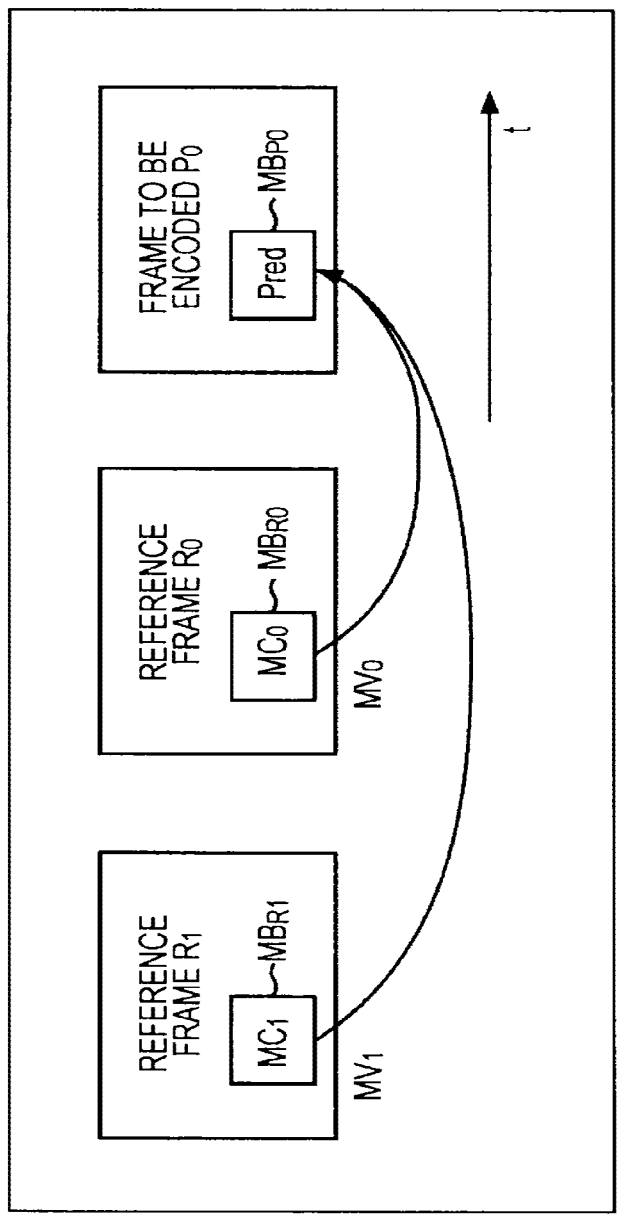
FIG. 1 is a diagram illustrating an example of unidirectional prediction.
Figure 2:
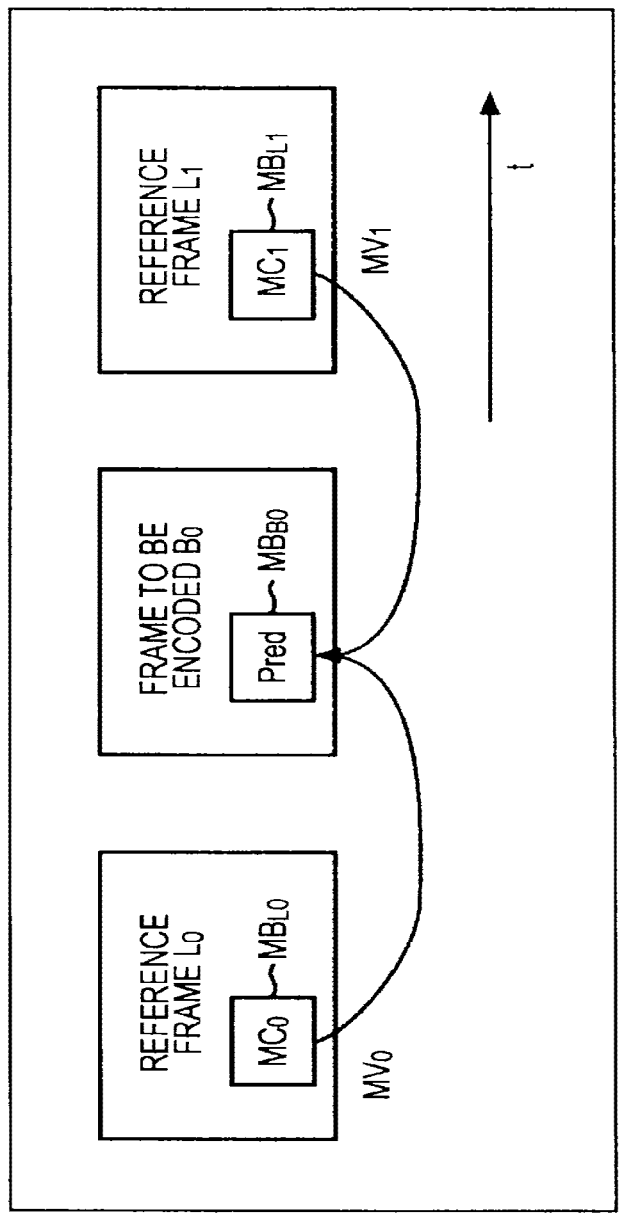
FIG. 2 is a diagram illustrating an example of bidirectional prediction.
Figure 3:
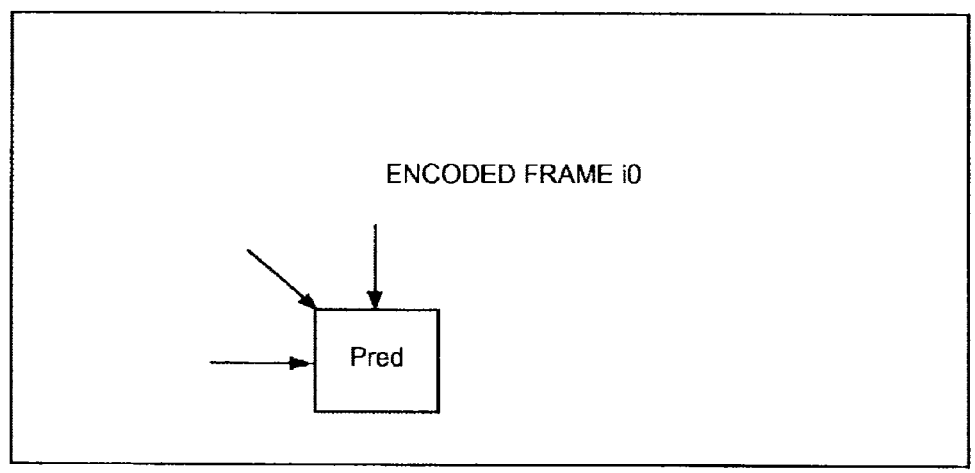
FIG. 3 is a diagram illustrating an example of intra-prediction.

In addition to the mode of unidirectional prediction in FIG. 1 and the mode of bidirectional prediction in FIG. 2, the modes of prediction that are prepared include a third prediction mode for generating a prediction image by performing filtering on motion compensation images extracted from a plurality of reference frames located in one or both temporal directions.

Figure 6:
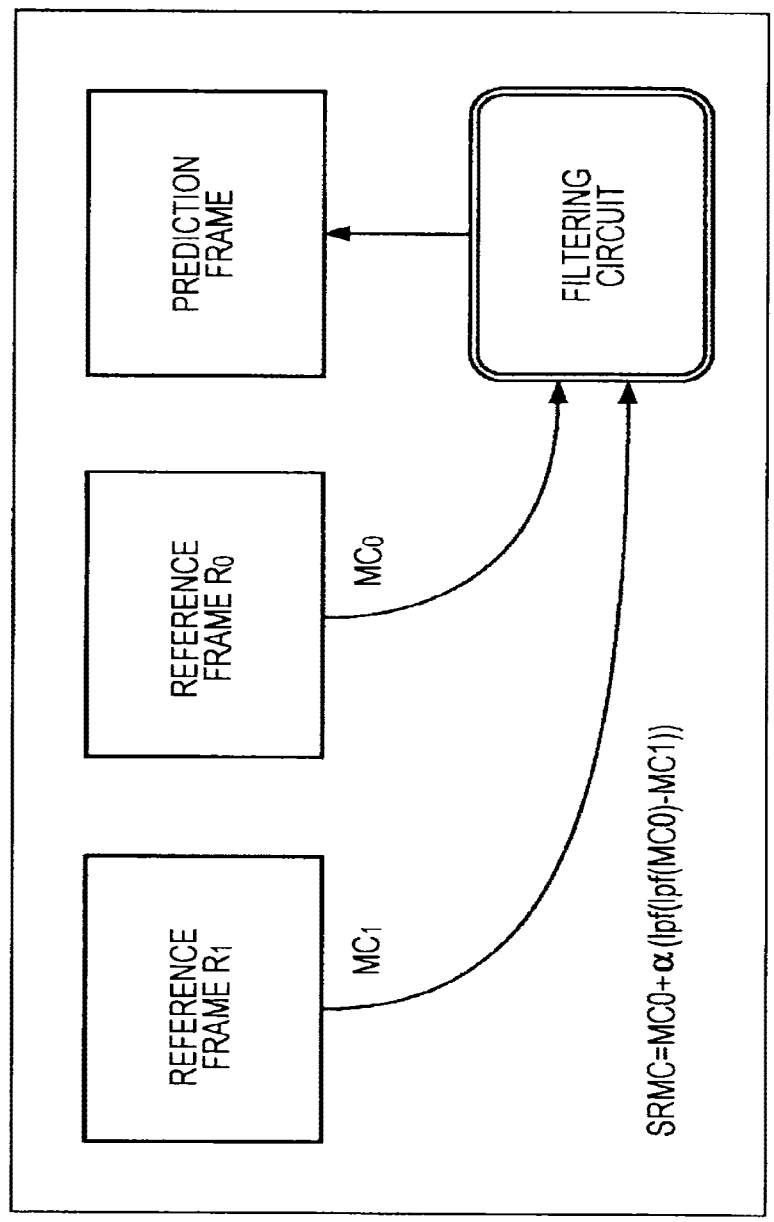
FIG. 6 is a diagram illustrating a concept of a third prediction mode.

FIG. 6 is a diagram illustrating an concept of the third prediction mode.

In the example in FIG. 6, the temporally preceding frame with respect to the time of the present frame (prediction frame) is set as a reference frame R0, and the preceding frame with respect to the reference frame R0 is set as a reference frame R1. In this case, according to the third prediction mode, motion compensation images MC0 and MC1 extracted from the reference frames R0 and R1 are input to a filtering circuit, and a pixel value in an image output from the filtering circuit is set as a pixel value in a prediction image that is the target macroblock.

Figure 7:
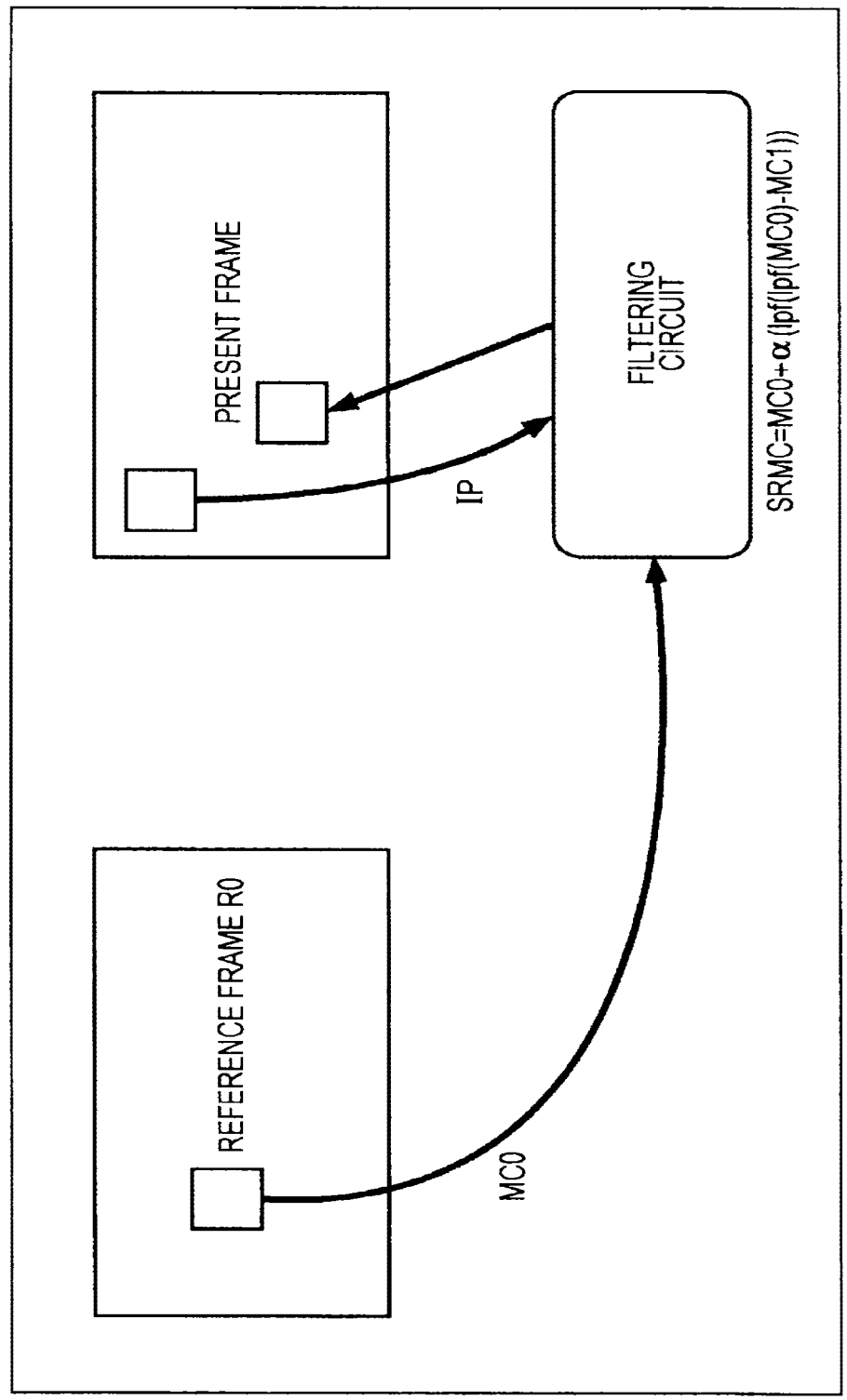
FIG. 7 is a diagram illustrating a concept of the third prediction mode.

FIG. 7 is a diagram illustrating a concept in a case where different images are input in the third prediction mode.

In the example in FIG. 7, the temporally preceding frame with respect to the time of the present frame (prediction frame) is set as a reference frame R0. In this case, for the sake of the third prediction mode, a motion compensation image MC0 extracted from the reference frame R0 and an intra-prediction image IP generated from an encoded image that is located near the current block in the present frame are input to a filtering circuit, and a pixel value in an image output from the filtering circuit is set as a pixel value in a prediction image that is the target macroblock.

Hereinafter, the mode of prediction, as explained with reference to FIG. 1, in which a pixel value in one motion compensation image among motion compensation images extracted from a plurality of reference frames located in one direction is set as a pixel value in a prediction image is simply referred to as a unidirectional prediction mode. Furthermore, the mode of prediction, as explained with reference to FIG. 2, in which the average value of pixel values in motion compensation images individually extracted from a plurality of reference frames located in both directions is set as a pixel value in a prediction image is simply referred to as a bidirectional prediction mode.

The third mode of prediction, as illustrated in FIG. 6, in which a pixel value in a prediction image is determined by performing filtering on each of motion compensation images extracted from a plurality of reference frames located in one or both directions is referred to as a filtering prediction mode.

Similarly, the third mode of prediction, as illustrated in FIG. 7, in which a pixel value in a prediction image is determined by performing filtering on, in addition to each motion compensation image extracted from one or a plurality of reference frames, an intra-prediction image extracted by performing intra-prediction from an encoded image in the present frame is also referred to as a filtering prediction mode. This filtering prediction mode will be described in detail below.

Referring back to FIG. 5, the dequantization circuit 13 performs dequantization on the quantized transform coefficient supplied from the lossless decoding circuit 12 using a scheme corresponding to the quantization scheme used on the encoding side. The dequantization circuit 13 outputs a transform coefficient obtained by performing dequantization to an inverse orthogonal transform circuit 14.

The inverse orthogonal transform circuit 14 performs, for example, the fourth-order inverse orthogonal transform on the transform coefficient supplied from the dequantization circuit 13 using a scheme corresponding to the orthogonal transform scheme used on the encoding side, such as the discrete cosine transform or Karhunen-Loève transform, and outputs an obtained image to an adder circuit 15.

The adder circuit 15 combines the decoded image supplied from the inverse orthogonal transform circuit 14 and a prediction image supplied from the motion prediction/compensation circuit 21 or from the intra-prediction circuit 22 via a switch 23, and outputs a composite image to a deblocking filter 16.

The deblocking filter 16 removes block noise included in the image supplied from the adder circuit 15, and outputs an image from which the block noise has been removed. The image output from the deblocking filter 16 is supplied to a rearrangement buffer 17 and a frame memory 19.

The rearrangement buffer 17 temporarily stores the image supplied from the deblocking filter 16. The rearrangement buffer 17 generates an individual frame from an image of, for example, every macroblock that is stored, and rearranges the generated frames in certain order such as display order before outputting them to a D/A (Digital/Analog) converter circuit 18.

The D/A converter circuit 18 performs D/A conversion on each of the frames supplied from the rearrangement buffer 17, and outputs the signals of the frames to outside.

The frame memory 19 temporarily stores the image supplied from the deblocking filter 16. The information stored in the frame memory 19 is supplied to the motion prediction/compensation circuit 21 or the intra-prediction circuit 22 via a switch 20.

The switch 20 is connected to a terminal a1 in a case where a prediction image is to be generated through inter-prediction, and is connected to a terminal b1 in a case where a prediction image is to be generated through intra-prediction. The switching of the switch 20 is controlled by, for example, a control circuit 31.

The motion prediction/compensation circuit 21 determines a prediction mode in accordance with the identification flag supplied from the lossless decoding circuit 12, and selects a frame to be used as a reference frame, from among decoded frames that are stored in the frame memory 19, in accordance with the prediction mode. The motion prediction/compensation circuit 21 determines a macroblock corresponding to the target prediction image from among macroblocks forming the reference frame on the basis of the motion vectors supplied from the lossless decoding circuit 12, and extracts the determined macroblock as a motion compensation image. The motion prediction/compensation circuit 21 determines a pixel value in a prediction image from a pixel value in the motion compensation image in accordance with the prediction mode, and outputs the prediction image whose pixel values have been determined to the adder circuit 15 via the switch 23.

The intra-prediction circuit 22 performs intra-prediction in accordance with the intra-prediction mode information supplied from the lossless decoding circuit 12, and generates a prediction image. The intra-prediction circuit 22 outputs the generated prediction image to the adder circuit 15 via the switch 23.

The switch 23 is connected to a terminal a2 in a case where a prediction image has been generated by the motion prediction/compensation circuit 21, and is connected to a terminal b2 in a case where a prediction image has been generated by the intra-prediction circuit 22. The switching of the switch 23 is also controlled by, for example, the control circuit 31.

The control circuit 31 controls the overall operation of the decoding apparatus 1 by, for example, switching the connection of the switches 20 and 23. The identification of whether the processing target image is an intra-coded image or an inter-coded image may be performed by the control circuit 31.

Figure 8:
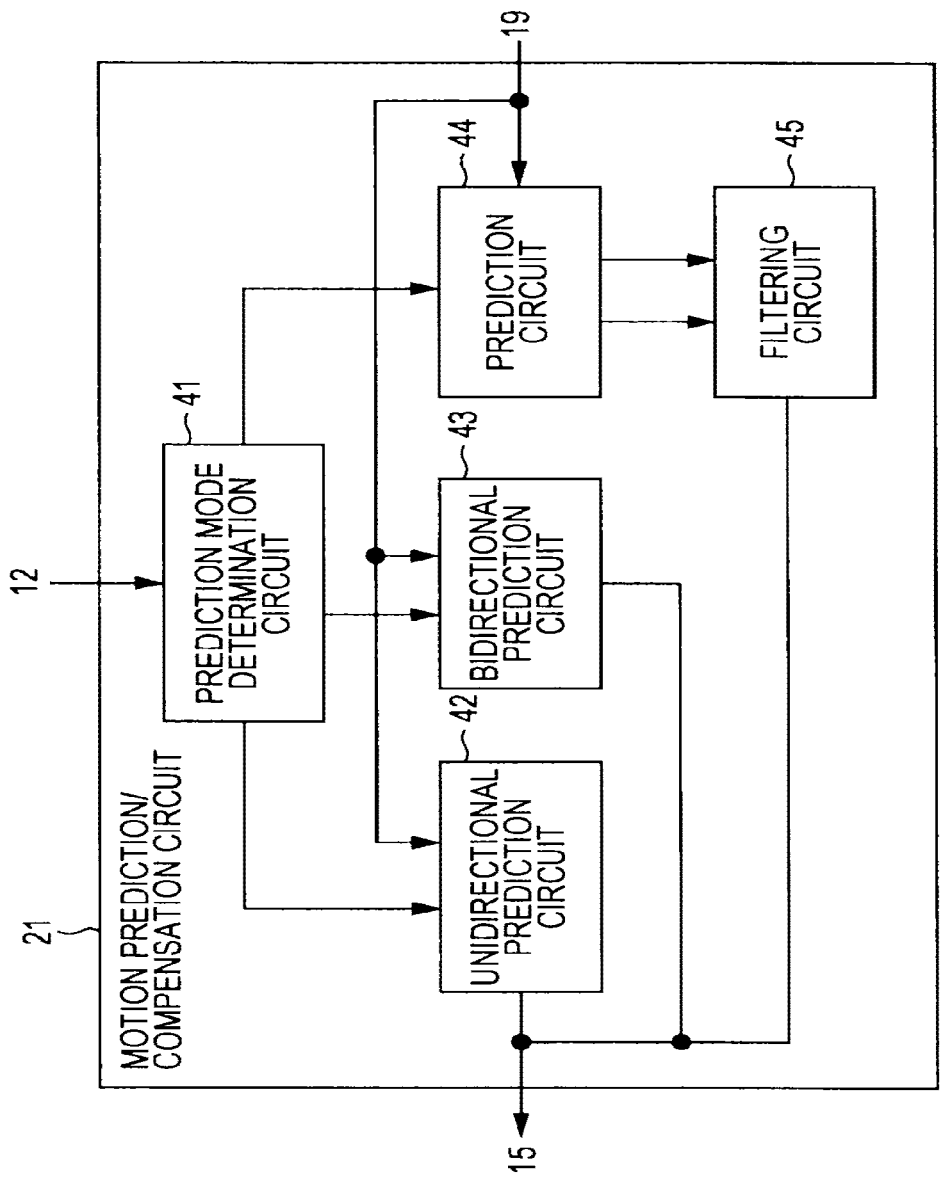
FIG. 8 is a block diagram illustrating an example configuration of a motion prediction/compensation circuit in FIG. 5.

FIG. 8 is a block diagram illustrating an example configuration of the motion prediction/compensation circuit 21 in FIG. 5.

As illustrated in FIG. 8, the motion prediction/compensation circuit 21 is composed of a prediction mode determination circuit 41, a unidirectional prediction circuit 42, a bidirectional prediction circuit 43, a prediction circuit 44, and a filtering circuit 45. The motion vectors and identification flag supplied from the lossless decoding circuit 12 are input to the prediction mode determination circuit 41.

The prediction mode determination circuit 41 determines a prediction mode in accordance with the identification flag supplied from the lossless decoding circuit 12. The prediction mode determination circuit 41 outputs the motion vectors to the unidirectional prediction circuit 42 in a case where it is determined that a prediction image is to be generated through unidirectional prediction, and outputs the motion vectors to the bidirectional prediction circuit 43 in a case where it is determined that a prediction image is to be generated through bidirectional prediction. Furthermore, in a case where it is determined that a prediction image is to be generated through filtering prediction, the prediction mode determination circuit 41 outputs the motion vectors to the prediction circuit 44.

In this manner, a value different from a value representing unidirectional prediction and a value representing bidirectional prediction, which are defined in the conventional H.264 standard, can be set as the value of an identification flag, in order to enable identification of filtering prediction. Note that a prediction mode may be determined using a method determined in advance, instead of being determined in accordance with an identification flag, to reduce the amount of information.

The unidirectional prediction circuit 42 sets, as illustrated in FIG. 1, a plurality of frames located in one temporal direction as reference frames, and determines macroblocks in the reference frames corresponding to a prediction image on the basis of motion vectors. Furthermore, the unidirectional prediction circuit 42 generates a prediction image by reading each of the determined macroblocks in the reference frames from the frame memory 19 as a motion compensation image and by setting a pixel value in one of the motion compensation images as a pixel value in the prediction image. The unidirectional prediction circuit 42 outputs the prediction image to the adder circuit 15. For example, unidirectional prediction defined in the H.264 standard is used as the unidirectional prediction performed by the unidirectional prediction circuit 42.

The bidirectional prediction circuit 43 sets, as illustrated in FIG. 2, a plurality of frames located in temporal both directions as reference frames, and determines macroblocks in the reference frames corresponding to a prediction image on the basis of motion vectors. Furthermore, the bidirectional prediction circuit 43 generates a prediction image by reading each of the determined macroblocks in the reference frames from the frame memory 19 as a motion compensation image and by setting the averages of pixel values in the read motion compensation images as a pixel value in the prediction image. The bidirectional prediction circuit 43 outputs the prediction image to the adder circuit 15. For example, bidirectional prediction defined in the H.264 standard is used as the bidirectional prediction performed by the bidirectional prediction circuit 43.

The prediction circuit 44 determines a plurality of frames located in one or both temporal directions as reference frames. Which frames are to be used as reference frames may be determined in advance or may be specified by information transmitted from the encoding side together with an identification flag.

Figure 9:
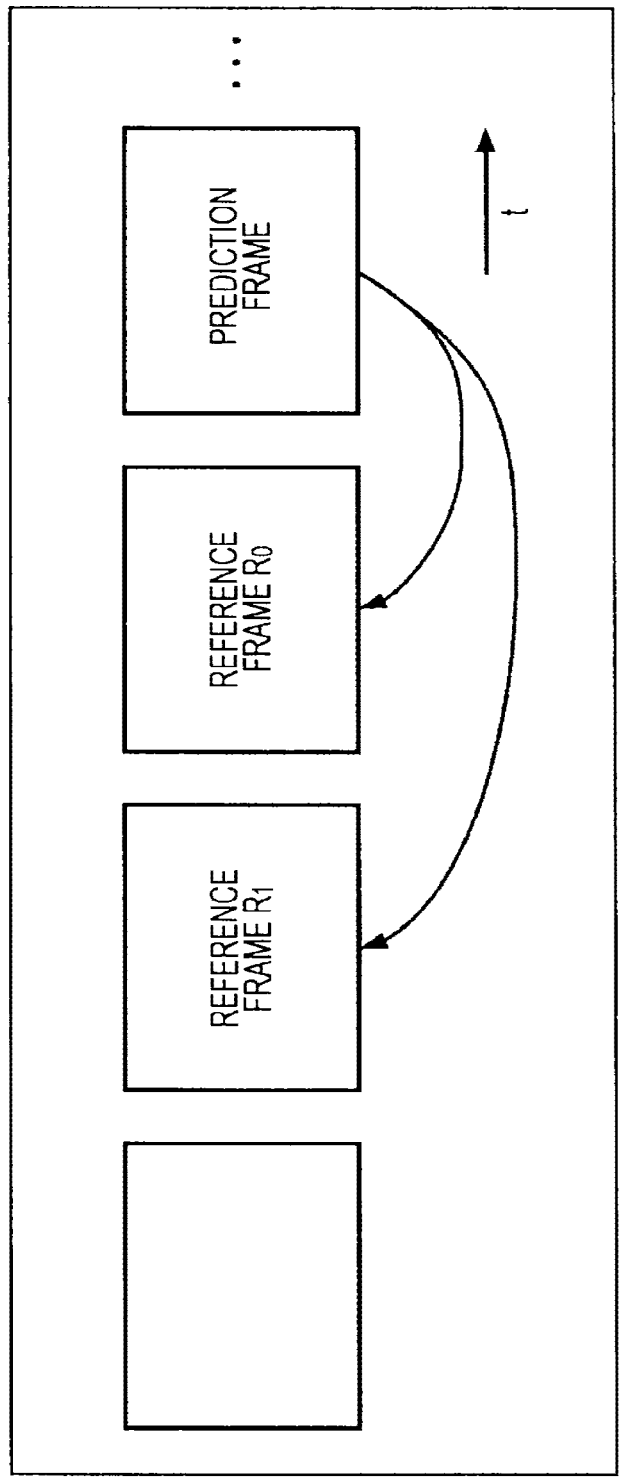
FIG. 9 is a diagram illustrating an example of reference frames.

FIG. 9 is a diagram illustrating an example of reference frames.

In the example in FIG. 9, the temporally preceding frame with respect to the time of a prediction frame and the further preceding frame, i.e., two frames, are set as reference frames. Of the two reference frames, the preceding frame closer to the prediction frame is set as a reference frame R0, and the preceding frame with respect to the reference frame R0 is set as a reference frame R1.

Figure 10:
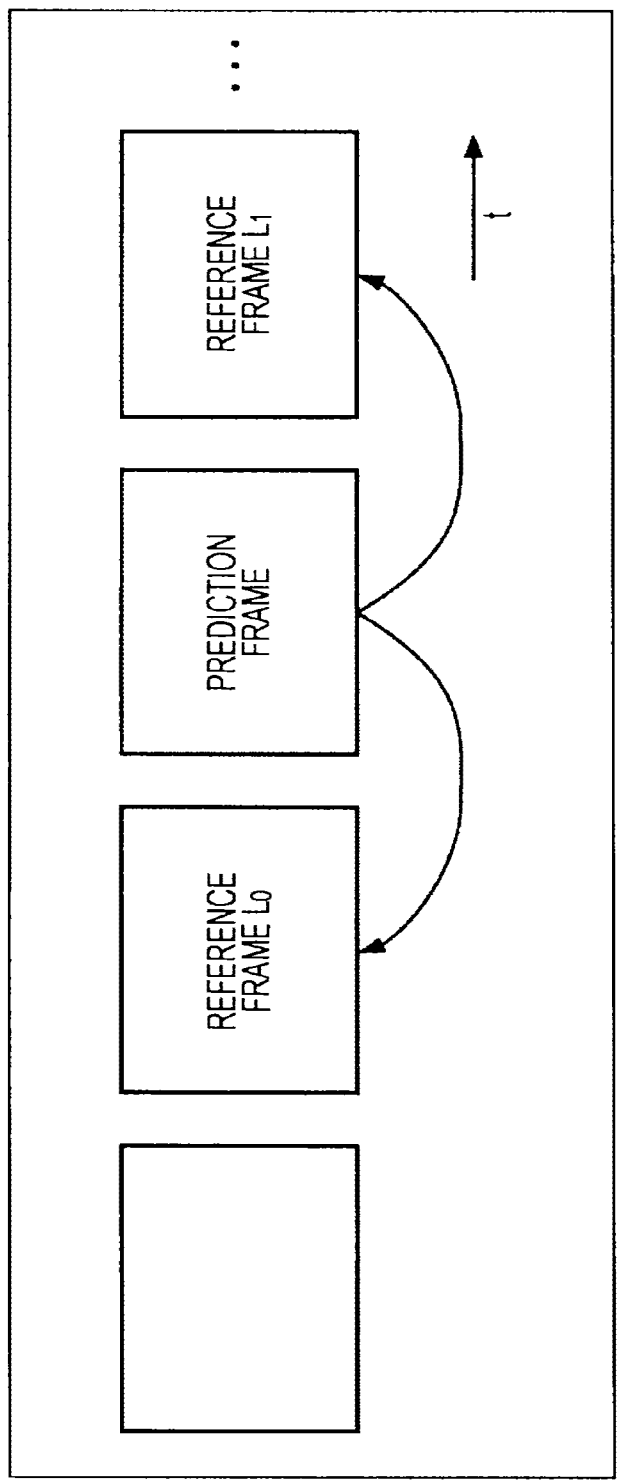
FIG. 10 is a diagram illustrating another example of reference frames.

FIG. 10 is a diagram illustrating another example of reference frames.

In the example in FIG. 10, the temporally preceding and following frames with respect to the time of a prediction frame, i.e., two frames, are set as reference frames. Of the two reference frames, the preceding frame with respect to the prediction frame is set as a reference frame L0, and the following frame is set as a reference frame L1.

In this manner, in filtering prediction, a plurality of frames located in one temporal direction or a plurality of frames located in both directions are used as reference frames.

Furthermore, the prediction circuit 44 determines a macroblock corresponding to the prediction image, among decoded macroblocks in at least one reference frame among the reference frames determined in the manner as illustrated in FIG. 9 or 10, on the basis of the motion vectors supplied from the prediction mode determination circuit 41.

Moreover, as explained with reference to FIG. 7, the prediction circuit 44 performs intra-prediction on the current frame in accordance with, for example, the H.264 standard.

The prediction circuit 44 reads the determined macroblock in each of the reference frames from the frame memory 19 as an intra-prediction image, and outputs the read intra-prediction images to the filtering circuit 45.

That is to say, the prediction circuit 44 extracts a motion compensation image on the basis of a motion vector from a reference frame other than the current frame, and also generates an intra-prediction image by performing intra-prediction on the current frame.

Note that motion vectors may be determined, instead of in units of macroblocks of 16×16 pixels or the like, in units of blocks into which a macroblock is further divided. An image of, for example, every macroblock is input to the filtering circuit 45. In FIG. 8, the representation of two arrows as arrows directed from the prediction circuit 44 to the filtering circuit 45 indicates that two motion compensation images are supplied.

The filtering circuit 45 receives, as inputs, the motion compensation images supplied from the prediction circuit 44, performs filtering, and outputs a prediction image obtained by performing filtering to the adder circuit 15.

Figure 11:
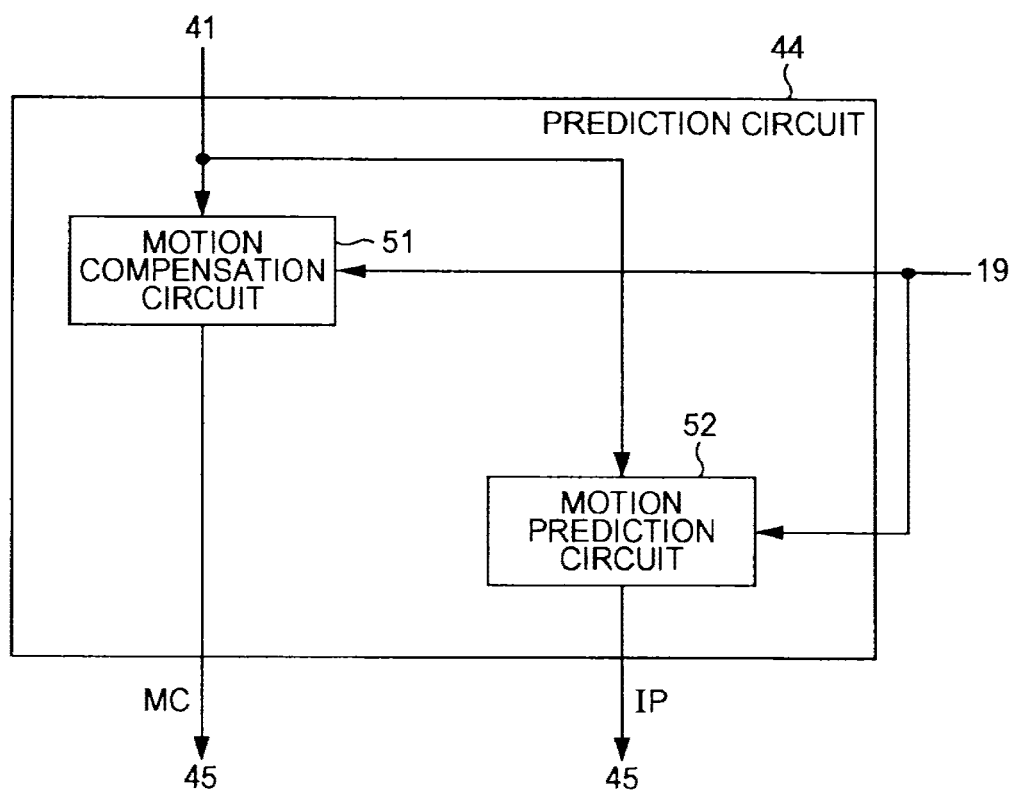
FIG. 11 is a block diagram illustrating an example configuration of a prediction circuit in FIG. 8.

FIG. 11 is a block diagram illustrating an example configuration of the prediction circuit 44 in FIG. 6. In FIG. 11, the prediction circuit 44 includes a motion compensation circuit 51 and an intra-prediction circuit 52.

The motion compensation circuit 51 specifies a macroblock corresponding to the prediction image in a reference frame other than the current frame using the motion vectors supplied from the prediction mode determination circuit 41. The motion compensation circuit 51 reads the image of the specified macroblock from the frame memory 19, and extracts the read image as a motion compensation image. The motion compensation circuit 51 supplies the extracted motion compensation image MC0 to the filtering circuit 45.

The intra-prediction circuit 52 performs intra-prediction (intra-frame prediction) on the current frame (present frame) using an arbitrary method, and generates an intra-prediction image IP corresponding to the desired prediction image as the prediction result. Here, in order to perform intra-prediction, for example, H.264 intra 4×4 prediction, intra 8×8 prediction, or intra 16×16 prediction is used. In a case where the above intra-prediction is used, control information for uniquely defining a prediction method on the decoder side is described in a stream and is transmitted. The intra-prediction circuit 52 supplies the generated intra-prediction image IP to the filtering circuit 45.

Figure 12:
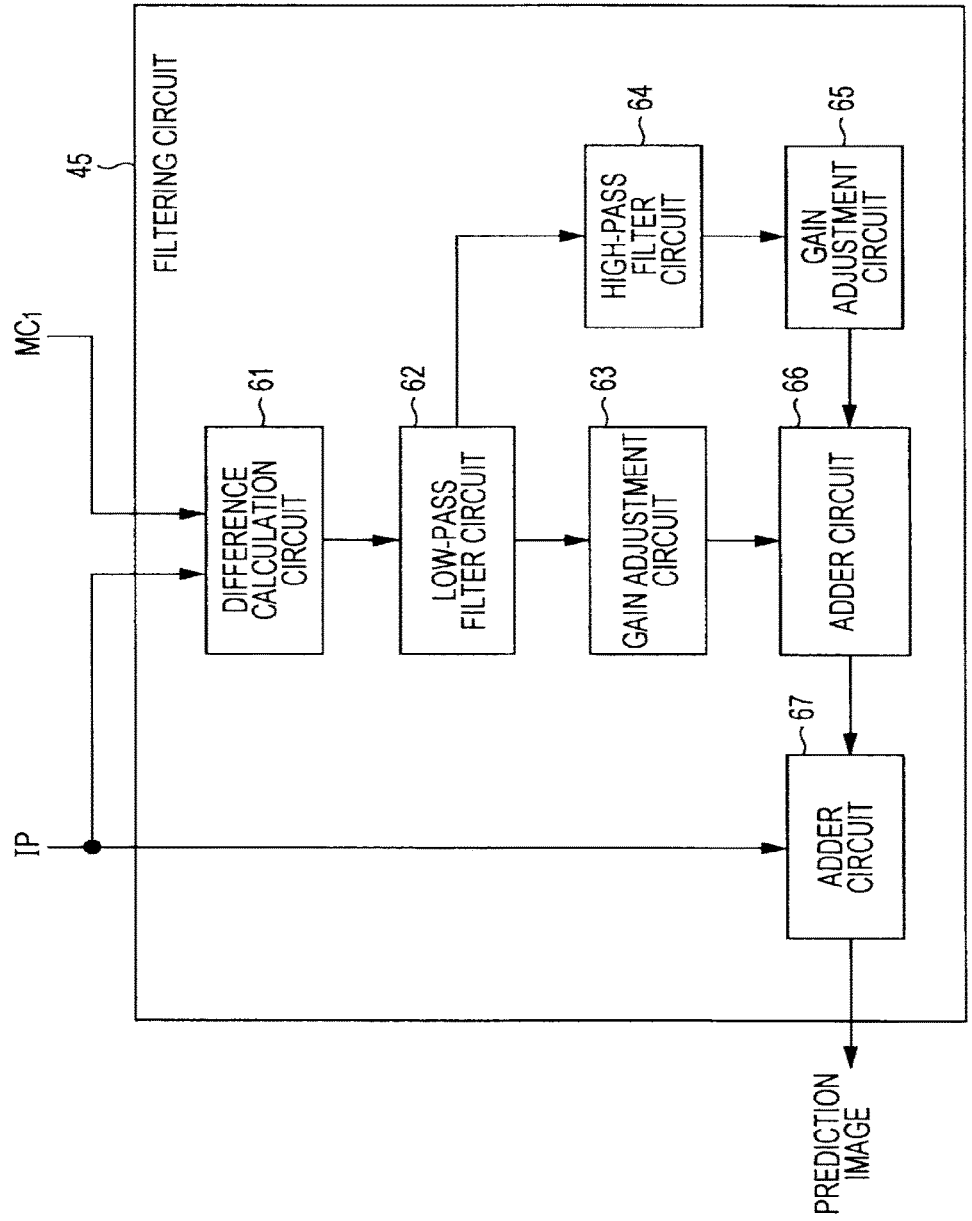
FIG. 12 is a block diagram illustrating an example configuration of a filtering circuit in FIG. 8.

FIG. 12 is a block diagram illustrating an example configuration of the filtering circuit 45. In the filtering circuit 45 having the configuration in FIG. 12, filtering is performed on time domain signals.

As illustrated in FIG. 12, the filtering circuit 45 is composed of a difference calculation circuit 61, a low-pass filter circuit 62, a gain adjustment circuit 63, a high-pass filter circuit 64, a gain adjustment circuit 65, an adder circuit 66, and an adder circuit 67. The motion compensation image MC0 supplied from the prediction circuit 44 is input to the difference calculation circuit 61 and the adder circuit 67, and the motion compensation image MC1 is input to the difference calculation circuit 61.

As described above, in a case where a prediction image is generated through intra-prediction, for example, an image generated in the current frame is set as the intra-prediction image IP, and an image extracted from a reference frame other than the current frame is set as the motion compensation image MC1.

Note that in a case where a prediction image is generated through unidirectional prediction in the manner as illustrated in FIG. 9, for example, an image extracted from the reference frame R0, which can be considered to have higher correlation with the prediction image, is set as the motion compensation image MC0, and an image extracted from the reference frame R1 is set as the motion compensation image MC1. The image extracted from the reference frame R0 may be designed to be set as the motion compensation image MC1, and the image extracted from the reference frame R1 may be designed to be set as the motion compensation image MC0.

Furthermore, in a case where a prediction image is generated through bidirectional prediction in the manner as illustrated in FIG. 10, for example, an image extracted from the preceding reference frame L0 is set as the motion compensation image MC0, and an image extracted from the following reference frame L1 is set as the motion compensation image MC1. The image extracted from the reference frame L0 may be designed to be set as the motion compensation image MC1, and the image extracted from the reference frame L1 may be designed to be set as the motion compensation image MC0.

The above motion compensation image MC0 can be replaced by the intra-prediction image IP in FIG. 12, and can be processed in a manner similar to that of the intra-prediction image IP. The following explanation will be given of the intra-prediction image IP.

The difference calculation circuit 61 calculates the difference between the intra-prediction image IP (motion compensation image MC0) and the motion compensation image MC1, and outputs a difference image to the low-pass filter circuit 62. The difference image D is represented by Equation (3) as follows:

[Math. 3]

$$D(i,j)=IP(i,j)-MC_1(i,j) \quad (3)$$

In Equation (3), (i, j) represents the relative position of a pixel in a motion compensation image, and satisfies $0 \leq i \leq 16$ and $0 \leq j \leq 16$ in a case where the process is designed to be performed in units of macroblocks of 16×16 pixels. It is assumed that this similarly applies to the following description.

The low-pass filter circuit 62 has an FIR filter circuit. The low-pass filter circuit 62 applies a low-pass filter to the difference image D supplied from the difference calculation circuit 61, and outputs an obtained image to the gain adjustment circuit 63 and the high-pass filter circuit 64. A difference image D', which is an image obtained by applying a low-pass filter, is represented by Equation (4) below. In Equation (4), LPF(X) represents the application of a low-pass filter to an input image X using a two-dimensional FIR filter.

[Math. 4]

$$D'=LPF(D) \tag{4}$$

The gain adjustment circuit 63 adjusts the gain of the difference image D' supplied from the low-pass filter circuit 62, and outputs the gain-adjusted image to the adder circuit 66. The output image X(i, j) of the gain adjustment circuit 63 is represented by Equation (5) as follows.

[Math. 5]

$$X(i,j)=\alpha D'(i,j) \tag{5}$$

The high-pass filter circuit 64 has an FIR filter circuit. The high-pass filter circuit 64 applies a high-pass filter to the difference image D' supplied from the low-pass filter circuit 62, and outputs an obtained image to the gain adjustment circuit 65. A difference image D", which is an image obtained by applying a high-pass filter, is represented by Equation (6) below. In Equation (6), HPF(X) represents the application of a high-pass filter to an input image X using a two-dimensional FIR filter.

[Math. 6]

$$D''=HPF(D') \tag{6}$$

The gain adjustment circuit 65 adjusts the gain of the difference image D" supplied from the high-pass filter circuit 64, and outputs the gain-adjusted image to the adder circuit 66. The output image Y(i, j) of the gain adjustment circuit 65 is represented by Equation (7) as follows.

[Math. 7]

$$Y(i,j)=\beta D''(i,j) \tag{7}$$

As the values of α in Equation (5) and β in Equation (7), for example, values such as α=0.8 and β=0.2 are selected. However, other values may be used in order to increase the accuracy of a prediction pixel. Furthermore, the values may be adaptively changed in accordance with the properties of an input sequence or the like.

The adder circuit 66 adds together the gain-adjusted image X(i, j) and image Y(i, j), and outputs an image obtained by addition. The output image Z(i, j) of the adder circuit 66 is represented by Equation (8) as follows.

[Math. 8]

$$Z(i,j)=X(i,j)+Y(i,j) \tag{8}$$

The output image Z(i, j) is a representation of the high-frequency components of the image, which can be determined from the difference, that is, the correlation, between the motion compensation image MC0 and the motion compensation image MC1.

The adder circuit 67 adds the output image Z(i, j) supplied from the adder circuit 66 to the intra-prediction image IP, and outputs an obtained image to the adder circuit 15 as a prediction image. The final output of the adder circuit 67, i.e., a prediction image S(i, j), is represented by Equation (9) as follows.

[Math. 9]

$$S(i,j)=IP(i,j)+Z(i,j) \tag{9}$$

In this manner, according to the filtering prediction mode, an image obtained by adding an image representing high-frequency components to the intra-prediction image IP is generated as a prediction image. This prediction image includes more high-frequency components than a prediction image obtained in a case where bidirectional prediction is simply performed. Further, it is possible to generate a prediction image by more efficiently utilizing the temporal correlation of images than in a case where unidirectional prediction is simply performed. Furthermore, since a prediction image including a large number of high-frequency components is added with a decoded image in the adder circuit 15, an image that is finally output from the decoding apparatus 1 is also a high-definition image including a large number of high-frequency components.

Furthermore, in the generation of a prediction image, intra-prediction is performed on the current frame and the thus generated intra-prediction image IP is utilized together with the motion compensation image MC1. This can reduce the number of motion vectors for generating motion compensation images.

As discussed above, after a motion compensation apparatus according to the present invention outputs a prediction image, image information is recovered by performing decoding in a conventional manner.

In this manner, the decoding apparatus 1 can realize improvement in encoding efficiency by compensating for the lack of prediction accuracy of intra-prediction by using the prediction accuracy of inter-prediction, and can also realize a reduction in processing cost by reducing the number of reference planes necessary for inter-prediction.

[Explanations of Flow of Decoding Process]

Here, a process of the decoding apparatus 1 having the above configuration will be explained.

First, a decoding process of the decoding apparatus 1 will be explained with reference to a flowchart in FIG. 13.

Figure 13:
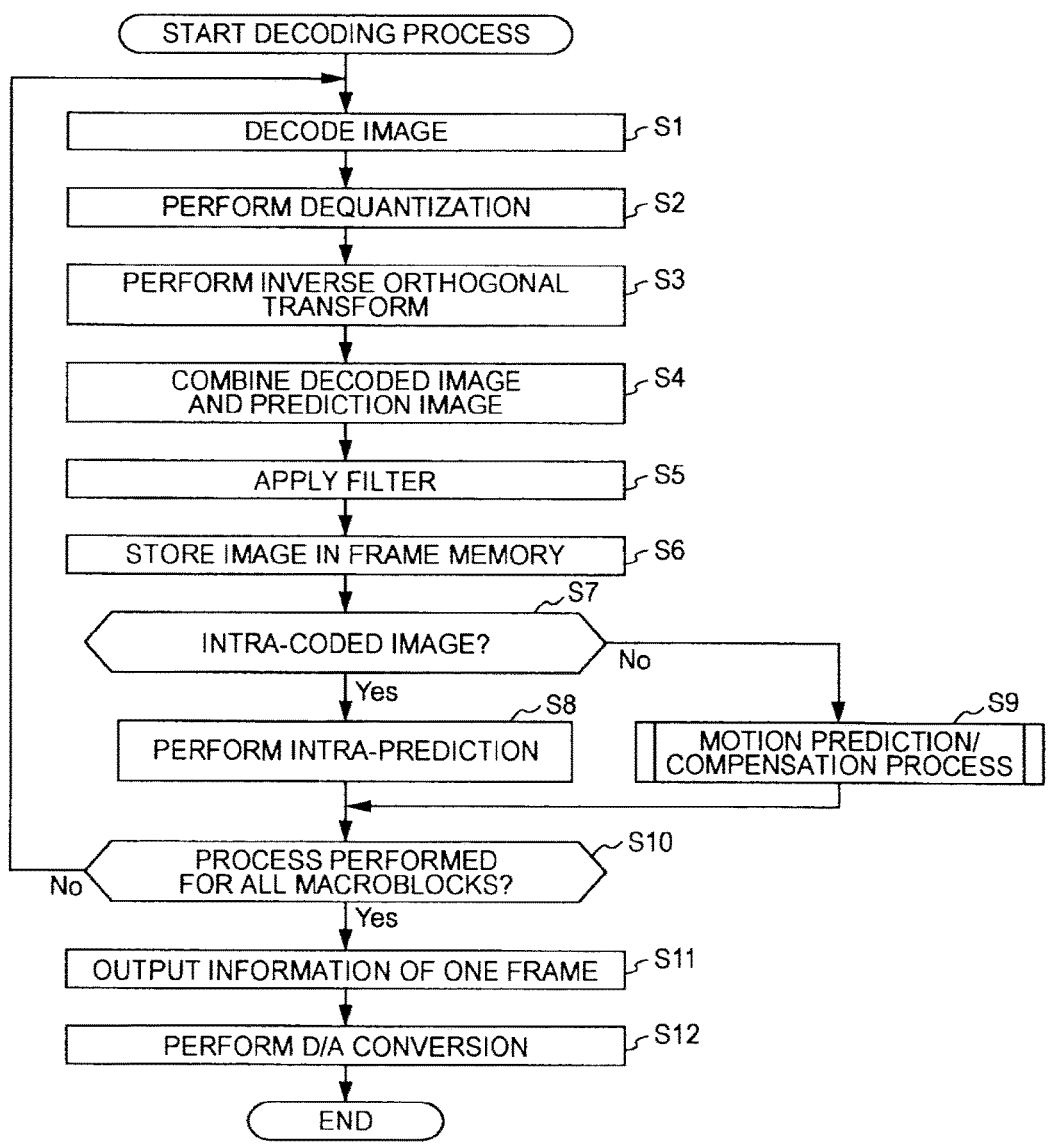
FIG. 13 is a flowchart explaining a decoding process of the decoding apparatus.

The process in FIG. 13 is started when, for example, an image of a certain size such as a macroblock of 16×16 pixels is read by the lossless decoding circuit 12 from the information stored in the storage buffer 11. The processing of each step in FIG. 13 is performed, as appropriate, in parallel with the processing of another step or by reordering the steps. This similarly applies to the processing of each step in each flowchart described below.

In step S1, the lossless decoding circuit 12 performs a decoding process on an image read from the storage buffer 11, and outputs a quantized transform coefficient to the dequantization circuit 13. Furthermore, the lossless decoding circuit 12 outputs intra-prediction mode information to the intra-prediction circuit 22 in a case where the image to be decoded is an intra-coded image, and outputs a motion vector and an identification flag to the motion prediction/compensation circuit 21 in a case where the image to be decoded is an inter-coded image.

In step S2, the dequantization circuit 13 performs dequantization using a scheme corresponding to the quantization scheme used on the encoding side, and outputs the transform coefficient to the inverse orthogonal transform circuit 14.

In step S3, the inverse orthogonal transform circuit 14 performs the inverse orthogonal transform on the transform coefficient supplied from the dequantization circuit 13, and outputs an obtained image to the adder circuit 15.

In step S4, the adder circuit 15 combines the decoded image supplied from the inverse orthogonal transform circuit 14 and a prediction image supplied from the motion prediction/compensation circuit 21 or the intra-prediction circuit 22, and outputs a composite image to the deblocking filter 16.

In step S5, the deblocking filter 16 performs filtering to remove block noise included in the composite image, and outputs an image from which block noise has been removed.

In step S6, the frame memory 19 temporarily stores the image supplied from the deblocking filter 16.

In step S7, the control circuit 31 judges whether or not the target image is an intra-coded image.

In a case where it is judged in step S7 that the target image is an intra-coded image, then, in step S8, the intra-prediction circuit 22 generates a prediction image by performing intra-prediction, and outputs the generated prediction image to the adder circuit 15.

In contrast, in a case where it is judged in step S7 that the target image is not an intra-coded image, or is an inter-coded image, then, in step S9, the motion prediction/compensation circuit 21 performs a motion prediction/compensation process. A prediction image generated by performing a motion prediction/compensation process is output to the adder circuit 15. The motion prediction/compensation process will be described below with reference to a flowchart in FIG. 14.

In step S10, the control circuit 31 judges whether or not the above process has been performed on the macroblocks in one entire frame. In a case where it is judged that the process has not been performed, attention is focused on another macroblock and the process from step S1 is repeatedly performed.

In contrast, in a case where it is judged in step S10 that the process has been performed on the macroblocks in one entire frame, then, in step S11, the rearrangement buffer 17 outputs a generated frame to the D/A converter circuit 18 in accordance with the control by the control circuit 31.

In step S12, the D/A converter circuit 18 performs D/A conversion on the frame supplied from the rearrangement buffer 17, and outputs an analog signal to outside. The above process is performed on the individual frames.

Figure 14:
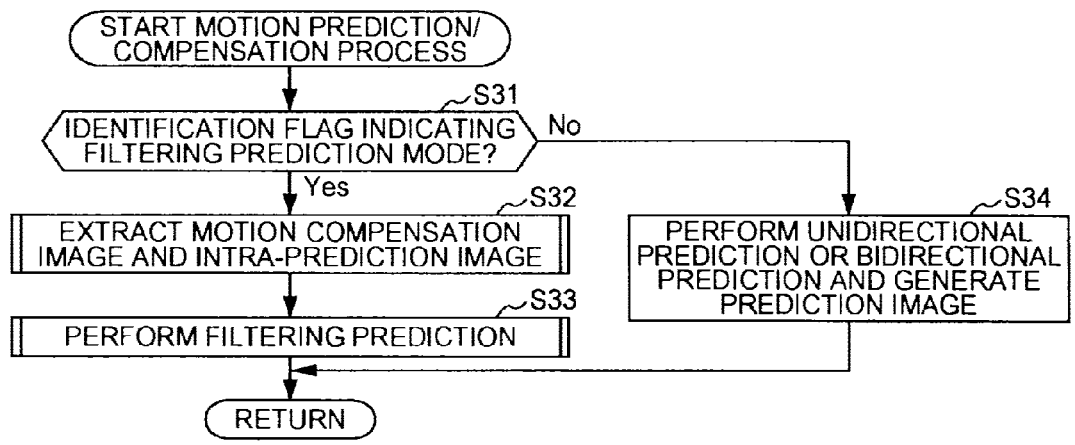
FIG. 14 is a flowchart explaining a motion prediction/compensation process performed in step S9 in FIG. 13.

Next, the motion prediction/compensation process performed in step S9 in FIG. 13 will be explained with reference to a flowchart in FIG. 14.

In step S31, the prediction mode determination circuit 41 of the motion prediction/compensation circuit 21 judges whether or not the identification flag supplied from the lossless decoding circuit 12 indicates that the process is to be performed in the filtering prediction mode.

In a case where it is judged in step S31 that the identification flag indicates that the process is to be performed in the filtering prediction mode, the process proceeds to step S32. In step S32, the prediction circuit 44 performs an extraction process for extracting a motion compensation image and a generation process for generating an intra-prediction image. The details of the extraction process and the generation process will be described below.

If a motion compensation image is extracted and an intra-prediction image is generated, in step S33, the filtering circuit 45 performs a filtering prediction process. The details of the filtering prediction process will be described below.

When the processing of step S33 is completed, the motion prediction/compensation process ends. Then, the process returns to step S9 in FIG. 11, and the process proceeds to step S10.

Furthermore, in a case where it is judged in step S31 that the identification flag indicates does not indicate that the process is to be performed in the filtering prediction mode, the process proceeds to step S32. In step S32, the unidirectional prediction circuit 42 performs unidirectional prediction or the bidirectional prediction circuit 43 performs bidirectional prediction. Thus, a prediction image is generated.

That is, in a case where the identification flag indicates that the process is to be performed in the unidirectional prediction mode, motion vectors are supplied from the prediction mode determination circuit 41 to the unidirectional prediction circuit 42, and the unidirectional prediction circuit 42 performs unidirectional prediction. Furthermore, in a case where the identification flag indicates that the process is to be performed in the bidirectional prediction mode, motion vectors are supplied from the prediction mode determination circuit 41 to the bidirectional prediction circuit 43, and the bidirectional prediction circuit 43 performs bidirectional prediction. After the prediction image is output to the adder circuit 15, the motion prediction/compensation process ends. Then, the process returns to step S9 in FIG. 13, and the process proceeds to step S10.

Figure 15:
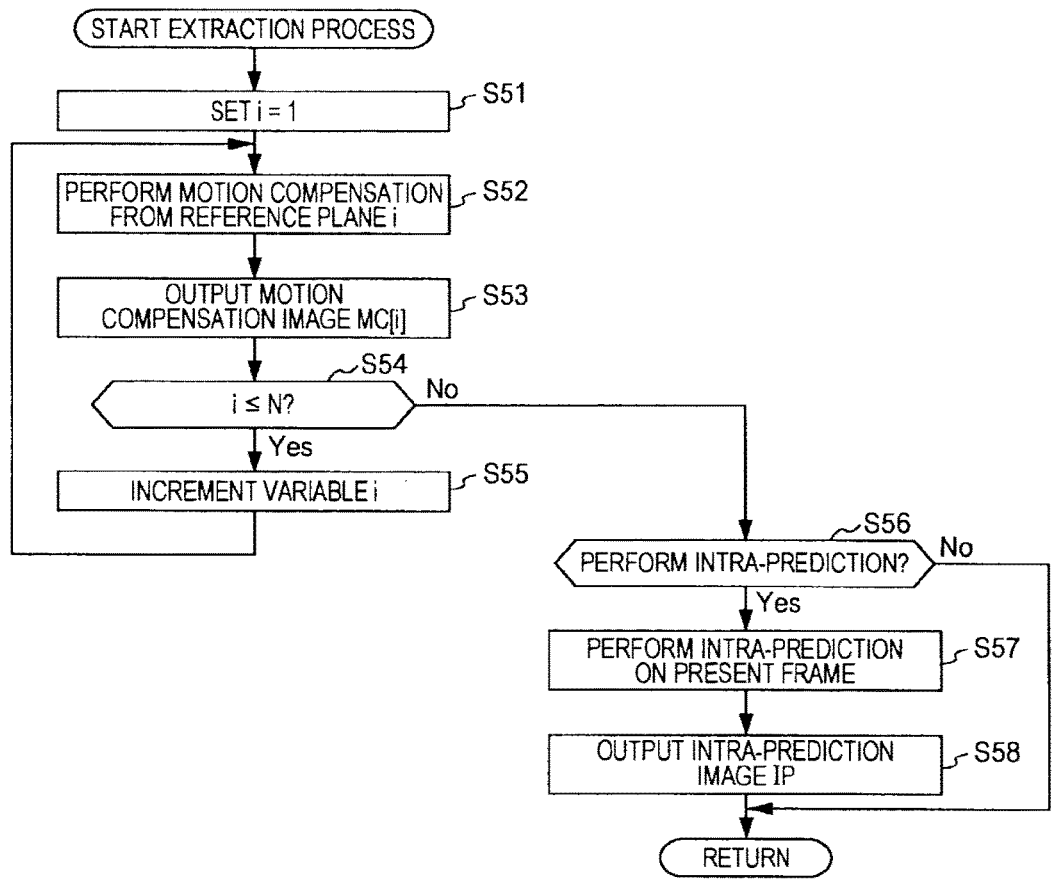
FIG. 15 is a flowchart explaining an example of a flow of an extraction process.

Next, an example of a flow of the extraction process executed in step S32 in FIG. 14 will be explained with reference to a flowchart in FIG. 15.

When the extraction process is started, in step S51, the prediction circuit 44 sets a variable i=1. In step S52, the motion compensation circuit 51 performs motion compensation from the i-th reference frame, that is, the reference plane i, and extracts a motion compensation image MC[i]. In step S53, the motion compensation circuit 51 outputs the motion compensation image MC[i] to the filtering circuit 45.

In step S54, the prediction circuit 44 judges whether or not the value of the variable i is less than or equal to N. In a case where it is judged that the value of the variable i is less than or equal to the certain natural number N, the process proceeds to step S55.

In step S55, the motion compensation circuit 51 increments the variable i. When the processing of step S55 is completed, the process returns to step S52 and the subsequent process is repeated. Furthermore, in a case where it is judged in step S54 that the value of the variable i is greater than N, the process proceeds to step S56.

In step S56, the intra-prediction circuit 52 judges whether or not intra-prediction is to be performed. In a case where it is judged that intra-prediction is to be performed, the process proceeds to step S57. In step S57, the intra-prediction circuit 52 performs intra-prediction on the current frame (present frame). In step S58, the intra-prediction circuit 52 outputs the intra-prediction image IP generated through intra-prediction to the filtering circuit 45.

When the processing of step S58 is completed, the extraction process ends. Then, the process returns to step S32 in FIG. 14, and the process proceeds to step S33. Furthermore, in a case where it is judged in step S56 in FIG. 15 that intra-prediction is not to be performed, the extraction process ends. Then, the process returns to step S32 in FIG. 14, and the process proceeds to step S33.

Figure 16:
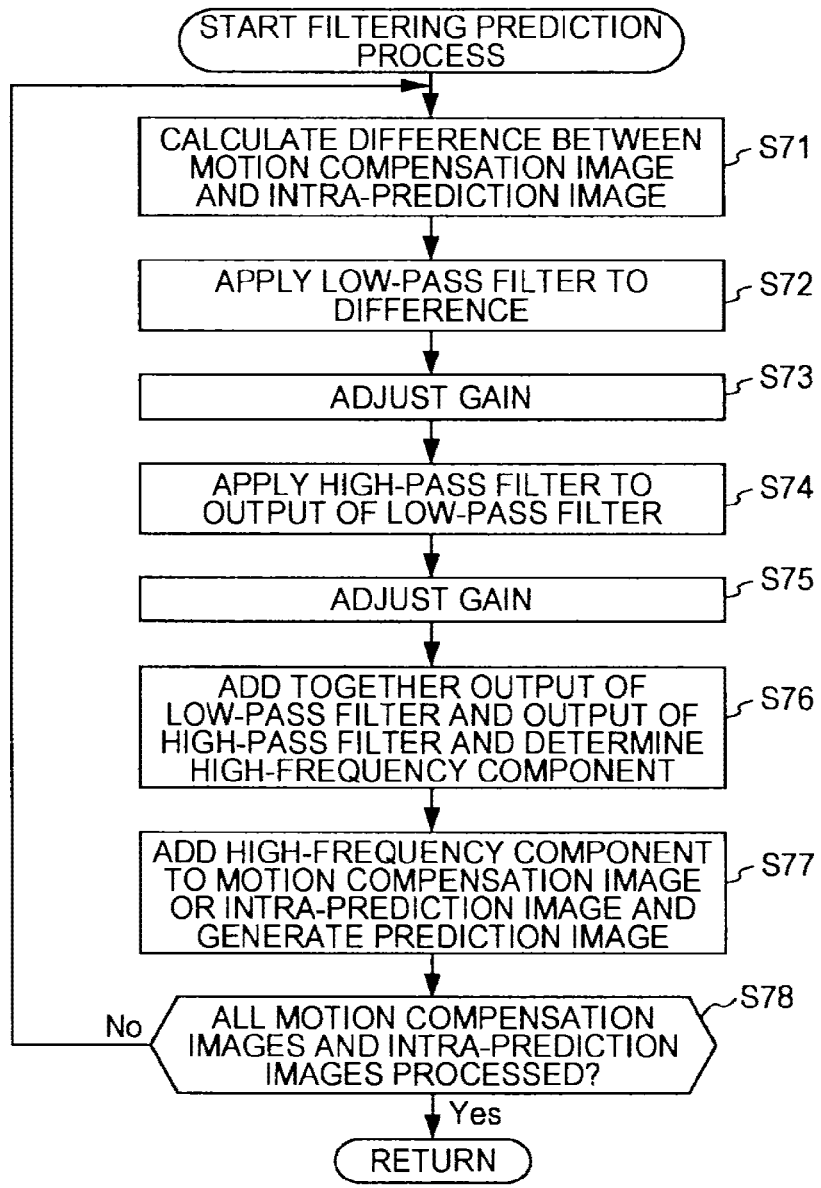
FIG. 16 is a flowchart explaining an example of a flow of a filtering prediction process.

Next, an example of a flow of the filtering prediction process executed in step S33 in FIG. 14 will be explained with reference to a flowchart in FIG. 16.

After a motion compensation image is extracted and an intra-prediction image is generated, when the filtering process is started, in step S71, the difference calculation circuit 61 of the filtering circuit 45 calculates the difference between the motion compensation image and the intra-prediction image, and outputs a difference image to the low-pass filter circuit 62.

In step S72, the low-pass filter circuit 62 applies a low-pass filter to the difference image supplied from the difference calculation circuit 61, and outputs an obtained image to the gain adjustment circuit 63 and the high-pass filter circuit 64.

In step S73, the gain adjustment circuit 63 adjusts the gain of the image supplied from the low-pass filter circuit 62, and outputs the gain-adjusted image to the adder circuit 66.

In step S74, the high-pass filter circuit 64 applies a high-pass filter to the difference image supplied from the low-pass filter circuit 62, and outputs an obtained image to the gain adjustment circuit 65.

In step S75, the gain adjustment circuit 65 adjusts the gain of the difference image supplied from the high-pass filter circuit 64, and outputs the gain-adjusted image to the adder circuit 66.

In step S76, the adder circuit 66 adds together the image (output of the low-pass filter) supplied from the gain adjustment circuit 63 and the image (output of the high-pass filter) supplied from the gain adjustment circuit 65, and determines the high-frequency components of the images. The determined high-frequency components are supplied from the adder circuit 66 to the adder circuit 67.

In step S77, the adder circuit 67 adds the image (high-frequency components) supplied from the adder circuit 66 to the intra-prediction image, and outputs an obtained image to the adder circuit 15 as a prediction image. Note that the adder circuit 67 may add the image (high-frequency components) supplied from the adder circuit 66 to the motion compensation image in place of the intra-prediction image.

In step S78, the filtering circuit 45 judges whether or not all the motion compensation images and intra-prediction images have been processed. In a case where it is judged that an unprocessed motion compensation image or intra-prediction image exists, the process returns to step S71 and the subsequent process is repeated.

Furthermore, in a case where it is judged in step S78 that all the motion compensation images and intra-prediction images have been processed, the filtering prediction process ends. Then, the process returns to step S33 in FIG. 12, and the motion prediction/compensation process ends. Then, the process returns to in step S9 in FIG. 11, and the process proceeds to step S10.

As above, since decoding is performed using a prediction image generated through filtering prediction, the lack of prediction accuracy of intra-prediction can be compensated for by using the prediction accuracy of inter-prediction, thus making it possible to obtain a high-definition decoded image. Furthermore, at this time, at least one intra-prediction image is used for the computation of a prediction image, thus allowing a reduction in the number of motion vectors to be encoded and realizing a reduction in processing cost (preventing an increase in load). That is to say, the decoding apparatus 1 can generate a high-accuracy prediction image with a small amount of control information.

2. Second Embodiment

[Configuration of Encoding Apparatus]

Next, the configuration and operation of an apparatus on the encoding side will be explained.

Figure 17:
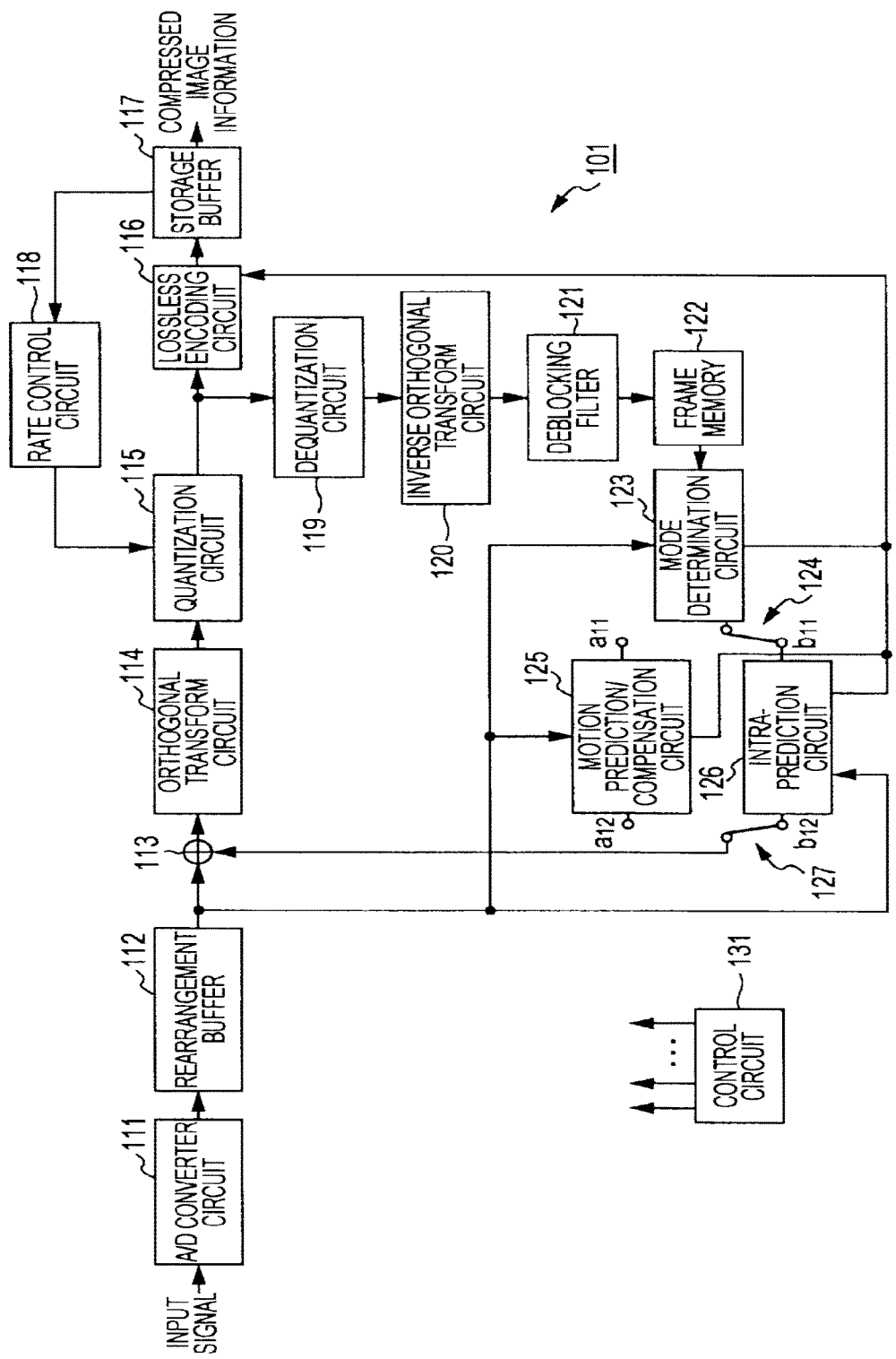
FIG. 17 is a block diagram illustrating an example configuration of an encoding apparatus.

FIG. 17 is a block diagram illustrating an example configuration of an encoding apparatus 101. Compressed image information obtained through encoding by the encoding apparatus 101 is input to the decoding apparatus 1 in FIG. 5.

An A/D converter circuit 111 performs A/D conversion on an input signal, and outputs an image to the rearrangement buffer 112.

A rearrangement buffer 112 rearranges frames in accordance with the GOP (Group of Pictures) structure of the compressed image information, and outputs an image of a certain unit such as a macroblock. The image output from the rearrangement buffer 112 is supplied to an adder circuit 113, a mode determination circuit 123, a motion prediction/compensation circuit 125, and an intra-prediction circuit 126.

The adder circuit 113 determines the difference between the image supplied from the rearrangement buffer 112 and a prediction image generated by the motion prediction/compensation circuit 125 or the intra-prediction circuit 126 and supplied via a switch 127, and outputs the residual to an orthogonal transform circuit 114. The closer the prediction image is to an original image and the smaller the number of residuals determined here is, the smaller the amount of code to be assigned to residuals is and therefore the higher the encoding efficiency can be said to be.

The orthogonal transform circuit 114 performs the orthogonal transform, such as the discrete cosine transform or Karhunen-Loève transform, on the residual supplied from the adder circuit 113, and outputs a transform coefficient obtained by performing the orthogonal transform to a quantization circuit 115.

The quantization circuit 115 quantizes the transform coefficient supplied from the orthogonal transform circuit 114 in accordance with the control by a rate control circuit 118, and outputs the quantized transform coefficient. The transform coefficient quantized by the quantization circuit 115 is supplied to the lossless encoding circuit 116 and a dequantization circuit 119.

The lossless encoding circuit 116 compresses the transform coefficient supplied from the quantization circuit 115 by performing lossless encoding such as variable-length encoding or arithmetic encoding, and outputs information to a storage buffer 117.

Furthermore, the lossless encoding circuit 116 sets the value of an identification flag in accordance with the information supplied from the mode determination circuit 123, and describes the identification flag in the header of the image. As described above, the decoding apparatus 1 determines a prediction mode on the basis of the identification flag described by the lossless encoding circuit 116.

The lossless encoding circuit 116 also describes the information supplied from the motion prediction/compensation circuit 125 or the intra-prediction circuit 126 in the header of the image. Motion vectors and the like that are detected when inter-prediction is performed are supplied from the motion prediction/compensation circuit 125, and the information regarding the intra-prediction mode applied is supplied from the intra-prediction circuit 126.

The storage buffer 117 temporarily stores the information supplied from the lossless encoding circuit 116, and outputs it as compressed image information at a certain timing. The storage buffer 117 outputs information about the amount of code produced to the rate control circuit 118.

The rate control circuit 118 computes a quantization scale on the basis of the amount of code output from the storage buffer 117, and controls the quantization circuit 115 so that the quantization can be performed with the computed quantization scale.

The dequantization circuit 119 performs dequantization on the transform coefficient quantized by the quantization circuit 115, and outputs the transform coefficient to an inverse orthogonal transform circuit 120.

The inverse orthogonal transform circuit 120 performs the inverse orthogonal transform on the transform coefficient supplied from the dequantization circuit 119, and outputs an obtained image to a deblocking filter 121.

The deblocking filter 121 removes block noise that appears in a locally decoded image, and outputs an image from which the block noise has been removed to a frame memory 122.

The frame memory 122 stores the image supplied from the deblocking filter 121. The image stored in the frame memory 122 is read by a mode determination circuit 123 as appropriate.

The mode determination circuit 123 determines whether intra-coding is to be performed or inter-coding is to be performed, on the basis of the image stored in the frame memory 122 and the original image supplied from the rearrangement buffer 112. Furthermore, in a case where it is determined that inter-coding is to be performed, the mode determination circuit 123 determines one mode among the unidirectional prediction mode, the bidirectional prediction mode, and the filtering prediction mode. The mode determination circuit 123 outputs information indicating the determination result to the lossless encoding circuit 116 as mode information.

In a case where it is determined that inter-coding is to be performed, the mode determination circuit 123 outputs frames that are stored in the frame memory 122 and that are obtained through local decoding to the motion prediction/compensation circuit 125 via a switch 124.

Furthermore, in a case where it is determined that intra-coding is to be performed, the mode determination circuit 123 outputs frames that are stored in the frame memory 122 and that are obtained through local decoding to the intra-prediction circuit 126.

The switch 124 is connected to a terminal a11 in a case where inter-coding is to be performed, and is connected to a terminal b11 in a case where intra-coding is to be performed. The switching of the switch 124 is controlled by, for example, a control circuit 131.

The motion prediction/compensation circuit 125 detects motion vectors on the basis of the original image supplied from the rearrangement buffer 112 and reference frames read from the frame memory 122, and outputs the detected motion vectors to the lossless encoding circuit 116. Furthermore, the motion prediction/compensation circuit 125 generates a prediction image by performing motion compensation using the detected motion vectors and the reference frames, and outputs the generated prediction image to the adder circuit 113 via the switch 127.

The intra-prediction circuit 126 performs intra-prediction on the basis of the original image supplied from the rearrangement buffer 112 and a reference frame locally decoded and stored in the frame memory 122, and generates a prediction image. The intra-prediction circuit 126 outputs the generated prediction image to the adder circuit 113 via the switch 127, and outputs intra-prediction mode information to the lossless encoding circuit 116.

The switch 127 is connected to a terminal a12 or a terminal b12, and outputs a prediction image generated by the motion prediction/compensation circuit 125 or the intra-prediction circuit 126 to the adder circuit 113.

The control circuit 131 controls the overall operation of the encoding apparatus 101 by, for example, switching the connection of the switches 124 and 127 in accordance with the mode determined by the mode determination circuit 123.

Figure 18:
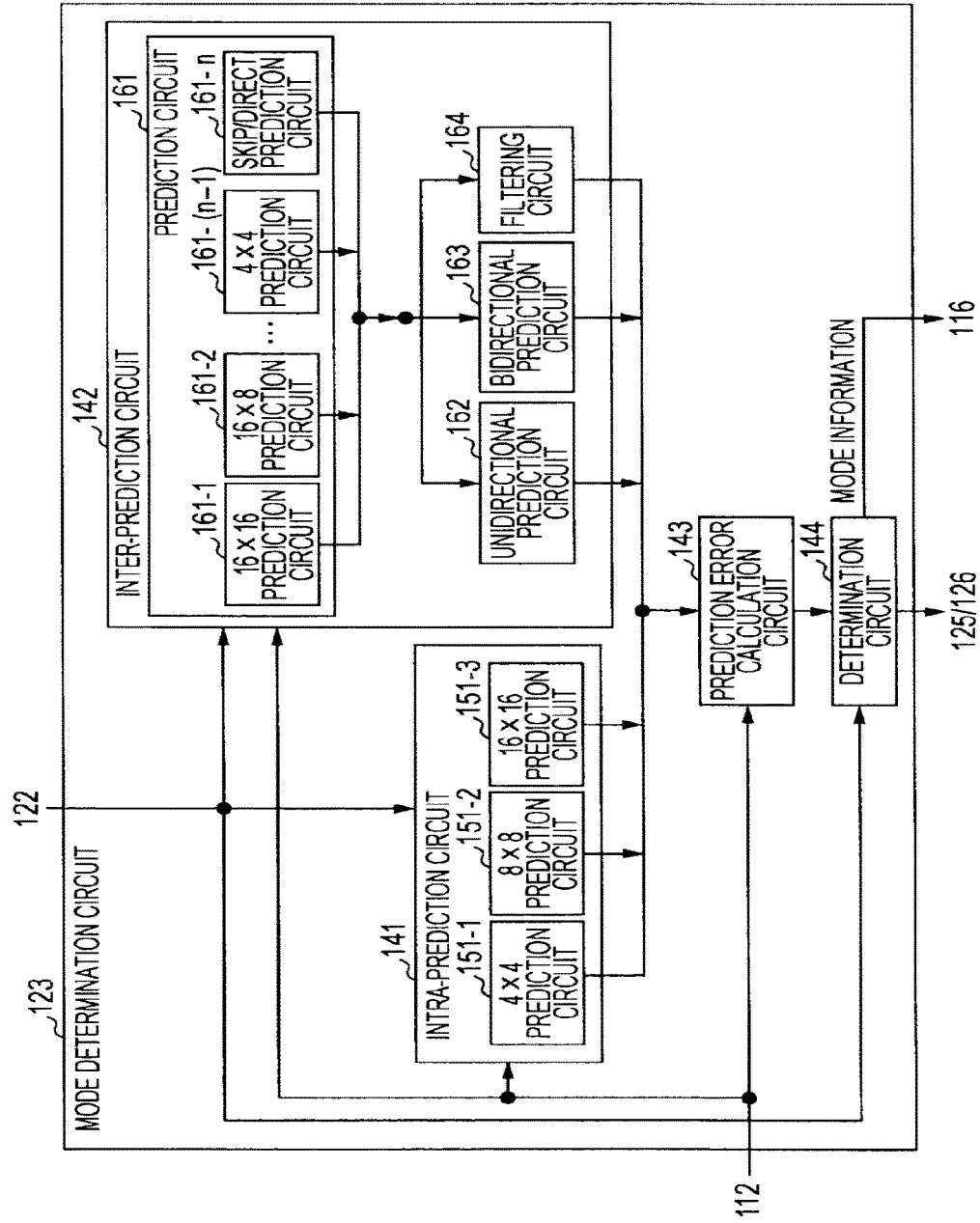
FIG. 18 is a block diagram illustrating an example configuration of a mode determination circuit in FIG. 17.

FIG. 18 is a block diagram illustrating an example configuration of the mode determination circuit 123 in FIG. 17.

As illustrated in FIG. 18, the mode determination circuit 123 is composed of an intra-prediction circuit 141, an inter-prediction circuit 142, a prediction error calculation circuit 143, and a determination circuit 144. In the mode determination circuit 123, each of intra-prediction and inter-prediction is performed on a block having a different size, and which prediction mode prediction is to be performed in is determined from the obtained results. As for inter-prediction, the process is performed in each of the prediction modes, i.e., the unidirectional prediction mode, the bidirectional prediction mode, and the filtering prediction mode. The original image supplied from the rearrangement buffer 112 is input to the intra-prediction circuit 141, the inter-prediction circuit 142, and the prediction error calculation circuit 143.

The intra-prediction circuit 141 performs intra-prediction in units of blocks having different sizes on the basis of the original image and an image read from the frame memory 122, and outputs a generated intra-prediction image to the prediction error calculation circuit 143. A 4×4 prediction circuit 151-1 performs intra-prediction in units of blocks of 4×4 pixels, and an 8×8 prediction circuit 151-2 performs intra-prediction in units of blocks of 8×8 pixels. A 16×16 prediction circuit 151-3 performs intra-prediction in units of blocks of 16×16 pixels. Each circuit of the intra-prediction circuit 141 also supplies the generated intra-prediction image to the filtering circuit 164.

A prediction circuit 161 in the inter-prediction circuit 142 detects motion vectors in units of blocks each having a different size on the basis of the original image and reference frames read from the frame memory 122. Furthermore, the prediction circuit 161 performs motion compensation on the basis of the detected motion vectors, and outputs motion compensation images that are used for the generation of a prediction image.

A 16×16 prediction circuit 161-1 performs a process on an image of every block of 16×16 pixels, and a 16×8 prediction circuit 161-2 performs a process on an image of every block of 16×8 pixels. Furthermore, a 4×4 prediction circuit 161-($n$−1) performs a process on an image of every block of 4×4 pixels. A skip/direct prediction circuit 161-$n$ detects motion vectors in a skip prediction mode or a direct prediction mode, and performs motion compensation using the detected motion vectors.

Motion compensation images extracted from a plurality of reference frames located in either direction with respect to the present frame are supplied from the respective circuits in the prediction circuit 161 to a unidirectional prediction circuit 162. Furthermore, motion compensation images extracted from a plurality of reference frames located in both directions with respect to the present frame are supplied from the respective circuits in the prediction circuit 161 to a bidirectional prediction circuit 163.

In a case where filtering prediction is to be performed using, as described above, motion compensation images extracted from a plurality of reference frames located in either direction, motion compensation images that are extracted from reference frames located in either direction are supplied from the respective circuits in the prediction circuit 161 to a filtering circuit 164. In a case where filtering prediction is to be performed using motion compensation images extracted from a plurality of reference frames located in both directions, motion compensation images extracted from reference frames located in both directions are supplied from the respective circuits in the prediction circuit 161 to the filtering circuit 164.

The unidirectional prediction circuit 162 generates a prediction image by performing unidirectional prediction using the motion compensation images having different sizes, which are supplied from the respective circuits in the prediction circuit 161, and outputs the generated prediction image to the prediction error calculation circuit 143. For example, the unidirectional prediction circuit 162 generates a prediction image by using a pixel value in one image among a plurality of motion compensation images having 16×16 pixels, which are supplied from the prediction circuit 161-1, as a pixel value in the prediction image.

The bidirectional prediction circuit 163 generates a prediction image by performing bidirectional prediction using the motion compensation images having different sizes, which are supplied from the respective circuits in the prediction circuit 161, and outputs the generated prediction image to the prediction error calculation circuit 143. For example, the bidirectional prediction circuit 163 generates a prediction image by using the average value of pixel values in a plurality of motion compensation images having 16×16 pixels, which are supplied from the prediction circuit 161-1, as a pixel value in the prediction image.

The filtering circuit 164 generates a prediction image by performing filtering prediction using motion compensation images having different size, which are supplied from the respective circuits in the prediction circuit 161, and intra-prediction images having different sizes, which are supplied from the respective circuits in the intra-prediction circuit 141, and outputs the generated prediction image to the prediction error calculation circuit 143. The filtering circuit 164 has the same configuration as the configuration illustrated in FIG. 12 so as to correspond to the filtering circuit 45 of the decoding apparatus 1.

For example, in the case of generating a prediction image based on a motion compensation image of 16×16 pixels, which is supplied from the prediction circuit 161-1, and based on 16×16 pixels, which are supplied from the prediction circuit 151-3, the filtering circuit 164 determines the difference between the intra-prediction image and the motion compensation image, and applies a low-pass filter to a determined difference image. Furthermore, the filtering circuit 164 applies a high-pass filter to the output of the low-pass filter, and adds together an image obtained by adjusting the gain of the output of the high-pass filter and an image obtained by adjusting the gain of the output of the low-pass filter. The filtering circuit 164 generates a prediction image by adding the image of the addition result representing the high-frequency components to the intra-prediction image, and outputs the generated prediction image to the prediction error calculation circuit 143.

The prediction error calculation circuit 143 determines the difference between each of the prediction images supplied from the respective circuits in the intra-prediction circuit 141 and the original image, and outputs residual signals representing the determined difference to the determination circuit 144. Furthermore, the prediction error calculation circuit 143 determines the difference between each of the prediction images supplied from the unidirectional prediction circuit 162, the bidirectional prediction circuit 163, and the filtering circuit 164 in the inter-prediction circuit 142 and the original image, and outputs residual signals representing the determined difference to the determination circuit 144.

The determination circuit 144 measures the intensities of the residual signals supplied from the prediction error calculation circuit 143, and determines, as a prediction method for generating a prediction image to be used for encoding, a prediction method that has been used to generate a prediction image having a small difference from the original image. The determination circuit 144 outputs information representing the determination result to the lossless encoding circuit 116 as mode information. The mode information also includes information representing the size of a block to be used as a unit of processing, and the like.

Furthermore, in a case where it is determined that a prediction image is to be generated through inter-prediction (in a case where it is determined that inter-coding is to be performed), the determination circuit 144 outputs reference frames read from the frame memory 122, together with the mode information, to the motion prediction/compensation circuit 125. In a case where it is determined that a prediction image is to be generated through intra-prediction (in a case where it is determined that intra-coding is to be performed), the determination circuit 144 outputs an image used for intra-prediction, which is read from the frame memory 122, to the intra-prediction circuit 126 together with the mode information.

Figure 19:
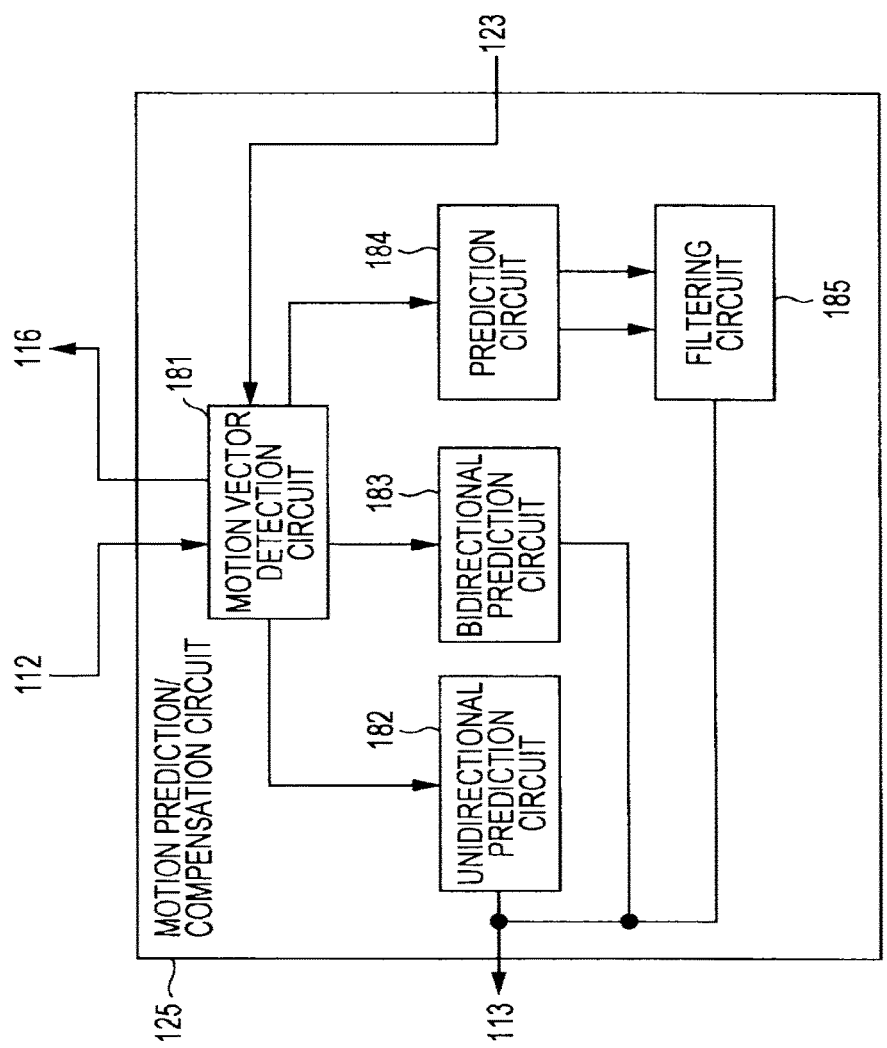
FIG. 19 is a block diagram illustrating an example configuration of a motion prediction/compensation circuit in FIG. 17.

FIG. 19 is a block diagram illustrating an example configuration of the motion prediction/compensation circuit 125 in FIG. 17.

As illustrated in FIG. 19, the motion prediction/compensation circuit 125 is composed of a motion vector detection circuit 181, a unidirectional prediction circuit 182, a bidirectional prediction circuit 183, a prediction circuit 184, and a filtering circuit 185. The motion prediction/compensation circuit 125 has a configuration similar to that of the motion prediction/compensation circuit 21 illustrated in FIG. 8, except that the motion vector detection circuit 181 is provided in place of the prediction mode determination circuit 41.

The motion vector detection circuit 181 detects motion vectors by performing block matching or the like on the basis of the original image supplied from the rearrangement buffer 112 and reference frames supplied from the mode determination circuit 123. The motion vector detection circuit 181 refers to the mode information supplied from the mode determination circuit 123, and outputs the motion vectors, together with the reference frames, to one of the unidirectional prediction circuit 182, the bidirectional prediction circuit 183, and the prediction circuit 184.

The motion vector detection circuit 181 outputs the motion vectors, together with the reference frames, to the unidirectional prediction circuit 182 in a case where it has been selected that unidirectional prediction is to be performed, and outputs these pieces of information to the bidirectional prediction circuit 183 in a case where it has been selected that bidirectional prediction is to be performed. In a case where it has been selected that filtering prediction is to be performed, the motion vector detection circuit 181 outputs the motion vectors, together with the reference frames, to the prediction circuit 184.

The unidirectional prediction circuit 182 generates a prediction image by, similarly to the unidirectional prediction circuit 42 in FIG. 8, performing unidirectional prediction. The unidirectional prediction circuit 182 outputs the generated prediction image to the adder circuit 113.

The bidirectional prediction circuit 183 generates a prediction image by, similarly to the bidirectional prediction circuit 43 in FIG. 8, performing bidirectional prediction. The bidirectional prediction circuit 183 outputs the generated prediction image to the adder circuit 113.

Similarly to the prediction circuit 44 in FIG. 8, the prediction circuit 184 extracts a motion compensation image from each of a plurality of reference frames such as two reference frames, and outputs the plurality of extracted motion compensation images to the filtering circuit 185.

Similarly to the filtering circuit 45 in FIG. 8, the filtering circuit 185 generates a prediction image by performing filtering prediction. The filtering circuit 185 outputs the generated prediction image to the adder circuit 113. Note that the filtering circuit 185 has a configuration similar to the configuration of the filtering circuit 45 illustrated in FIG. 12. Hereinafter, the configuration of the filtering circuit 185 will be explained by referring to the configuration of the filtering circuit 45 illustrated in FIG. 12, as appropriate.

A prediction image generated through filtering prediction may be an image that includes more high-frequency components than a prediction image generated through unidirectional prediction or bidirectional prediction and that has a small difference from the original image.

Therefore, only a small amount of code to be assigned to residuals is required, thus making it possible to increase encoding efficiency.

Furthermore, since filtering prediction can be performed using at least two reference frames, such an increase in encoding efficiency is made feasible without increasing the complexity of processing. The residuals from the original image can be reduced and the encoding efficiency can be increased also by, for example, increasing the number of reference frames to be used for inter-prediction to generate a high-accuracy prediction image and by using it. However, in this case, the number of reference frame used increases, and the complexity of processing increases.

Note that when a prediction method is selected, an optimum prediction method may be selected by taking into account the amount of code for information such as motion vectors necessary for prediction and an encoding mode and by adding a weight corresponding to the amount of code to the intensity of a residual signal. This makes it possible to further improve encoding efficiency. Furthermore, for a simplified encoding process, a prediction method may be adaptively selected utilizing feature values of an input original image in the time and space directions.

[Explanation of Flow of Encoding Process]

Next, a process of the encoding apparatus 101 having the above configuration will be explained.

Figure 20:
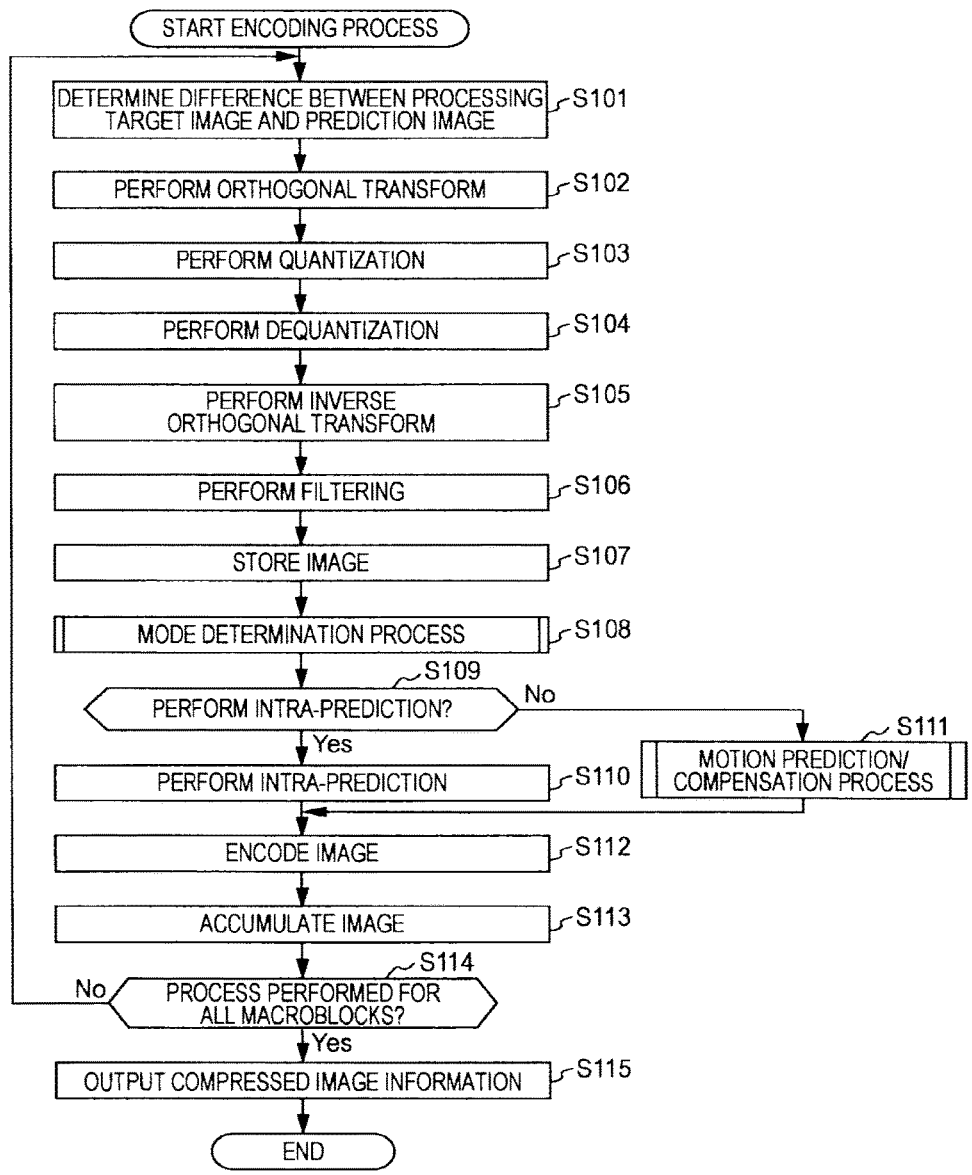
FIG. 20 is a flowchart explaining an encoding process of the encoding apparatus.

An encoding process of the encoding apparatus 101 will be explained with reference to a flowchart in FIG. 20. This process is started when an image of a certain unit such as a macroblock is output from the rearrangement buffer 112.

In step S101, the adder circuit 113 determines the difference between an image supplied from the rearrangement buffer 112 and a prediction image generated by the motion prediction/compensation circuit 125 or the intra-prediction circuit 126, and outputs the residual to the orthogonal transform circuit 114.

In step S102, the orthogonal transform circuit 114 performs the orthogonal transform on the residual supplied from the adder circuit 113, and outputs a transform coefficient to the quantization circuits 115.

In step S103, the quantization circuit 115 quantizes the transform coefficient supplied from the orthogonal transform circuit 114, and outputs the quantized transform coefficient.

In step S104, the dequantization circuit 119 performs dequantization on the transform coefficient quantized by the quantization circuit 115, and outputs the transform coefficient to the inverse orthogonal transform circuit 120.

In step S105, the inverse orthogonal transform circuit 120 performs the inverse orthogonal transform on the transform coefficient supplied from the dequantization circuit 119, and outputs an obtained image to the deblocking filter 121.

In step S106, the deblocking filter 121 removes block noise by performing filtering, and outputs an image from which the block noise has been removed to the frame memory 122.

In step S107, the frame memory 122 stores the image supplied from the deblocking filter 121.

In step S108, the mode determination circuit 123 performs a mode determination process. With the mode determination process, which prediction mode a prediction image is to be generated in is determined. The mode determination process will be described below.

In step S109, the control circuit 131 judges whether or not intra-prediction is to be performed on the basis of the determination by the mode determination circuit 123.

In a case where it is judged in step S109 that intra-prediction is to be performed, then, in step S110, the intra-prediction circuit 126 performs intra-prediction, and outputs a prediction image to the adder circuit 113.

In contrast, in a case where it is judged in step S109 that intra-prediction is not to be performed, that is, inter-prediction is to be performed, then, in step S111, a motion prediction/compensation process is performed by the motion prediction/compensation circuit 125, and a prediction image is output to the adder circuit 113. The motion prediction/compensation process will be described below.

In step S112, the lossless encoding circuit 116 compresses the transform coefficient supplied from the quantization circuit 115, and outputs it to the storage buffer 117. Furthermore, the lossless encoding circuit 116 describes an identification flag in the header of the image or describes motion vectors supplied from the motion prediction/compensation circuit 125 in the header of the image in accordance with the information supplied from the mode determination circuit 123.

In step S113, the storage buffer 117 temporarily stores the information supplied from the lossless encoding circuit 116.

In step S114, the control circuit 131 judges whether or not the above process has been performed on the macroblocks in one entire frame. In a case where it is judged that the process has not been performed, attention is focused on another macroblock and the process from step S111 is repeatedly performed.

In contrast, in a case where it is judged in step S114 that the process has been performed on the macroblocks in one entire frame, then, in step S115, the storage buffer 117 outputs compressed image information in accordance with the control by the control circuit 131. The above process is performed on each frame.

Figure 21:
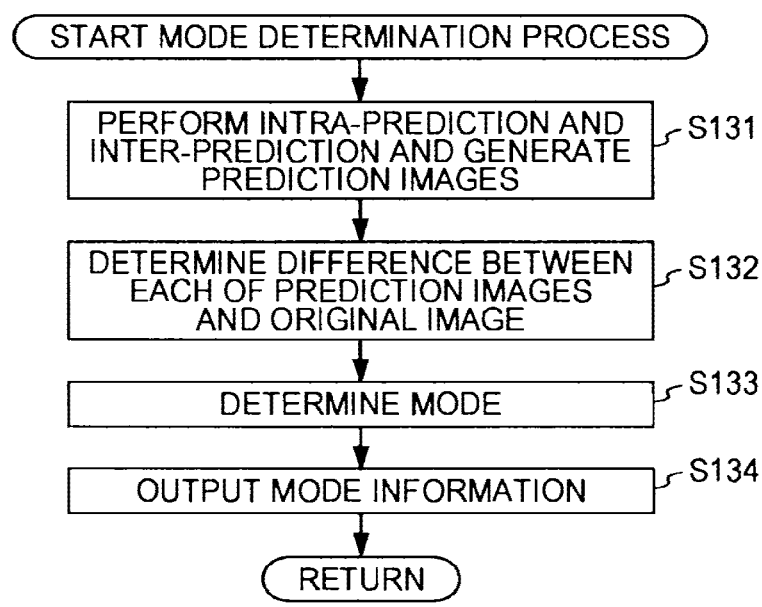
FIG. 21 is a flowchart explaining a mode determination process performed in step S108 in FIG. 20.

Next, the mode determination process performed in step S108 in FIG. 20 will be explained with reference to a flowchart in FIG. 21.

In step S131, the intra-prediction circuit 141 and the inter-prediction circuit 142 perform intra-prediction and inter-prediction, respectively, on blocks having different dimensions, and generate prediction images. The generated prediction images are supplied to the prediction error calculation circuit 143.

In step S132, the prediction error calculation circuit 143 determines the difference between each of the prediction images supplied from the respective circuits in the intra-prediction circuit 141, and the unidirectional prediction circuit 162, bidirectional prediction circuit 163, and filtering circuit 164 of the inter-prediction circuit 142 and the original image. The prediction error calculation circuit 143 outputs residual signals to the determination circuit 144.

In step S133, the determination circuit 144 determines a prediction method for generating a prediction image to be supplied to the adder circuit 113 on the basis of the intensities of the residual signals supplied from the prediction error calculation circuit 143.

In step S134, the determination circuit 144 outputs mode information that is information regarding the determined prediction method to the lossless encoding circuit 116. After that, the process returns to step S108 in FIG. 20, and the subsequent processing is performed.

Next, the motion prediction/compensation process performed in step S111 in FIG. 20 will be described with reference to a flowchart in FIG. 22.

In step S151, the motion vector detection circuit 181 detects motion vectors on the basis of the original image and a reference frame.

In step S152, the motion vector detection circuit 181 judges whether or not the mode determination circuit 123 has determined that the process is to be performed in the filtering prediction mode.

In a case where it is judged that it has been determined that the process is to be performed in the filtering prediction mode, the process proceeds to step S153. The processing of steps S153 and S154 is executed in a manner similar to the case in steps S32 and S33 in FIG. 14, respectively. That is to say, in step S153, the extraction process is executed in a manner as explained with reference to the flowchart in FIG. 15, and in step S154, the filtering prediction process is executed in a manner as explained with reference to the flowchart in FIG. 16.

When the processing of step S154 is completed, the motion prediction/compensation process ends. Then, the process returns to step S111 in FIG. 20, and the process proceeds to step S112.

Figure 22:
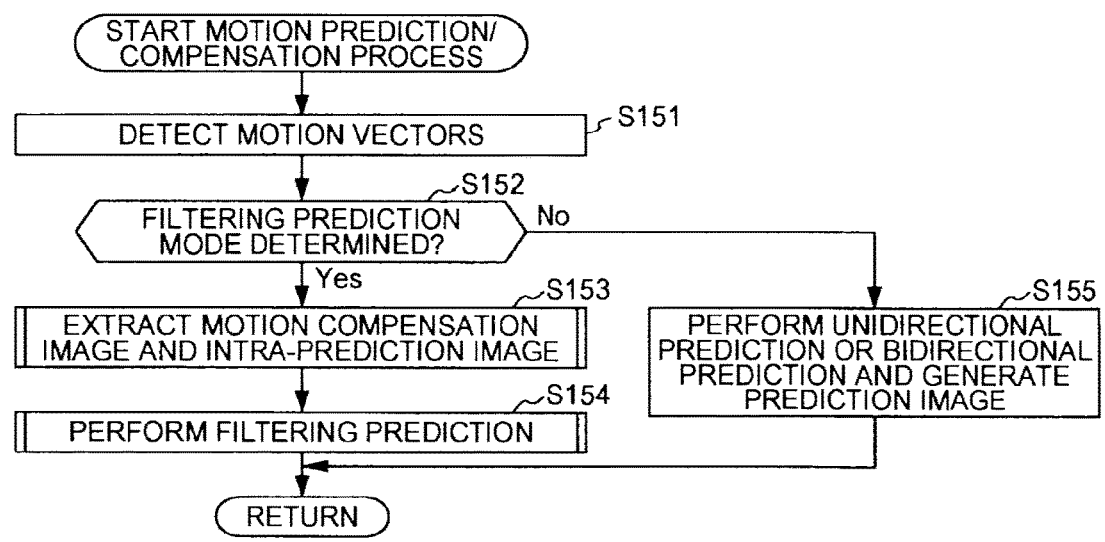
FIG. 22 is a flowchart explaining a motion prediction/compensation process performed in step S111 in FIG. 20.

Furthermore, in a case where it is judged in step S152 in FIG. 22 that it has not been determined that the process is to be performed in the filtering prediction mode, the process proceeds to step S155. In step S155, the unidirectional prediction circuit 182 or the bidirectional prediction circuit 183 performs unidirectional prediction or bidirectional prediction, and generates a prediction image.

That is, in a case where it has been determined that the process is to be performed in the unidirectional prediction mode, motion vectors are supplied from the motion vector detection circuit 181 to the unidirectional prediction circuit 182, and unidirectional prediction is performed by the unidirectional prediction circuit 182. Furthermore, in a case where it has been determined that the process is to be performed in the bidirectional prediction mode, motion vectors are supplied from the motion vector detection circuit 181 to the bidirectional prediction circuit 183, and bidirectional prediction is performed by the bidirectional prediction circuit 183. When the prediction image is output to the adder circuit 113 and the processing of step S155 in FIG. 22 is completed, the motion prediction/compensation process ends. Then, the process returns to step S111 in FIG. 20, and the process proceeds to step S112.

As above, encoding is performed using a prediction image generated through filtering prediction, thus making it possible to increase encoding efficiency. In particular, the encoding apparatus 101 can improve encoding efficiency by compensating for allowing the lack of prediction accuracy of intra-prediction by using the prediction accuracy of inter-prediction. Moreover, the number of reference frames necessary for inter-prediction can be reduced, and therefore the reduction in processing cost can be realized.

3. Third Embodiment

[Modifications of Filtering Circuit]

In the foregoing description, it is assumed that the filtering circuits 45 and 185 are designed to have the configuration as illustrated in FIG. 12. However, this configuration can be changed as appropriate.

Figure 23:
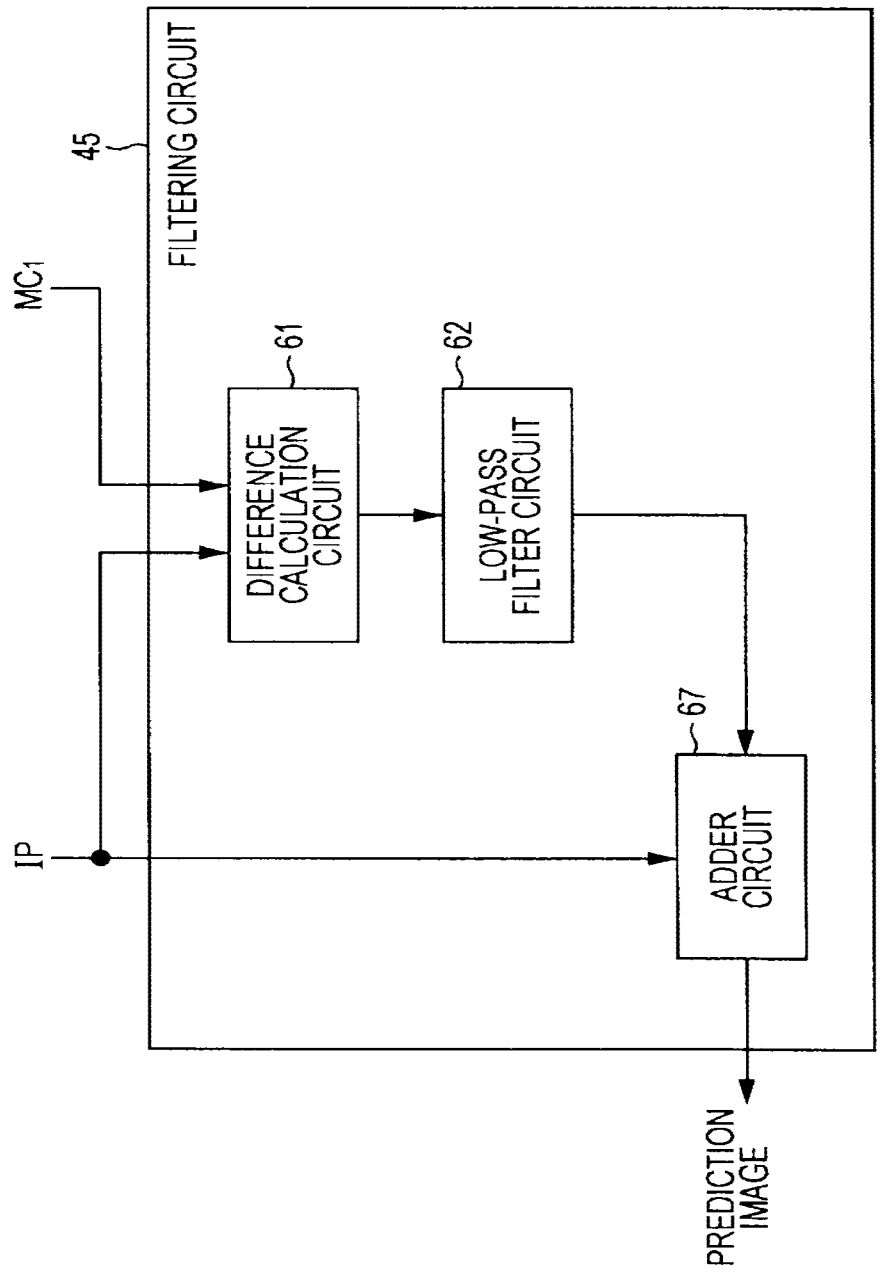
FIG. 23 is a block diagram illustrating another example configuration of the filtering circuit.

FIG. 23 is a block diagram illustrating another example configuration of the filtering circuit 45. The configuration elements corresponding to the configuration elements illustrated in FIG. 12 are assigned the same numerals. Redundant explanation will be omitted as appropriate.

The difference calculation circuit 61 in FIG. 23 calculates the difference between the intra-prediction image and the motion compensation image, and outputs a difference image to the low-pass filter circuit 62.

The low-pass filter circuit 62 applies a low-pass filter to the difference image supplied from the difference calculation circuit 61, and outputs an obtained image to the adder circuit 67.

The adder circuit 67 adds the image supplied from the low-pass filter circuit 62 to the intra-prediction image, and outputs an obtained image as a prediction image.

With the use of the configuration as illustrated in FIG. 23, the amount of processing can be reduced compared to that in the case where the configuration in FIG. 12 is used, and the high-speed operation is made feasible.

Figure 24:
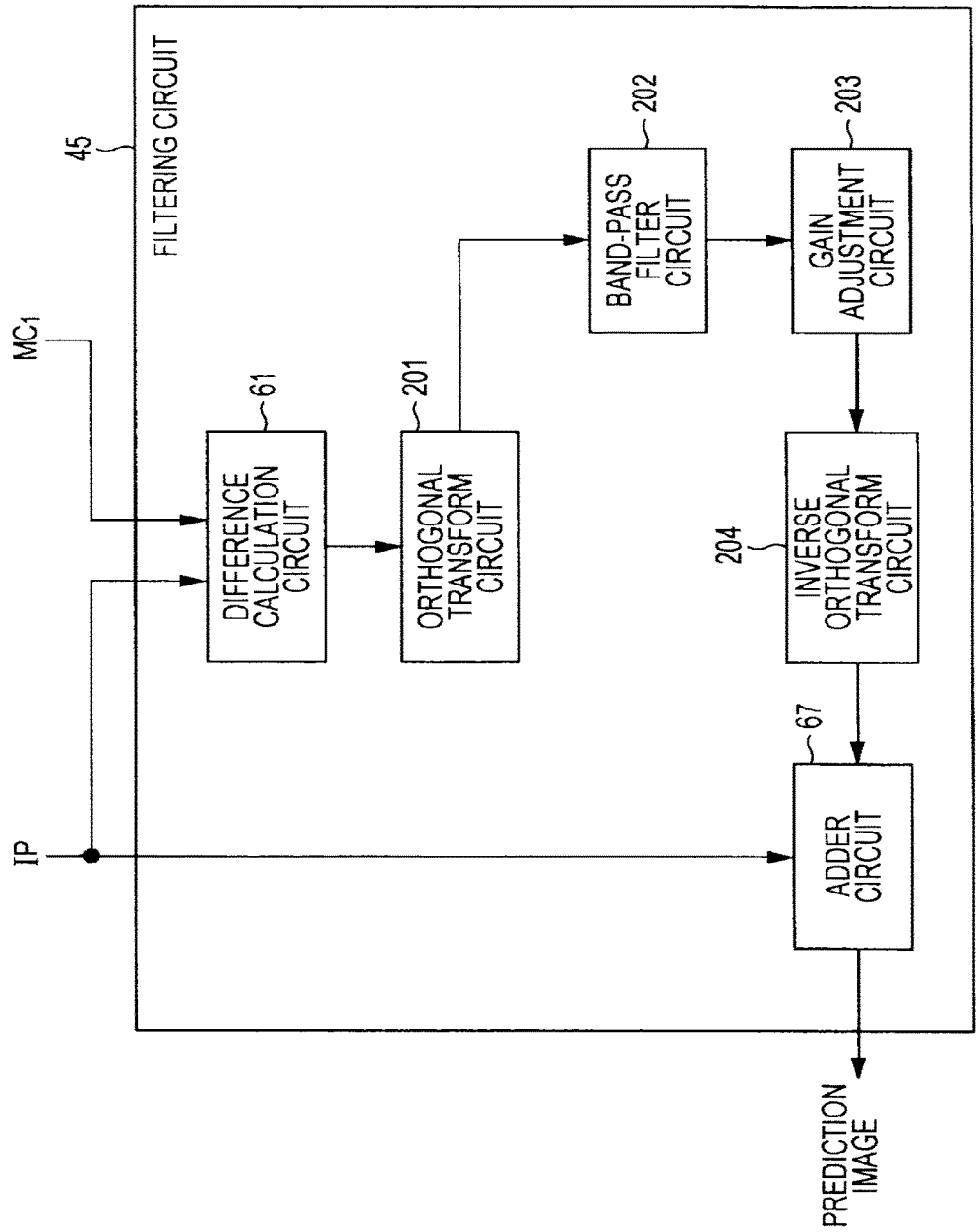
FIG. 24 is a block diagram illustrating still another example configuration of the filtering circuit.

FIG. 24 is a block diagram illustrating still another example configuration of the filtering circuit 45. The configuration elements corresponding to the configuration elements illustrated in FIG. 12 are assigned the same numerals. Redundant explanation will be omitted as appropriate.

In the filtering circuit 45 in FIG. 24, filtering is performed not on time domain signals but on frequency domain signals. Both the filtering circuits 45 illustrated in FIGS. 12 and 23 are configured to perform filtering on time domain signals.

The difference calculation circuit 61 in FIG. 24 calculates the difference between the intra-prediction image and the motion compensation image, and outputs a difference image to an orthogonal transform circuit 201.

The orthogonal transform circuit 201 performs the orthogonal transform, represented by the DCT (Discrete Cosine Transform), Hadamard transform, and KLT (Karhunen Loeve Transformation), on the difference image, and outputs a signal obtained after the orthogonal transform to a band-pass filter circuit 202. Performing the orthogonal transform and performing filtering on signals in the frequency domain make it possible to more flexibly implement a high-accuracy filtering process than that in a case where filtering is performed on signals in the time domain.

In a case where the DCT is used as the orthogonal transform, an output DF obtained after the orthogonal transform is represented by Equation (10) below. In Equation (10), DCT(X) represents the performance of a two-dimensional DCT process on a signal X.

[Math. 10]

$$DF = DCT(D) \qquad (10)$$

The band-pass filter circuit 202 performs filtering on the output of the orthogonal transform circuit 201, and outputs a signal in a certain band.

A gain adjustment circuit 203 adjusts the gain of the output of the band-pass filter circuit 202 by multiplying it by α, and also performs frequency component adjustment. An output XF of the gain adjustment circuit 203 is represented by Equation (11) below. In Equation (11), BPF(X) represents the performance of a band-pass filtering process on a signal X.

[Math. 11]

$$XF = \alpha \cdot BPF(DF) \quad (11)$$

An inverse orthogonal transform circuit 204 performs the inverse orthogonal transform using a scheme corresponding to the orthogonal transform performed by the orthogonal transform circuit 201, and transforms the frequency domain signal supplied from the gain adjustment circuit 203 into a time domain signal. For example, in a case where the orthogonal transform circuit 201 uses the DCT as the orthogonal transform, the inverse orthogonal transform circuit 204 performs the IDCT. An output X of the inverse orthogonal transform circuit 204 is represented by Equation (12) below. In Equation (12), IDCT(X) represents the performance of a two-dimensional IDCT process on the signal X.

[Math. 12]

$$X = IDCT(XF) \quad (12)$$

The adder circuit 67 adds the signal X supplied from the inverse orthogonal transform circuit 204 to the intra-prediction image in the time domain, and outputs an obtained image as a prediction image. A prediction image S(i, j) that is the final output of the adder circuit 67 is represented by Equation (13) as follows.

[Math. 13]

$$S(i,j) = MC_0(i,j) + X(i,j) \quad (13)$$

In this manner, even if filtering is performed on a frequency domain signal, a high-accuracy prediction image can be generated.

Furthermore, in the foregoing description, it is assumed that filtering prediction is performed using two reference frames. However, a larger number of frames may be used as reference frames.

Figure 25:
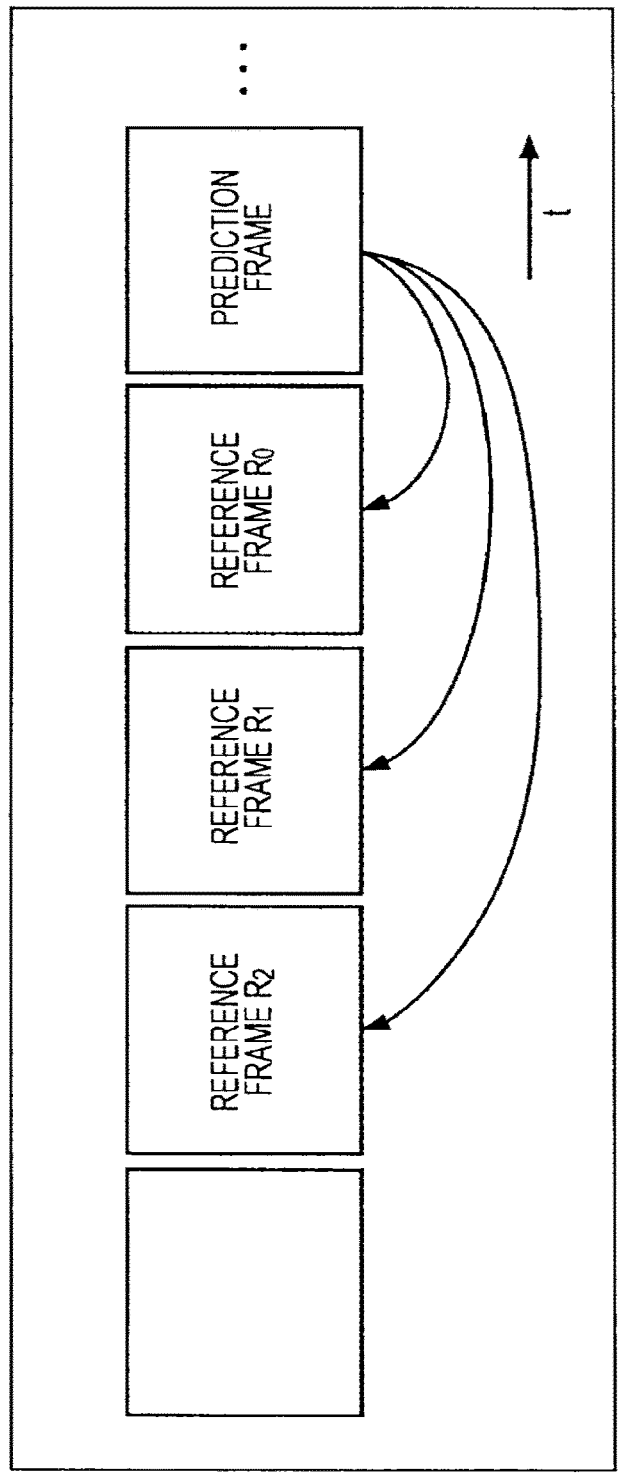
FIG. 25 is a diagram illustrating an example in a case where three reference frames are used.

FIG. 25 is a diagram illustrating an example in a case where three reference frames are used.

In the example in FIG. 25, the temporally preceding frame with respect to the time of a prediction frame, the further preceding frame, and the still further preceding frame, i.e., three frames, are set as reference frames. The preceding frame closer to the prediction frame is set as a reference frame R0, the preceding frame with respect to the reference frame R0 is set as a reference frame R1, and the preceding frame with respect to the reference frame R1 is set as a reference frame R2.

Figure 26:
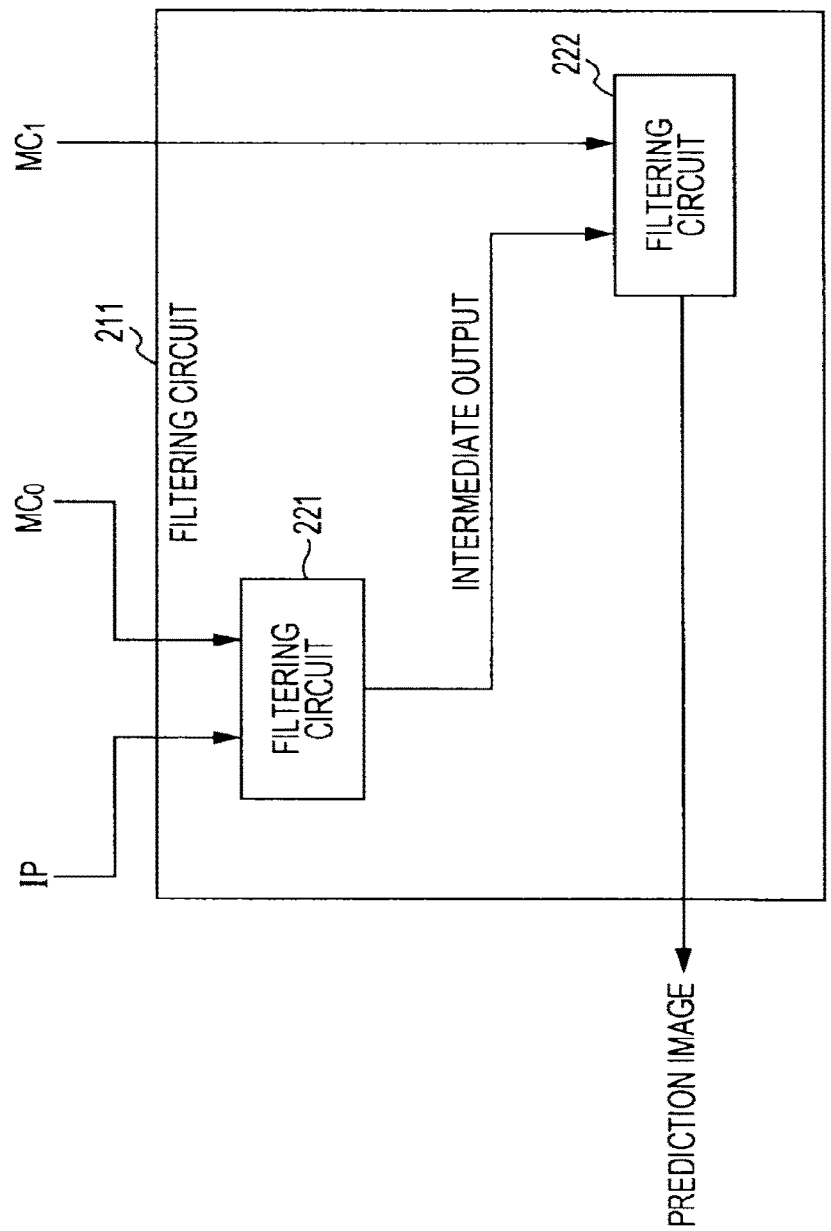
FIG. 26 is a block diagram illustrating an example configuration of the filtering circuit in a case where three reference frames are used.

FIG. 26 is a block diagram illustrating an example configuration of a filtering circuit in a case where three reference frames are used.

As illustrated in FIG. 26, a filtering circuit 211 is composed of a filtering circuit 221 and a filtering circuit 222. Each of the filtering circuit 221 and the filtering circuit 222 has the configuration as illustrated in FIG. 12, 23, or 24. That is, the filtering circuit 211 is configured to operate as a three-input and one-output circuit by connecting, in cascade, filtering circuits 45 used for the two-input and one-output design.

Here, the explanation will be given assuming that a motion compensation image extracted from the reference frame R0 is set as the motion compensation image MC0, a motion compensation image extracted from the reference frame R1 is set as the motion compensation image MC1, and an intra-prediction image is obtained in the current frame. The intra-prediction image IP and the motion compensation image MC0 are input to the filtering circuit 221 and the motion compensation image MC1 is input to the filtering circuit 222.

The filtering circuit 221 performs filtering on the intra-prediction image IP and the motion compensation image MC0 in a manner as explained with reference to FIG. 12, and outputs an intermediate output X that is a result of filtering to the filtering circuit 222.

The filtering circuit 221 performs filtering on the intermediate output X and the motion compensation image MC1 in a manner as explained with reference to FIG. 12, and outputs a result of filtering as a prediction image.

The filtering circuit 211 that handles such three frames, in place of the filtering circuit 45, can also be provided in the decoding apparatus 1 in FIG. 5 or the encoding apparatus 101 in FIG. 17.

Note that the filtering circuit 221 and the filtering circuit 222 may not necessarily have the same configuration, and may have different configurations such that one of them has the configuration illustrated in FIG. 12 and the other has the configuration illustrated in FIG. 23. Furthermore, parameters used for the filters can also be made different from each other while taking into account the input/output characteristics obtained before and after filtering.

The filtering circuit 211 may perform filtering not on motion compensation images extracted from reference frames located in one temporal direction but on motion compensation images extracted from three reference frames located in the forward and backward directions.

Note that in a case where the preceding and following frames with respect to the time of a prediction frame are used as reference frames, including the case explained with reference to FIG. 12, a parameter such as a tap coefficient during filtering may be dynamically changed in accordance with the time directions of the reference frames or the distances therebetween.

Compressed image information is transmitted from the encoding apparatus 101 to the decoding apparatus 1 via various media including recording media such as an optical disk, a magnetic disk, and a flash memory, satellite broadcasting, cable TV, the Internet, and a mobile phone network.

The series of processes described above can be executed by hardware or software. In a case where the series of processes is executed software, a program constituting the software is installed from a program recording medium into a computer incorporated in dedicated hardware, or a general-purpose personal computer or the like that is capable of executing various functions by installing various programs therein.

Figure 27:
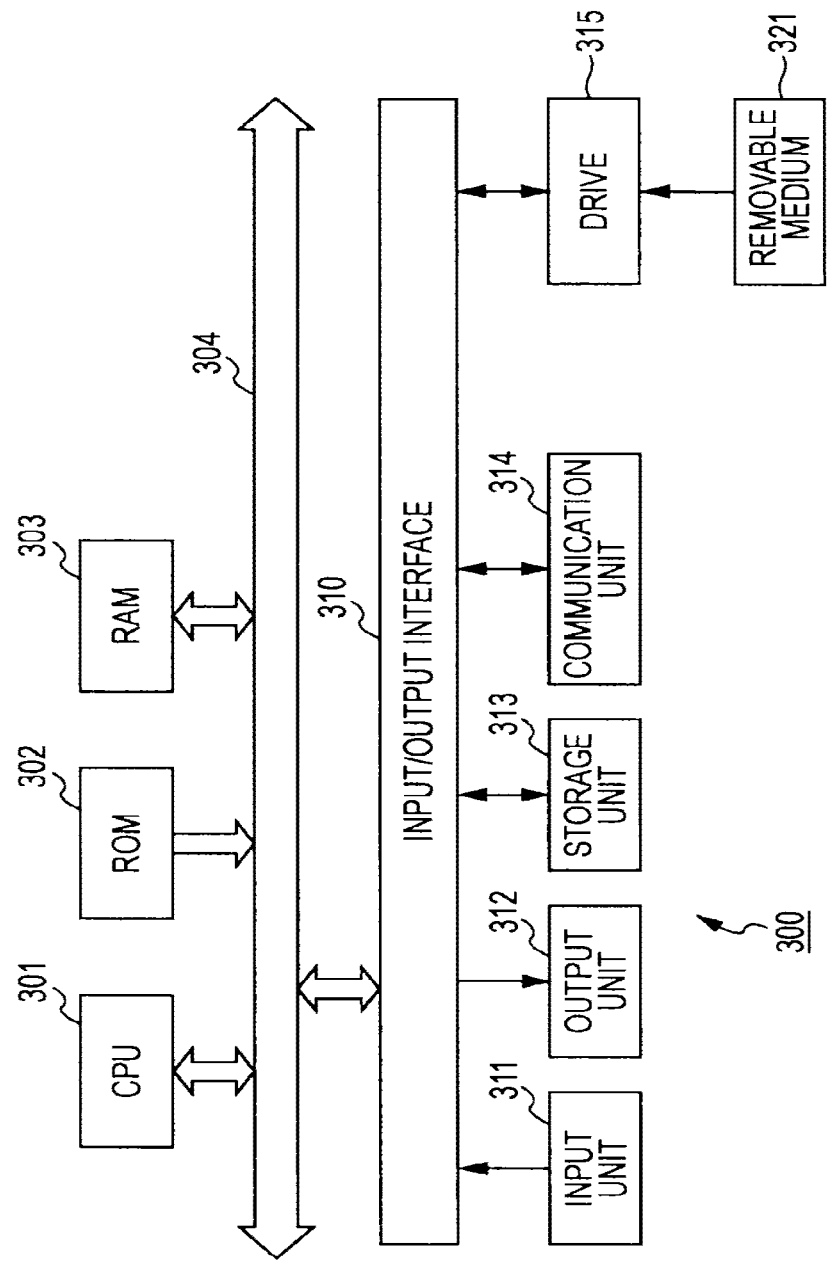
FIG. 27 is a block diagram illustrating an example configuration of a personal computer.

FIG. 27 is a block diagram illustrating an example configuration of hardware of a computer 300 that executes the series of processes described above in accordance with a program.

A CPU (Central Processing Unit) 301, a ROM (Read Only Memory) 302, and a RAM (Random Access Memory) 303 are interconnected via a bus 304.

An input/output interface 310 is further connected to the bus 304. An input unit 311 including a keyboard, a mouse, a microphone, etc., an output unit 312 including a display, a speaker, etc., a storage unit 313 formed of a hard disk, a non-volatile memory, etc., a communication unit 314 formed of a network interface, etc., and a drive 315 that drives a removable medium 321 such as an optical disk or a semiconductor memory are connected to the input/output interface 310.

In the computer 300 configured as above, the CPU 301 loads a program stored in, for example, the storage unit 313 into the RAM 303 via the input/output interface 310 and the bus 304 and executes the program, thereby performing the series of processes described above.

The program executed by the CPU 301 is provided by being recorded on, for example, the removable medium 321 or via a wired or wireless transmission medium such as a local area network, the Internet, or digital broadcasting, and is installed into the storage unit 313.

Note that the program executed by the computer may be a program in which processes are performed in a time-series manner in accordance with the order explained herein, or may be a program in which processes are performed in parallel or at a necessary timing such as when called.

Furthermore, as used herein, the steps describing a program recorded on a recording medium include, of course, processes performed in a time-series manner in the order described herein and also include processes that are not necessarily processed in a time-series manner but are executed in parallel or individually.

Furthermore, as used herein, the term system refers to the overall apparatus composed of a plurality of devices (apparatuses).

Furthermore, the configuration explained above as a single apparatus (or processing unit) may be divided to construct a plurality of apparatuses (or processing units). Conversely, the configuration explained above as a plurality of apparatuses (or processing units) may be collected to construct a single apparatus (or processing unit). Furthermore, of course, a configuration other than that described above may be added to the configuration of each apparatus (or each processing unit). Moreover, a portion of the configuration of a certain apparatus (or processing unit) may be included in the configuration of another apparatus (or another processing unit) if the configuration or operation as an entire system is substantially the same. That is to say, embodiments of the present invention are not to be limited to the embodiments described above, and a variety of changes can be made without deviating from the gist of the present invention.

For example, the decoding apparatus 1 or encoding apparatus 101 described above can be applied to any electronic device. Examples thereof will be explained hereinafter.

Figure 28:
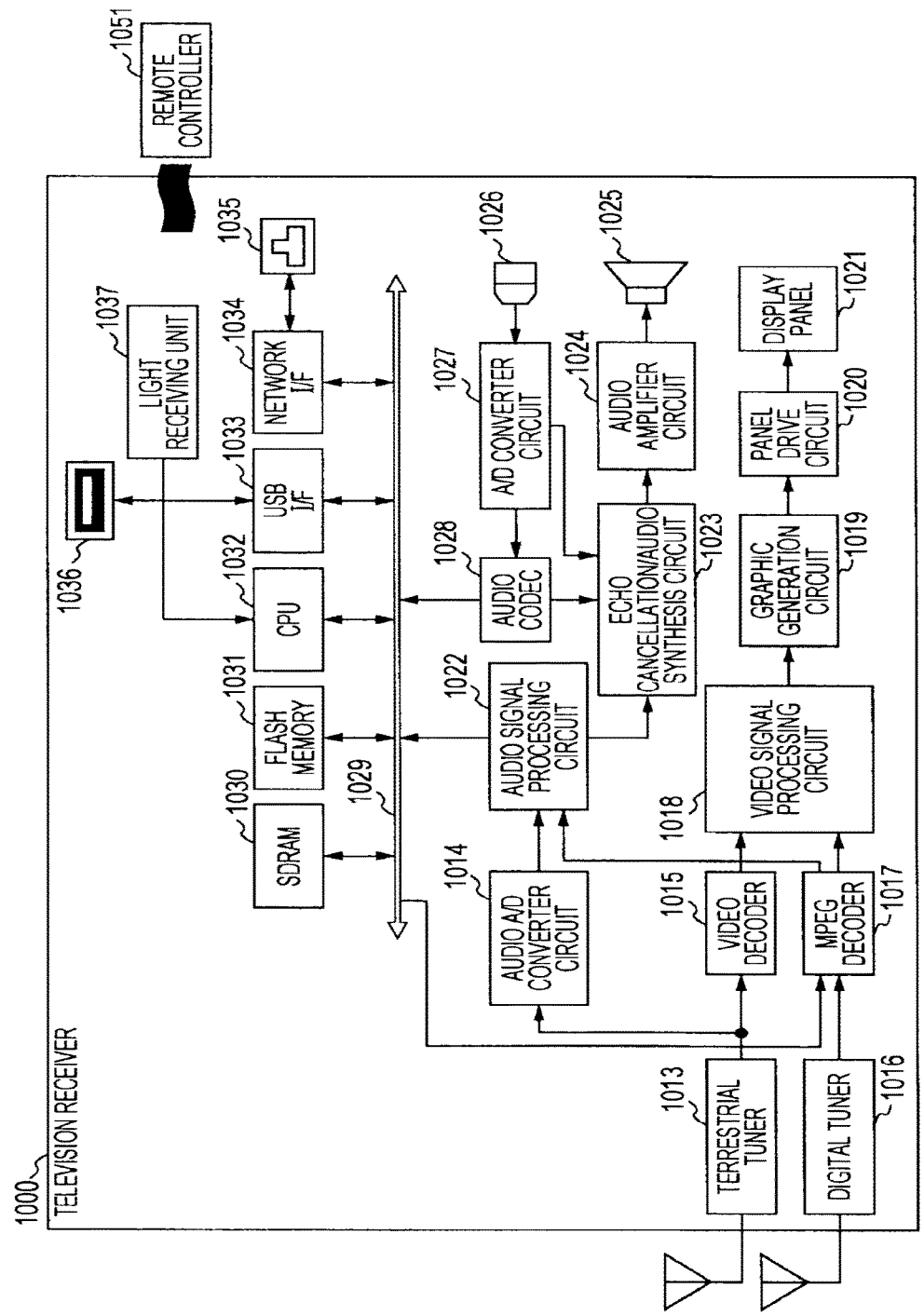
FIG. 28 is a block diagram illustrating an example configuration of a main part of a television receiver to which the present invention is applied.

FIG. 28 is a block diagram illustrating an example configuration of a main part of a television receiver that uses the decoding apparatus 1 to which the present invention is applied.

A television receiver 1000 illustrated in FIG. 28 includes a terrestrial tuner 1013, a video decoder 1015, a video signal processing circuit 1018, a graphic generation circuit 1019, a panel drive circuit 1020, and a display panel 1021.

The terrestrial tuner 1013 receives a broadcast wave signal of a terrestrial analog broadcast via an antenna, demodulates it, obtains a video signal, and supplies it to the video decoder 1015. The video decoder 1015 performs a decoding process on the video signal supplied from the terrestrial tuner 1013, and supplies an obtained digital component signal to the video signal processing circuit 1018.

The video signal processing circuit 1018 performs a certain process such as noise removal on the video data supplied from the video decoder 1015, and supplies obtained video data to the graphic generation circuit 1019.

The graphic generation circuit 1019 generates video data of a program to be displayed on the display panel 1021, image data obtained through a process that is based on an application supplied via a network, or the like, and supplies the generated video data or image data to the panel drive circuit 1020. Furthermore, the graphic generation circuit 1019 also performs processes, as appropriate, such as generating video data (graphic) for displaying a screen utilized by a user to select an item or the like, superimposing it onto the video data of the program to obtain video data, and supplying the obtained video data to the panel drive circuit 1020.

The panel drive circuit 1020 drives the display panel 1021 on the basis of the data supplied from the graphic generation circuit 1019, and causes video of a program or the various screens described above to be displayed on the display panel 1021.

The display panel 1021 is formed of an LCD (Liquid Crystal Display) or the like, and causes video of a program or the like to be displayed in accordance with the control by the panel drive circuit 1020.

Furthermore, the television receiver 1000 also includes an audio A/D (Analog/Digital) converter circuit 1014, an audio signal processing circuit 1022, an echo cancellation/audio synthesis circuit 1023, an audio amplifier circuit 1024, and a speaker 1025.

The terrestrial tuner 1013 demodulates a received broadcast wave signal to acquire a video signal as well as an audio signal. The terrestrial tuner 1013 supplies the acquired audio signal to the audio A/D converter circuit 1014.

The audio A/D converter circuit 1014 performs an A/D conversion process on the audio signal supplied from the terrestrial tuner 1013, and supplies an obtained digital audio signal to the audio signal processing circuit 1022.

The audio signal processing circuit 1022 performs a certain process such as noise removal on the audio data supplied from the audio A/D converter circuit 1014, and supplies obtained audio data to the echo cancellation/audio synthesis circuit 1023.

The echo cancellation/audio synthesis circuit 1023 supplies the audio data supplied from the audio signal processing circuit 1022 to the audio amplifier circuit 1024.

The audio amplifier circuit 1024 performs a D/A conversion process and an amplification process on the audio data supplied from the echo cancellation/audio synthesis circuit 1023, and adjusts it to a certain volume before outputting audio from the speaker 1025.

Further, the television receiver 1000 also includes a digital tuner 1016 and an MPEG decoder 1017.

The digital tuner 1016 receives a broadcast wave signal of a digital broadcast (terrestrial digital broadcast, BS (Broadcasting Satellite)/CS (Communications Satellite) digital broadcast) via the antenna, demodulates it, acquires an MPEG-TS (Moving Picture Experts Group-Transport Stream), and supplies it to the MPEG decoder 1017.

The MPEG decoder 1017 descrambles the MPEG-TS supplied from the digital tuner 1016, and extracts a stream including the data of a program to be reproduced (to be viewed and listened to). The MPEG decoder 1017 decodes audio packets forming the extracted stream, and supplies obtained audio data to the audio signal processing circuit 1022. Also, the MPEG decoder 1017 decodes video packets forming the stream, and supplies obtained video data to the video signal processing circuit 1018. Furthermore, the MPEG decoder 1017 supplies EPG (Electronic Program Guide) data extracted from the MPEG-TS to a CPU 1032 via a path that is not illustrated in the figure.

The television receiver 1000 uses the decoding apparatus 1 described above as the MPEG decoder 1017 that decodes a video packet in the above way. Note that an MPEG-TS transmitted from a broadcast station or the like has been encoded by the encoding apparatus 101.

Similarly to the case of the decoding apparatus 1, the MPEG decoder 1017 obtains a motion prediction image from the frame (N−1) using a motion vector, and also obtains a spatial prediction image from the frame N by performing intra-prediction by utilizing a decoded pixel value in the frame N. And the MPEG decoder 1017 performs a filtering process on the two types of images to generate a prediction image. Accordingly, the MPEG decoder 1017 can generate a new prediction image closer to the original image.

The video data supplied from the MPEG decoder 1017 is subjected to, similarly to the case of the video data supplied from the video decoder 1015, a certain process by the video signal processing circuit 1018, and generated video data or the like is superimposed thereon by the graphic generation circuit 1019. The resulting data is supplied to the display panel 1021 via the panel drive circuit 1020, and an image thereof is displayed.

The audio data supplied from the MPEG decoder 1017 is subjected to, similarly to the case of the audio data supplied from the audio A/D converter circuit 1014, a certain process by the audio signal processing circuit 1022, supplied to the audio amplifier circuit 1024 via the echo cancellation/audio synthesis circuit 1023, and subjected to a D/A conversion process or an amplification process. Consequently, audio whose volume has been adjusted to a certain value is output from the speaker 1025.

Furthermore, the television receiver 1000 also includes a microphone 1026 and an A/D converter circuit 1027.

The A/D converter circuit 1027 receives a signal of audio of a user, which is captured by the microphone 1026 provided in the television receiver 1000 for use in audio conversation, performs an A/D conversion process on the received audio signal, and supplies obtained digital audio data to the echo cancellation/audio synthesis circuit 1023.

In a case where data of audio of a user (user A) of the television receiver 1000 has been supplied from the A/D converter circuit 1027, the echo cancellation/audio synthesis circuit 1023 performs echo cancellation on the audio data of the user A, and causes the data of audio obtained by, for example, being combined with other audio data to be output from the speaker 1025 via the audio amplifier circuit 1024.

Further, the television receiver 1000 also includes an audio codec 1028, an internal bus 1029, an SDRAM (Synchronous Dynamic Random Access Memory) 1030, a flash memory 1031, a CPU 1032, a USB (Universal Serial Bus) I/F 1033, and a network I/F 1034.

The A/D converter circuit 1027 receives a signal of audio of a user, which is captured by the microphone 1026 provided in the television receiver 1000 for use in audio conversation, performs an A/D conversion process on the received audio signal, and supplies obtained digital audio data to the audio codec 1028.

The audio codec 1028 converts the audio data supplied from the A/D converter circuit 1027 into data of a certain format for transmission through a network, and supplies it to the network I/F 1034 via the internal bus 1029.

The network I/F 1034 is connected to a network via a cable attached to a network terminal 1035. The network I/F 1034 transmits the audio data supplied from the audio codec 1028 to, for example, another apparatus connected to the network. Furthermore, the network I/F 1034 receives, for example, audio data transmitted from another apparatus connected over a network via the network terminal 1035, and supplies it to the audio codec 1028 via the internal bus 1029.

The audio codec 1028 converts the audio data supplied from the network I/F 1034 into data of a certain format, and supplies it to the echo cancellation/audio synthesis circuit 1023.

The echo cancellation/audio synthesis circuit 1023 performs echo cancellation on the audio data supplied from the audio codec 1028, and causes the data of audio obtained by, for example, being combined with other audio data to be output from the speaker 1025 via the audio amplifier circuit 1024.

The SDRAM 1030 stores various data necessary for the CPU 1032 to perform processes.

The flash memory 1031 stores the program executed by the CPU 1032. The program stored in the flash memory 1031 is read by the CPU 1032 at a certain timing such as when the television receiver 1000 is started. The flash memory 1031 also stores EPG data acquired via digital broadcasting, data acquired from a certain server via a network, and the like.

For example, the flash memory 1031 stores an MPEG-TS including content data acquired from a certain server over a network under the control of the CPU 1032. The flash memory 1031 supplies the MPEG-TS to the MPEG decoder 1017 via the internal bus 1029 by, for example, the control of the CPU 1032.

The MPEG decoder 1017 processes the MPEG-TS in a manner similar to that in the case of the MPEG-TS supplied from the digital tuner 1016. In this manner, the television receiver 1000 can receive content data composed of video, audio, and the like over a network, decode the content data using the MPEG decoder 1017, display video of the content data, and output audio.

Furthermore, the television receiver 1000 also includes a light receiving unit 1037 that receives light of an infrared signal transmitted from a remote controller 1051.

The light receiving unit 1037 receives infrared light from the remote controller 1051, and outputs a control code indicating the content of a user operation obtained through demodulation to the CPU 1032.

The CPU 1032 executes a program stored in the flash memory 1031, and controls the overall operation of the television receiver 1000 in accordance with the control code supplied from the light receiving unit 1037 or the like. The CPU 1032 is connected to each unit of the television receiver 1000 via a path that is not illustrated in the figure.

The USB I/F 1033 transmits and receives data to and from an external device of the television receiver 1000, which is connected via a USB cable attached to a USB terminal 1036. The network I/F 1034 is connected to a network via a cable attached to the network terminal 1035, and also transmits and receives data other than audio data to and from various apparatuses connected to the network.

With the use of the decoding apparatus 1 as the MPEG decoder 1017, the television receiver 1000 can generate a prediction image by adding an image representing high-frequency components to the intra-prediction image IP during the decoding on video packets forming a stream.

This prediction image includes more high-frequency components than a prediction image obtained in a case where bidirectional prediction is simply performed.

Furthermore, compared with the case where unidirectional prediction is simply performed, a prediction image can be generated by more efficiently utilizing the temporal correlation of images.

Moreover, since a prediction image including a large number of high-frequency components to a decoded image in the adder circuit 15, the image finally output from the MPEG decoder 1017 is also a high-definition image including a large number of high-frequency components.

Furthermore, in the generation of a prediction image, intra-prediction is performed in the current frame, and a generated intra-prediction image IP is utilized together with the motion compensation image MC1. Thus, the number of motion vectors for generating a motion compensation image can be reduced.

In this manner, the television receiver 1000 can realize improvement in encoding efficiency by compensating for the lack of prediction accuracy of intra-prediction by using the prediction accuracy of inter-prediction during the decoding on video packets forming a stream. Moreover, the reduction in processing cost can also be realized by reducing the number of reference planes necessary for inter-prediction.

Figure 29:
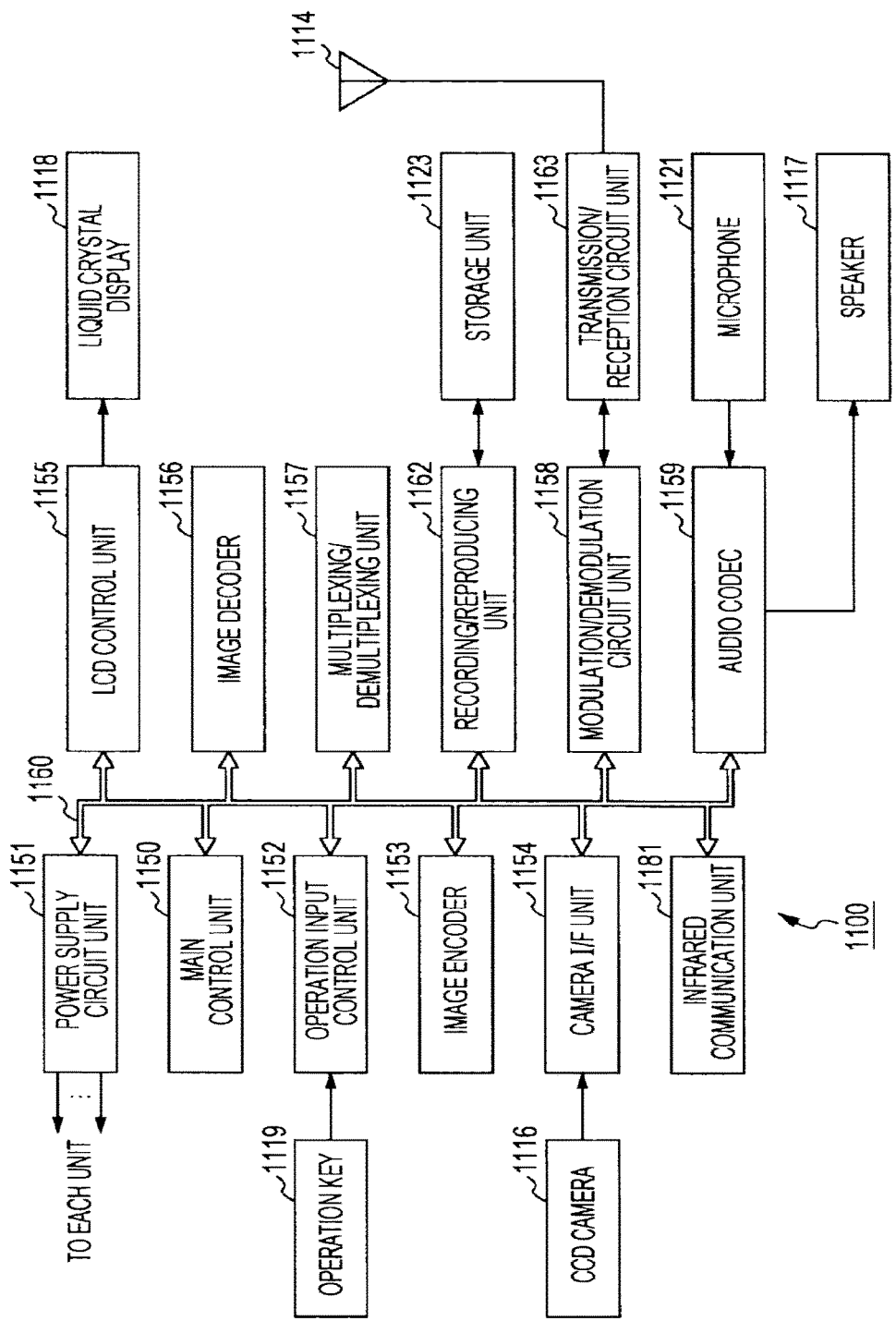
FIG. 29 is a block diagram illustrating an example configuration of a main part of a mobile phone to which the present invention is applied.

FIG. 29 is a block diagram illustrating an example configuration of a main part of a mobile phone that uses the decoding apparatus 1 and the encoding apparatus 101 to which the present invention is applied.

A mobile phone 1100 illustrated in FIG. 29 includes a main control unit 1150 configured to totally control individual units, a power supply circuit unit 1151, an operation input control unit 1152, an image encoder 1153, a camera I/F unit 1154, an LCD control unit 1155, an image decoder 1156, a multiplexing/demultiplexing unit 1157, a recording/reproducing unit 1162, a modulation/demodulation circuit unit 1158, and an audio codec 1159. They are interconnected via a bus 1160.

Furthermore, the mobile phone 1100 includes an operation key 1119, a CCD (Charge Coupled Devices) camera 1116, a liquid crystal display 1118, a storage unit 1123, a transmission/reception circuit unit 1163, an antenna 1114, a microphone (mic) 1121, and a speaker 1117.

When a call-end and power key is turned on by a user operation, the power supply circuit unit 1151 supplies electric power to each unit from a battery pack, thereby starting the mobile phone 1100 so as to be able to operate.

The mobile phone 1100 performs various operations in various modes such as an audio call mode and a data communication mode, such as transmitting and receiving an audio signal, transmitting and receiving electronic mail and image data, capturing images, and recording data, on the basis of the control of the main control unit 1150 composed of a CPU, a ROM, a RAM, etc.

For example, in the audio call mode, the mobile phone 1100 converts, using the audio codec 1159, an audio signal collected by the microphone (mic) 1121 into digital audio data, performs a spread spectrum process on the digital audio data using the modulation/demodulation circuit unit 1158, and performs a digital-to-analog conversion process and a frequency conversion process using the transmission/reception circuit unit 1163. The mobile phone 1100 transmits a transmission signal obtained through the conversion processes to a base station that is not illustrated in the figure via the antenna 1114. The transmission signal (audio signal) transmitted to the base station is supplied to a mobile phone on the other end of the call via a public telephone line network.

Furthermore, for example, in the audio call mode, the mobile phone 1100 amplifies, using the transmission/reception circuit unit 1163, a received signal that has been received by the antenna 1114, further performs a frequency conversion process and an analog-to-digital conversion process, performs an inverse spread spectrum process using the modulation/demodulation circuit unit 1158, and converts the resulting signal into an analog audio signal using the audio codec 1159. The mobile phone 1100 outputs the analog audio signal obtained by conversion from the speaker 1117.

Moreover, for example, in a case where electronic mail is transmitted in the data communication mode, the mobile phone 1100 accepts, using the operation input control unit 1152, text data of electronic mail input by operating the operation key 1119. The mobile phone 1100 processes the text data using the main control unit 1150, and causes the resulting data to be displayed as an image on the liquid crystal display 1118 via the LCD control unit 1155.

Furthermore, the mobile phone 1100 generates, using the main control unit 1150, electronic mail data on the basis of the text data accepted by the operation input control unit 1152, on the basis of a user instruction, or the like. The mobile phone 1100 performs, using the modulation/demodulation circuit unit 1158, a spread spectrum process on the electronic mail data, and performs, using the transmission/reception circuit unit 1163, a digital-to-analog conversion process and a frequency conversion process. The mobile phone 1100 transmits a transmission signal obtained by the conversion processes to a base station that is not illustrated in the figure via the antenna 1114. The transmission signal (electronic mail) transmitted to the base station is supplied to a certain destination via a network, a mail server, and the like.

Furthermore, for example, in a case where electronic mail is received in the data communication mode, the mobile phone 1100 receives, using the transmission/reception circuit unit 1163, a signal transmitted from a base station via the antenna 1114, amplifies it, and further performs a frequency conversion process and an analog-to-digital conversion process. The mobile phone 1100 performs an inverse spread spectrum process on the received signal using the modulation/demodulation circuit unit 1158 to restore the original electronic mail data. The mobile phone 1100 displays the restored electronic mail data on the liquid crystal display 1118 via the LCD control unit 1155.

Note that the mobile phone 1100 is also capable of recording (storing) received electronic mail data on the storage unit 1123 via the recording/reproducing unit 1162.

The storage unit 1123 is any rewritable storage medium. The storage unit 1123 may be, for example, a semiconductor memory such as a RAM or a built-in flash memory, or may be a hard disk, or a removable medium such as a magnetic disk, a magneto-optical disk, an optical disk, a USB memory, or a memory card. Of course, any other type of medium may be used.

Further, for example, in a case where image data is transmitted in the data communication mode, the mobile phone 1100 generates, using the CCD camera 1116, image data by capturing an image. The CCD camera 1116 includes optical devices such as a lens and an aperture, and a CCD serving as a photoelectric conversion element, captures an image of an object, converts the intensity of received light into an electrical signal, and generates image data of the image of the object. The CCD camera 1116 encodes the image data using the image encoder 1153 via the camera I/F unit 1154, and converts the image data into encoded image data.

The mobile phone 1100 uses the encoding apparatus 101 described above as the image encoder 1153 that performs the above process. Similarly to the case of the encoding apparatus 101, the image encoder 1153 obtains a motion prediction image from the frame (N−1) using motion vectors, and, in addition, obtains a spatial prediction image from the frame N through intra-prediction utilizing a decoded pixel value in the frame N. And the image encoder 1153 performs a filtering process on the two types of images to generate a prediction image. Accordingly, the image encoder 1153 can generate a new prediction image closer to the original image. Hence, only a small amount of code to be assigned to residuals can be required, thus making it possible to increase encoding efficiency.

Note that, at this time, the mobile phone 1100 simultaneously performs, using the audio codec 1159, analog-to-digital conversion on the audio collected by the microphone (mic) 1121 during the capture of an image using the CCD camera 1116, and further encodes it.

The mobile phone 1100 multiplexes, using the multiplexing/demultiplexing unit 1157, the encoded image data supplied from the image encoder 1153 and the digital audio data supplied from the audio codec 1159 using a certain scheme. The mobile phone 1100 performs, using the modulation/demodulation circuit unit 1158, a spread spectrum process on multiplexed data obtained as a result, and performs, using the transmission/reception circuit unit 1163, a digital-to-analog conversion process and a frequency conversion process. The mobile phone 1100 transmits a transmission signal obtained by the conversion process to a base station that is not illustrated in the figure via the antenna 1114. The transmission signal (image data) transmitted to the base station is supplied to the other end of the communication via a network or the like.

Note that in a case where no image data is to be transmitted, the mobile phone 1100 may also cause image data generated using the CCD camera 1116 to be displayed on the liquid crystal display 1118 via the LCD control unit 1155 without intervention of the image encoder 1153.

Furthermore, for example, in a case where data of a moving image file having a link to a simplified homepage or the like is to be received in the data communication mode, the mobile phone 1100 receives, using the transmission/reception circuit unit 1163 via the antenna 1114, a signal transmitted from a base station, amplifies it, and further performs a frequency conversion process and an analog-to-digital conversion process. The mobile phone 1100 performs an inverse spread spectrum process on the received signal using the modulation/demodulation circuit unit 1158 to restore the original multiplexed data. The mobile phone 1100 demultiplexes, using the multiplexing/demultiplexing unit 1157, the multiplexed data to separate it into encoded image data and audio data.

The mobile phone 1100 decodes encoded image data using the image decoder 1156 to generate reproduction moving image data, and displays the reproduction moving image data on the liquid crystal display 1118 via the LCD control unit 1155. This allows, for example, moving image data included in a moving image file linked to the simplified homepage to be displayed on the liquid crystal display 1118.

The mobile phone 1100 uses the decoding apparatus 1 described above as the image decoder 1156 that performs the above process. That is to say, similarly to the case of the decoding apparatus 1, the image decoder 1156 obtains a motion prediction image from the frame (N−1) using motion vectors, and, in addition, obtains a spatial prediction image from the frame N through intra-prediction utilizing a decoded pixel value in the frame N. And the image decoder 1156 performs a filtering process on the two types of images to generate a prediction image. Accordingly, the image decoder 1156 can generate a new prediction image closer to the original image.

At this time, the mobile phone 1100 simultaneously converts digital audio data into an analog audio signal using the audio codec 1159, and causes it to be output from the speaker 1117. This allows, for example, audio data included in the moving image file linked to the simplified homepage to be reproduced.

Note that, similarly to the case of electronic mail, the mobile phone 1100 may also be capable of causing received data linked to the simplified homepage or the like to be recorded on (stored in) the storage unit 1123 via the recording/reproducing unit 1162.

Furthermore, the mobile phone 1100 can also analyze, using the main control unit 1150, a two-dimensional code obtained by the CCD camera 1116 by capturing an image thereof, and acquire information recorded in the two-dimensional code.

Moreover, the mobile phone 1100 can communicate with an external device via infrared light using an infrared communication unit 1181.

With the use of the encoding apparatus 101 as the image encoder 1153, the mobile phone 1100 can realize improvement in encoding efficiency by compensating for the lack of prediction accuracy of intra-prediction by using the prediction accuracy of inter-prediction when, for example, encoding image data generated by the CCD camera 1116 and transmitting the encoded image data. Moreover, since the number of reference frames necessary for inter-prediction can be reduced, the mobile phone 1100 can realize a reduction in processing cost.

Furthermore, with the use of the decoding apparatus 1 as the image decoder 1156, the mobile phone 1100 can be configured to generate a prediction image by adding an image representing high-frequency components to the intra-prediction image IP during decoding when, for example, receiving data of a moving image file (encoded data) linked to a simplified homepage.

Thereby, the mobile phone 1100 can realize improvement in encoding efficiency by compensating for the lack of prediction of intra-prediction accuracy by using the prediction accuracy of inter-prediction. Moreover, the reduction in processing cost can also be realized by reducing the number of reference planes necessary for inter-prediction.

Note that while it has been explained that the mobile phone 1100 uses the CCD camera 1116. However, the mobile phone 1100 may use, in place of the CCD camera 1116, an image sensor (CMOS image sensor) that uses a CMOS (Complementary Metal Oxide Semiconductor). Also in this case, similarly to the case of using the CCD camera 1116, the mobile phone 1100 can capture an image of an object and generate image data of the image of the object.

Furthermore, while the foregoing explanation has been given in the context of the mobile phone 1100, the decoding apparatus 1 and the encoding apparatus 101 can be applied to, similarly to the case of the mobile phone 1100, for example, any apparatus having an image capture function or communication function similar to that of the mobile phone 1100, such as a PDA (Personal Digital Assistants), a smartphone, a UMPC (Ultra Mobile Personal Computer), a netbook, or a notebook personal computer.

Figure 30:
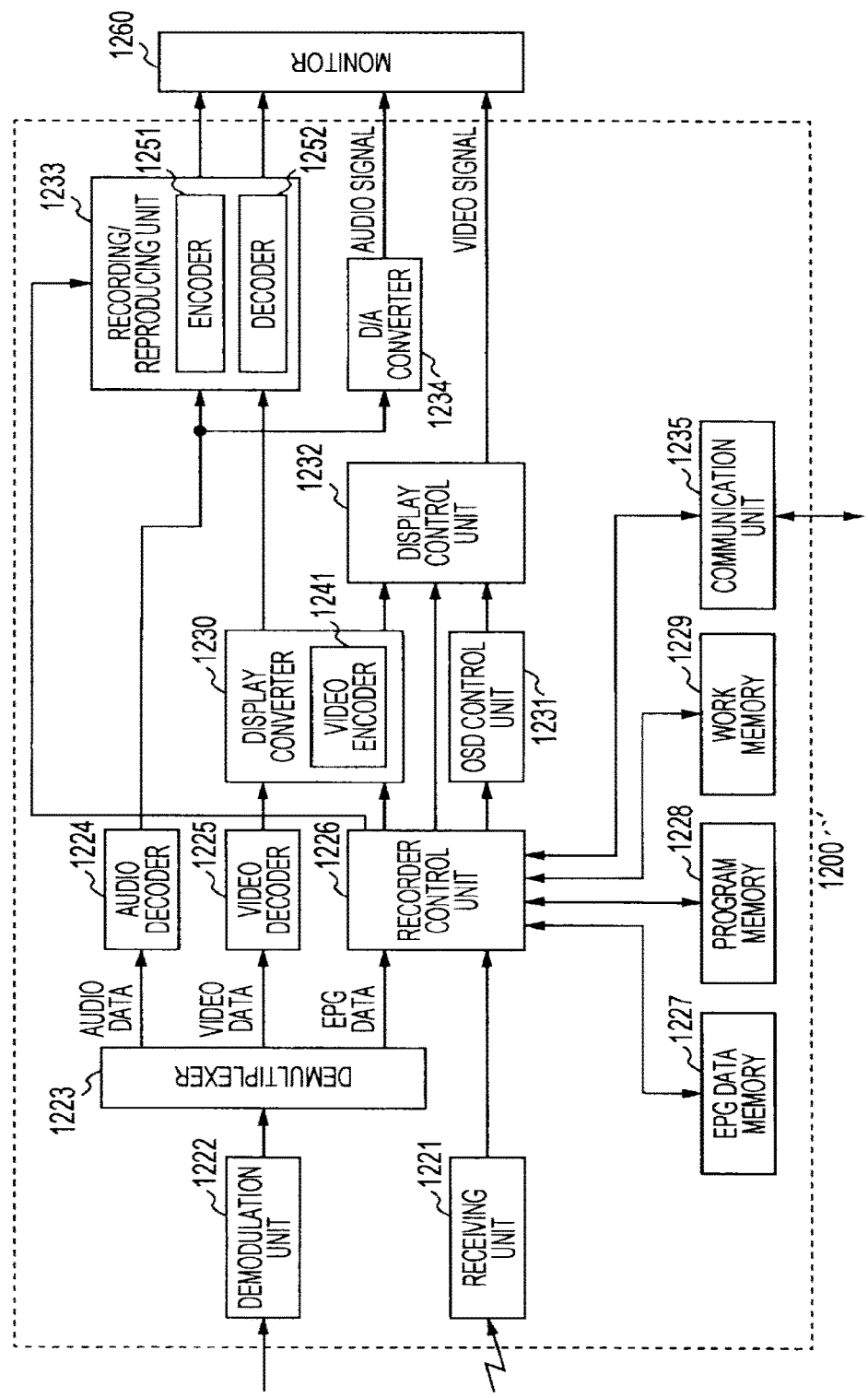
FIG. 30 is a block diagram illustrating an example configuration of a main part of a hard disk recorder to which the present invention is applied.

FIG. 30 is a block diagram illustrating an example configuration of a main part of a hard disk recorder that uses the decoding apparatus 1 and the encoding apparatus 101 to which the present invention is applied.

A hard disk recorder (HDD recorder) 1200 illustrated in FIG. 30 is an apparatus that saves, in its built-in hard disk, audio data and video data of a broadcast program included in a broadcast wave signal (television signal) transmitted from a satellite, a terrestrial antenna, or the like, which has been received by a tuner, and that provides a user with the saved data at a timing according to a user instruction.

The hard disk recorder 1200 can extract, for example, audio data and video data from a broadcast wave signal, decode them as appropriate, and store them in the built-in hard disk. Furthermore, the hard disk recorder 1200 can also acquire audio data or video data from another apparatus via, for example, a network, decode it as appropriate, and store the decoded data in the built-in hard disk.

Further, the hard disk recorder 1200 can decode audio data and video data recorded on, for example, the built-in hard disk, supply them to a monitor 1260, display an image thereof on a screen of the monitor 1260, and output audio thereof from a speaker of the monitor 1260. Furthermore, the hard disk recorder 1200 can also decode, for example, audio data and video data extracted from a broadcast wave signal acquired via a tuner or audio data and video data acquired from another apparatus via a network, supply them to the monitor 1260, display an image thereof on the screen of the monitor 1260, and output audio thereof from the speaker of the monitor 1260.

Of course, other operations are also possible.

As illustrated in FIG. 30, the hard disk recorder 1200 includes a receiving unit 1221, a demodulation unit 1222, a demultiplexer 1223, an audio decoder 1224, a video decoder 1225, and a recorder control unit 1226. The hard disk recorder 1200 further includes an EPG data memory 1227, a program memory 1228, a work memory 1229, a display converter 1230, an OSD (On Screen Display) control unit 1231, a display control unit 1232, a recording/reproducing unit 1233, a D/A converter 1234, and a communication unit 1235.

Furthermore, the display converter 1230 includes a video encoder 1241. The recording/reproducing unit 1233 includes an encoder 1251 and a decoder 1252.

The receiving unit 1221 receives an infrared signal from a remote controller (not illustrated), converts it into an electrical signal, and outputs it to the recorder control unit 1226. The recorder control unit 1226 is composed of, for example, a microprocessor or the like, and executes various processes in accordance with a program stored in the program memory 1228. At this time, the recorder control unit 1226 uses the work memory 1229 as necessary.

The communication unit 1235 is connected to a network, and performs a communication process with another apparatus via the network. For example, the communication unit 1235 is controlled by the recorder control unit 1226 to communicate with a tuner (not illustrated) and to output mainly a channel selection control signal to the tuner.

The demodulation unit 1222 demodulates a signal supplied from the tuner, and outputs it to the demultiplexer 1223. The demultiplexer 1223 demultiplexes the data supplied from the demodulation unit 1222 into audio data, video data, and EPG data, and outputs them to the audio decoder 1224, the video decoder 1225, and the recorder control unit 1226, respectively.

The audio decoder 1224 decodes the input audio data and outputs the decoded audio data to the recording/reproducing unit 1233. The video decoder 1225 decodes the input video data and outputs the decoded video data to the display converter 1230. The recorder control unit 1226 supplies the input EPG data to the EPG data memory 1227 to store the EPG data.

The display converter 1230 encodes, using the video encoder 1241, video data supplied from the video decoder 1225 or the recorder control unit 1226 into video data of, for example, the NTSC (National Television Standards Committee) scheme, and outputs it to the recording/reproducing unit 1233. Furthermore, the display converter 1230 converts the screen size of the video data supplied from the video decoder 1225 or the recorder control unit 1226 into the size corresponding to the size of the monitor 1260, converts the video data into video data of the NTSC scheme using the video encoder 1241, converts it into an analog signal, and outputs it to the display control unit 1232.

Under the control of the recorder control unit 1226, the display control unit 1232 superimposes an OSD signal output from the OSD (On Screen Display) control unit 1231 onto the video signal input from the display converter 1230, and outputs it to the display of the monitor 1260 to display it.

The audio data output from the audio decoder 1224, which has been converted into an analog signal by the D/A converter 1234, is also supplied to the monitor 1260. The monitor 1260 outputs the audio signal from its built-in speaker.

The recording/reproducing unit 1233 includes a hard disk as a storage medium on which video data, audio data, and the like are recorded.

The recording/reproducing unit 1233 encodes, using the encoder 1251, for example, the audio data supplied from the audio decoder 1224. Furthermore, the recording/reproducing unit 1233 encodes, using the encoder 1251, the video data supplied from the video encoder 1241 of the display converter 1230. The recording/reproducing unit 1233 combines the encoded data of the audio data and the encoded data of the video data using a multiplexer. The recording/reproducing unit 1233 performs channel coding on resulting composite data, amplifies it, and writes the data to the hard disk via a recording head.

The recording/reproducing unit 1233 reproduces the data recorded on the hard disk via a reproduction head, amplifies it, and separates it into audio data and video data using a demultiplexer. The recording/reproducing unit 1233 decodes the audio data and the video data using the decoder 1252. The recording/reproducing unit 1233 performs D/A conversion on the decoded audio data, and outputs it to the speaker of the monitor 1260. Furthermore, the recording/reproducing unit 1233 performs D/A conversion on the decoded video data, and outputs it to the display of the monitor 1260.

The recorder control unit 1226 reads the latest EPG data from the EPG data memory 1227 on the basis of a user instruction indicated by the infrared signal from the remote controller which is received via the receiving unit 1221, and supplies the EPG data to the OSD control unit 1231. The OSD control unit 1231 produces image data corresponding to the input EPG data, and outputs it to the display control unit 1232. The display control unit 1232 outputs the video data input from the OSD control unit 1231 to the display of the monitor 1260 to display it. This allows an EPG (electronic program guide) to be displayed on the display of the monitor 1260.

Furthermore, the hard disk recorder 1200 can also acquire various data such as video data, audio data, and EPG data supplied from another apparatus via a network such as the Internet.

The communication unit 1235 is controlled by the recorder control unit 1226 to acquire encoded data such as video data, audio data, and EPG data transmitted from another apparatus via a network, and supplies it to the recorder control unit 1226. The recorder control unit 1226 supplies, for example, encoded data of the acquired video data and audio data to the recording/reproducing unit 1233 to store it in a hard disk. At this time, the recorder control unit 1226 and the recording/reproducing unit 1233 may perform a process such as re-encoding as necessary.

Furthermore, the recorder control unit 1226 decodes encoded data of the acquired video data and audio data, and supplies obtained video data to the display converter 1230. The display converter 1230 processes the video data supplied from the recorder control unit 1226 in a manner similar to that of the video data supplied from the video decoder 1225, and supplies the resulting video data to the monitor 1260 via the display control unit 1232 to display an image thereof.

Furthermore, along with the display of the image, the recorder control unit 1226 may supply decoded audio data to the monitor 1260 via the D/A converter 1234 and output audio thereof from the speaker.

Further, the recorder control unit 1226 decodes encoded data of the acquired EPG data, and supplies the decoded EPG data to the EPG data memory 1227.

The hard disk recorder 1200 as above uses the decoding apparatus 1 as the video decoder 1225, the decoder 1252, and the built-in decoder of the recorder control unit 1226. That is to say, similarly to the case of the decoding apparatus 1, the video decoder 1225, the decoder 1252, and the built-in decoder of the recorder control unit 1226 obtain a motion prediction image from the frame (N−1) using motion vectors, and, in addition, obtain a spatial prediction image from the frame N through intra-prediction utilizing a decoded pixel value in the frame N. And the video decoder 1225, the decoder 1252, and the built-in decoder of the recorder control unit 1226 perform a filtering process on the two types of images to generate a prediction image. Accordingly, the video decoder 1225, the decoder 1252, and the built-in decoder of the recorder control unit 1226 can generate a new prediction image closer to the original image.

Accordingly, the hard disk recorder 1200 can be configured to generate a prediction image by adding an image representing high-frequency components to the intra-prediction image IP during decoding when, for example, receiving video data (encoded data) by a tuner or by the communication unit 1235 or when reproducing video data (encoded) from a hard disk by the recording/reproducing unit 1233.

Thereby, the hard disk recorder 1200 can realize improvement in encoding efficiency by compensating for the lack of prediction accuracy of intra-prediction by using the prediction accuracy of inter-prediction. Moreover, the reduction in processing cost can also be realized by reducing the number of reference planes necessary for inter-prediction.

Furthermore, hard disk recorder 1200 uses the encoding apparatus 101 as the encoder 1251. Similarly to the case of the encoding apparatus 101, the encoder 1251 performs a filtering process on a motion prediction image and an intra-prediction image using motion vectors to generate a prediction image. Accordingly, the encoder 1251 can generate a new prediction image closer to the original image. Hence, only a small amount of code to be assigned to residuals can be required, thus making it possible to increase encoding efficiency.

Accordingly, the hard disk recorder 1200 can improve encoding efficiency by compensating for the lack of prediction accuracy of intra-prediction by using the prediction accuracy of inter-prediction when, for example, recording encoded data on a hard disk. Moreover, since the number of reference frames necessary for inter-prediction, the hard disk recorder 1200 can realize a reduction in processing cost.

Note that while the hard disk recorder 1200 that records video data and audio data on a hard disk has been explained, of course, any type of recording medium may be used. For example, even a recorder that uses a recording medium other than a hard disk, such as a flash memory, an optical disk, or a videotape, can also use the decoding apparatus 1 and the encoding apparatus 101 in a manner similar to that in the case of the hard disk recorder 1200 described above.

Figure 31:
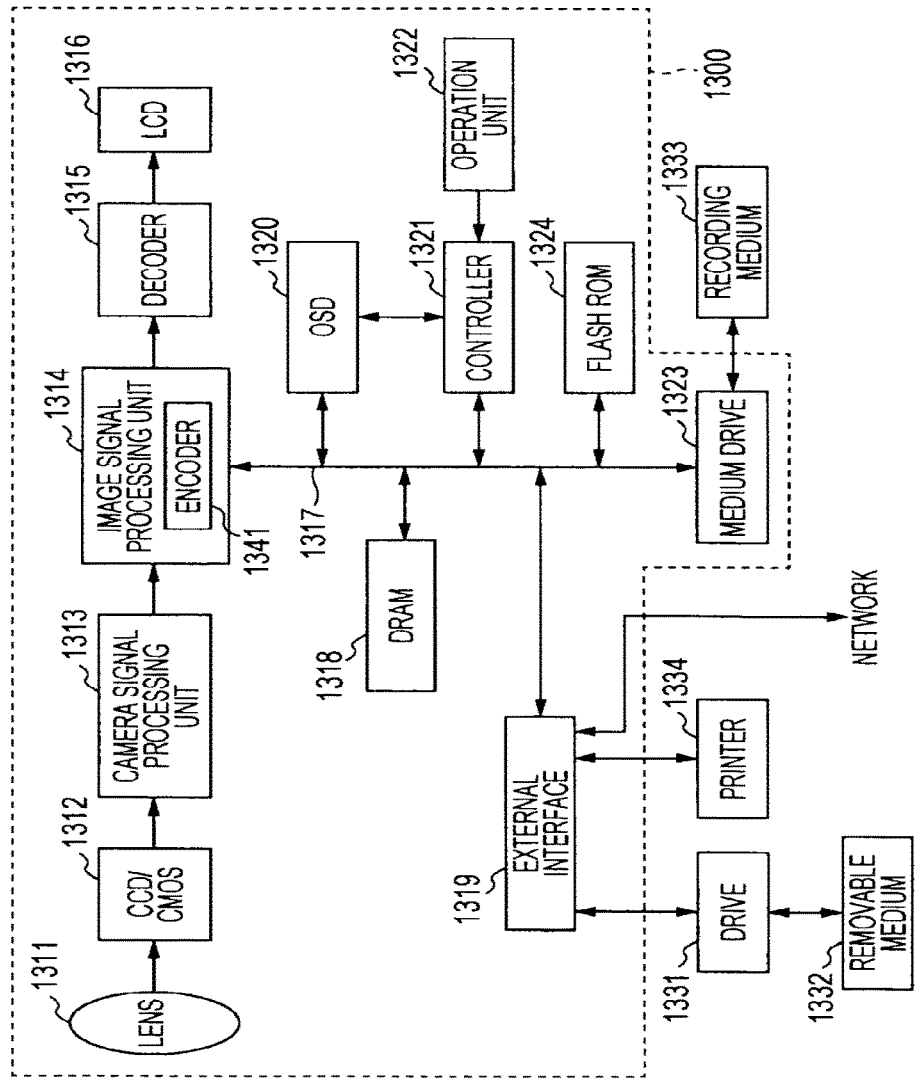
FIG. 31 is a block diagram illustrating an example configuration of a main part of a camera to which the present invention is applied.

FIG. 31 is a block diagram illustrating an example configuration of a main part of a camera that uses the decoding apparatus 1 and the encoding apparatus 101 to which the present invention is applied.

A camera 1300 illustrated in FIG. 31 captures an image of an object, and causes the image of the object to be displayed on an LCD 1316 or records it on a recording medium 1333 as image data.

A lens block 1311 causes light (that is, video of an object) to be incident on a CCD/CMOS 1312. The CCD/CMOS 1312 is an image sensor that uses a CCD or a CMOS, converts the intensity of received light into an electrical signal, and supplies it to a camera signal processing unit 1313.

The camera signal processing unit 1313 converts the electrical signal supplied from the CCD/CMOS 1312 into Y, Cr, and Cb color difference signals, and supplies them to an image signal processing unit 1314. Under the control of a controller 1321, the image signal processing unit 1314 performs certain image processing on the image signal supplied from the camera signal processing unit 1313, or encodes the image signal using an encoder 1341. The image signal processing unit 1314 supplies encoded data generated by encoding the image signal to the decoder 1315. Further, the image signal processing unit 1314 acquires display data generated by an on-screen display (OSD) 1320, and supplies it to a decoder 1315.

In the above processes, the camera signal processing unit 1313 utilizes a DRAM (Dynamic Random Access Memory) 1318 connected via a bus 1317, and causes image data, encoded data obtained by encoding the image data, or the like to be held in the DRAM 1318 as necessary.

The decoder 1315 decodes the encoded data supplied from the image signal processing unit 1314, and supplies obtained image data (decoded image data) to the LCD 1316. Furthermore, the decoder 1315 supplies the display data supplied from the image signal processing unit 1314 to the LCD 1316. The LCD 1316 combines the image of the decoded image data supplied from the decoder 1315 and the image of the display data, as appropriate, and displays a resulting composite image.

Under the control of the controller 1321, the on-screen display 1320 outputs display data such as a menu screen formed of signs, characters, or figures, and an icon to the image signal processing unit 1314 via the bus 1317.

The controller 1321 executes various processes on the basis of a signal indicating the content of a command issued by a user using an operation unit 1322, and also controls the image signal processing unit 1314, the DRAM 1318, an external interface 1319, the on-screen display 1320, a medium drive 1323, and the like via the bus 1317. A FLASH ROM 1324 stores programs, data, and the like necessary for the controller 1321 to execute various processes.

For example, the controller 1321 can encode image data stored in the DRAM 1318 or decode encoded data stored in the DRAM 1318 on behalf of the image signal processing unit 1314 or the decoder 1315. At this time, the controller 1321 may perform an encoding or decoding process using a scheme similar to the encoding or decoding scheme of the image signal processing unit 1314 or the decoder 1315, or may perform an encoding or decoding process using a scheme that is not supported by the image signal processing unit 1314 or the decoder 1315.

Furthermore, for example, in a case where an instruction for starting printing an image has been issued from the operation unit 1322, the controller 1321 reads image data from the DRAM 1318, and supplies it to a printer 1334 connected to the external interface 1319 via the bus 1317 to print it.

Further, for example, in a case where an instruction for recording an image has been issued from the operation unit 1322, the controller 1321 reads encoded data from the DRAM 1318, and supplies it to the recording medium 1333 attached to the medium drive 1323 via the bus 1317 to store it.

The recording medium 1333 is, for example, any readable and rewritable removable medium such as a magnetic disk, a magneto-optical disk, an optical disk, or a semiconductor memory. The recording medium 1333 may also be, of course, any type of removable medium, and may be a tape device, a disk, or a memory card. Of course, a non-contact IC card or the like may also be used.

Furthermore, the medium drive 1323 and the recording medium 1333 may also be integrally formed into, for example, a non-portable storage medium such as a built-in hard disk drive or an SSD (Solid State Drive).

The external interface 1319 is composed of, for example, a USB input/output terminal or the like, and is connected to the printer 1334 in a case where an image is to be printed. Furthermore, a drive 1331 is connected to the external interface 1319 as necessary, and a removable medium 1332 such as a magnetic disk, an optical disk, or a magneto-optical disk is attached as appropriate, so that a computer program read therefrom is installed into the FLASH ROM 1324 as necessary.

Further, the external interface 1319 includes a network interface that is connected to a certain network such as a LAN or the Internet. The controller 1321 can read encoded data from the DRAM 1318 in accordance with an instruction from, for example, the operation unit 1322, and supply it to another apparatus connected via a network from the external interface 1319. Furthermore, the controller 1321 can acquire, via the external interface 1319, encoded data or image data supplied from another apparatus via a network, and hold it in the DRAM 1318 or supply it to the image signal processing unit 1314.

The camera 1300 as above uses the decoding apparatus 1 as the decoder 1315. That is to say, similarly to the case of the decoding apparatus 1, the decoder 1315 obtains a motion prediction image from the frame (N−1) using motion vectors, and, in addition, obtains a spatial prediction image from the frame N through intra-prediction utilizing a decoded pixel value in the frame N. And the decoder 1315 performs a filtering process on the two types of images to generate a prediction image. Accordingly, the decoder 1315 can generate a new prediction image closer to the original image.

Accordingly, the camera 1300 can be configured to generate a prediction image by adding an image representing high-frequency components to the intra-prediction image IP during decoding for, for example, image data generated by the CCD/CMOS 1312, when reading encoded data of video data from the DRAM 1318 or the recording medium 1333, or when acquiring encoded data of video data via a network.

Furthermore, the camera 1300 uses the encoding apparatus 101 as the encoder 1341. Similarly to the case of the encoding apparatus 101, the encoder 1341 performs a filtering process on a motion prediction image and an intra-prediction image using motion vectors to generate a prediction image. Accordingly, the encoder 1341 can generate a new prediction image closer to the original image. Hence, only a small amount of code to be assigned to residuals can be required, thus making it possible to increase encoding efficiency.

Accordingly, the camera 1300 can improve encoding efficiency by compensating for the lack of prediction accuracy of intra-prediction by using the prediction accuracy of inter-prediction when, for example, recording encoded data on the DRAM 1318 or the recording medium 1333 or when providing encoded data to another apparatus. Moreover, since the number of reference frames necessary for inter-prediction can be reduced, the camera 1300 can realize a reduction in processing cost.

Note that a decoding method of the decoding apparatus 1 may be applied to a decoding process performed by the controller 1321. Similarly, an encoding method of the encoding apparatus 101 may be applied to an encoding process performed by the controller 1321.

Furthermore, image data captured by the camera 1300 may be that of a moving image or a still image.

Of course, the decoding apparatus 1 and the encoding apparatus 101 can also be applied to an apparatus or a system other than the apparatuses described above.

Furthermore, the dimensions of a macroblock are arbitrary. The present invention can be applied to, for example, a macroblock having any dimension as illustrated in FIG. 32. For example, the present invention can be applied not only to a normal macroblock of 16×16 pixels but also to an extended macroblock (extension macroblock) such as a macroblock of 32×32 pixels.

In FIG. 32, in the upper portion, macroblocks composed of 32×32 pixels that are divided by blocks (partitions) of 32×32 pixels, 32×16 pixels, 16×32 pixels, and 16×16 pixels are illustrated in sequence from the left. Furthermore, in the middle portion, blocks composed of 16×16 pixels that are divided by blocks of 16×16 pixels, 16×8 pixels, 8×16 pixels, and 8×8 pixels are illustrated in sequence from the left. Moreover, in the lower portion, blocks composed of 8×8 pixels that are divided by blocks of 8×8 pixels, 8×4 pixels, 4×8 pixels, and 4×4 pixels are illustrated in sequence from the left.

That is, macroblocks of 32×32 pixels can be processed by blocks of 32×32 pixels, 32×16 pixels, 16×32 pixels, and 16×16 pixels illustrated in the upper portion.

The block of 16×16 pixels illustrated on the right side in the upper portion can be processed by, similarly to the H.264/AVC scheme, blocks of 16×16 pixels, 16×8 pixels, 8×16 pixels, and 8×8 pixels illustrated in the middle portion.

The block of 8×8 pixels illustrated on the right side in the middle portion can be processed by, similarly to the H.264/AVC scheme, blocks of 8×8 pixels, 8×4 pixels, 4×8 pixels, and 4×4 pixels illustrated in the lower portion.

The above blocks can be classified into the following three hierarchical layers. That is, the blocks of 32×32 pixels, 32×16 pixels, and 16×32 pixels illustrated in the upper portion in FIG. 32 are referred to as blocks in a first hierarchical layer. The block of 16×16 pixels illustrated on the right side in the upper portion, and the blocks of 16×16 pixels, 16×8 pixels, and 8×16 pixels illustrated in the middle portion are referred to as blocks in a second hierarchical layer. The block of 8×8 pixels illustrated on the right side in the middle portion, and the blocks of 8×8 pixels, 8×4 pixels, 4×8 pixels, and 4×4 pixels illustrated in the lower portion are referred to as blocks in a third hierarchical layer.

With the adoption of the above hierarchical layer structure, with regard to the blocks equal to or lower than the block of 16×16 pixels, larger blocks can be defined as supersets thereof while maintaining the compatibility with the H.264/AVC scheme.

For example, the decoding apparatus 1 and the encoding apparatus 101 may be configured to generate a prediction image for each hierarchical layer. Furthermore, for example, the decoding apparatus 1 and the encoding apparatus 101 may be configured to utilize a prediction image, which is generated in the first hierarchical layer that has a larger block size than the second hierarchical layer, also for the second hierarchical layer.

Macroblocks for which encoding is to be performed using a comparatively large block size, such as the first hierarchical layer and the second hierarchical layer, do not include comparatively high-frequency components. In contrast, macroblocks for which encoding is to be performed using a comparatively small block size, such as the third hierarchical layer, are considered to include comparatively high-frequency components.

Thus, prediction images are separately generated in accordance with individual hierarchical layers having different block sizes, thus making feasible improvement in encoding performance suitable for local characteristics of an image.

REFERENCE SIGNS LIST 1 decoding apparatus, 21 motion prediction/compensation circuit, 41 prediction mode determination circuit, 42 unidirectional prediction circuit, 43 bidirectional prediction circuit, 44 prediction circuit, 45 filtering circuit, 51 motion compensation circuit, 52 intra-prediction circuit, 61 difference calculation circuit, 62 low-pass filter circuit, 63 gain adjustment circuit, 64 high-pass filter circuit, 65 gain adjustment circuit, 66 adder circuit, 67 adder circuit

The invention claimed is:

1. An image decoding apparatus, comprising:
   circuitry configured to:
   calculate a difference between at least one motion compensation image that has been predicted during decoding and an intra-prediction image that has been predicted decoding, the motion compensation image being generated by performing inter-prediction on a reference frame, the intra-prediction image being generated by performing a prediction operation on a current frame based on neighboring pixels of the current frame, wherein the reference frame and the current frame are read from a frame memory;
   generate a difference image based on the difference;
   apply a filter to filter the difference image; and
   generate a prediction image based on the filtering of the difference image.

2. The image decoding apparatus of claim 1, wherein the circuitry is configured to:
   decode an encoded image based on the generated prediction image.

3. The image decoding apparatus of claim 1, wherein the circuitry is configured to
   apply a first filter to filter the difference image,
   apply a second filter, different from the first filter, to filter an image obtained by applying the first filter, and
   generate the prediction image based on the applying of the second filter.

4. The image decoding apparatus of claim 3, wherein the first filter is a low-pass filter and the second filter is a high-pass filter.

5. The image decoding apparatus of claim 3, wherein the circuitry is configured to
   add the image obtained by applying the first filter and an image obtained by applying the second filter to the motion compensation image extracted from a preceding frame with respect to a time of the prediction image.

6. The image decoding apparatus of claim 5, wherein the first filter is a low-pass filter and the second filter is a high-pass filter.

7. An image decoding method, comprising:
   calculating a difference between at least one motion compensation image that has been predicted during decoding and an intra-prediction image that has been predicted during decoding, the motion compensation image being generated by performing inter-prediction on a reference frame, the intra-prediction image being generated by performing a prediction operation on a current frame based on neighboring pixels of the current frame, wherein the reference frame and the current frame are read from a frame memory;
   generating a difference image based on the difference;
   applying a filter, using a processor, to filter the difference image; and
   generating, using the processor, a prediction image based on said filtering of the difference image.

8. The image decoding method of claim 7, further comprising:
   decoding, using the processor, an encoded image based on the generated prediction image.

9. The image decoding method of claim 7, wherein the applying the filter to filter the difference image comprises:
   applying a first filter to filter the difference image,
   applying a second filter, different from the first filter, to filter an image obtained by applying the first filter, and
   generating the prediction image based on said applying the second filter.

10. The image decoding method of claim 9, wherein the first filter is a low-pass filter and the second filter is a high-pass filter.

11. The image decoding method of claim 9, further comprising:
    adding the image obtained by applying the first filter and an image obtained by applying the second filter to the motion compensation image extracted from a preceding frame with respect to a time of the prediction image.

12. The image decoding method of claim 11, wherein the first filter is a low-pass filter and the second filter is a high-pass filter.

* * * * *